United States Patent
Kim et al.

(10) Patent No.: US 10,682,671 B2
(45) Date of Patent: Jun. 16, 2020

(54) ULTRASONIC IMAGING APPARATUS, ULTRASONIC PROBE APPARATUS, SIGNAL PROCESSING APPARATUS AND METHOD OF CONTROLLING ULTRASONIC IMAGING APPARATUS

(71) Applicant: SAMSUNG ELECTRONICS CO., LTD., Suwon-si (KR)

(72) Inventors: Baehyung Kim, Yongin-si (KR); Kyuhong Kim, Seoul (KR); Suhyun Park, Hwaseong-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 747 days.

(21) Appl. No.: 14/943,189

(22) Filed: Nov. 17, 2015

(65) Prior Publication Data

US 2016/0209502 A1   Jul. 21, 2016

(30) Foreign Application Priority Data

Jan. 21, 2015  (KR) .......................... 10-2015-0009981

(51) Int. Cl.
*H04B 1/02* (2006.01)
*B06B 1/02* (2006.01)
(Continued)

(52) U.S. Cl.
CPC .......... *B06B 1/0292* (2013.01); *B06B 1/0629* (2013.01); *G01S 7/52077* (2013.01); *G01S 15/8913* (2013.01); *G01S 15/8915* (2013.01)

(58) Field of Classification Search
None
See application file for complete search history.

(56) References Cited

U.S. PATENT DOCUMENTS 4,425,634 A * 1/1984 Iino ........................ G01S 3/8022
342/418
4,693,120 A * 9/1987 Robinson ................ G01N 29/26
73/618

(Continued)

FOREIGN PATENT DOCUMENTS

EP     0713102 A1 *  5/1996  ........... B06B 1/0622
EP     2846169 A1 *  3/2015  ......... G01S 7/52038
(Continued)

OTHER PUBLICATIONS

Oguz Kazanci, Dinesh Ramakrishnan, and Jeffrey Krolik. Beamforming Arrays with Faulty Sensors in Dynamic Environments. Duke University. Department of Electrical and Computer Engineering. Durham, NC 27708. Lincoln Laboratory ASAP 2004 Workshop. (Year: 2004).*

(Continued)

*Primary Examiner* — Isam A Alsomiri
*Assistant Examiner* — Jonathan D Armstrong
(74) *Attorney, Agent, or Firm* — Sughrue Mion, PLLC

(57) ABSTRACT

There are provided an ultrasonic imaging apparatus, an ultrasonic probe apparatus, a signal processing apparatus, and a method for controlling an ultrasonic imaging apparatus. The ultrasonic imaging apparatus may include at least one first ultrasound element installed in a first ultrasound element installation unit; at least one second ultrasound element installed in a second ultrasound element installation unit that is separate from the first ultrasound element installation unit and such that the second ultrasound element forms a gap with the first ultrasound element; and a processor configured to estimate one or two or more virtual ultrasound signals that correspond to the gap based on a first ultrasound signal output from the at least one first ultrasound (Continued)

element and a second ultrasound signal output from the at least one second ultrasound element.

24 Claims, 36 Drawing Sheets

(51) Int. Cl.
  *G01S 15/89* (2006.01)
  *B06B 1/06* (2006.01)
  *G01S 7/52* (2006.01)

(56) References Cited

U.S. PATENT DOCUMENTS

| | | | | |
|---|---|---|---|---|
| 5,318,033 | A * | 6/1994 | Savord | G01S 7/52028 600/447 |
| 5,640,956 | A * | 6/1997 | Getzinger | A61B 6/12 600/400 |
| 5,860,925 | A * | 1/1999 | Liu | G01S 7/52044 348/442 |
| 5,924,989 | A * | 7/1999 | Polz | A61B 8/13 128/916 |
| 5,924,991 | A * | 7/1999 | Hossack | A61B 8/14 128/916 |
| 9,002,022 | B1 * | 4/2015 | Clemen, Jr. | H04R 29/00 310/334 |
| 9,706,298 | B2 * | 7/2017 | Sannino | H04R 3/005 |
| 2002/0097885 | A1 * | 7/2002 | Birchfield | H04R 1/406 381/92 |
| 2003/0199764 | A1 * | 10/2003 | Kim | A61B 8/06 600/437 |
| 2003/0220554 | A1 | 11/2003 | Grenon et al. | |
| 2007/0173722 | A1 | 7/2007 | Ustuner et al. | |
| 2008/0067895 | A1 * | 3/2008 | Adachi | A61B 8/12 310/324 |
| 2008/0103393 | A1 * | 5/2008 | Specht | A61B 8/42 600/437 |
| 2009/0099455 | A1 * | 4/2009 | Katsuyama | A61B 8/00 600/459 |
| 2009/0281775 | A1 | 11/2009 | Song et al. | |
| 2011/0178400 | A1 * | 7/2011 | Specht | A61B 8/4281 600/437 |
| 2012/0083695 | A1 | 4/2012 | Napolitano et al. | |
| 2013/0231569 | A1 | 9/2013 | Miller | |
| 2013/0293065 | A1 * | 11/2013 | Hajati | B06B 1/0629 310/334 |
| 2015/0063057 | A1 * | 3/2015 | Hayashi | A61B 8/56 367/7 |
| 2016/0074013 | A1 * | 3/2016 | Chae | A61B 8/463 600/440 |
| 2017/0031020 | A1 * | 2/2017 | Brumley | G01S 15/60 |
| 2017/0055841 | A1 * | 3/2017 | Mueller | A61B 8/4494 |
| 2018/0289360 | A1 * | 10/2018 | Funakubo | A61B 8/14 |

FOREIGN PATENT DOCUMENTS

| | | | |
|---|---|---|---|
| EP | 2846170 A1 * | 3/2015 | ........ G01S 7/52023 |
| KR | 10-2014-0107859 A | 9/2014 | |
| WO | WO-2006125817 A1 * | 11/2006 | ............ G01S 7/032 |

OTHER PUBLICATIONS

Oguz R. Kazanci and Jeffrey L. Krolik. 2005 Asilomar Conference. Beamspace Adaptive Channel Compensation Beamspace for Sensor Arrays with Faulty Elements for Elements. Duke University Department of Electrical and Computer Engineering. Durham, NC 27708. (Year: 2005).*

Lee, Ta-Sung, and Tsui-Tsai Lin. "Adaptive beamforming with interpolated arrays for multiple coherent interferers." Signal Processing 57.2 (1997): 177-194. (Year: 1997).*

* cited by examiner

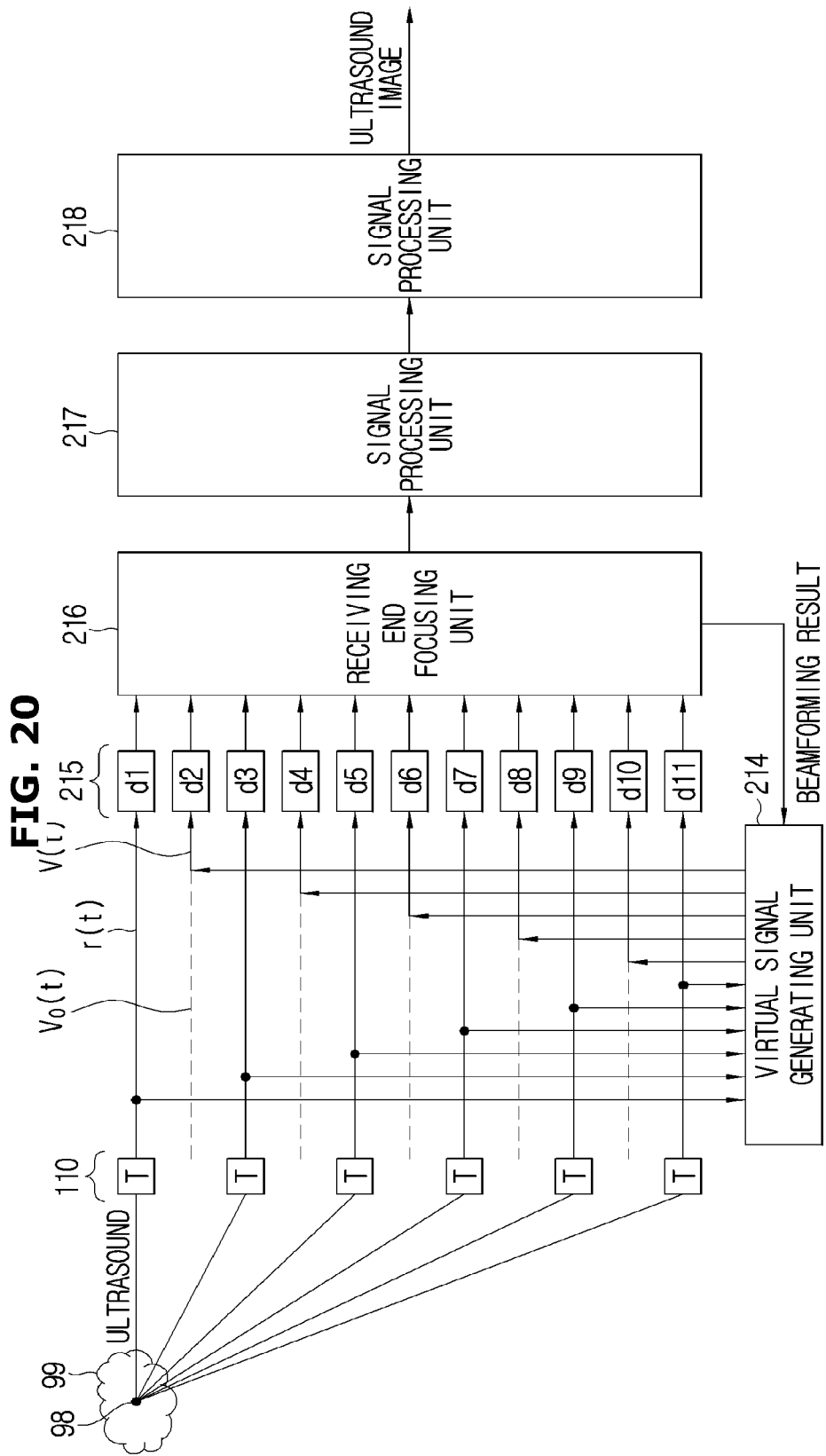

ULTRASONIC IMAGING APPARATUS, ULTRASONIC PROBE APPARATUS, SIGNAL PROCESSING APPARATUS AND METHOD OF CONTROLLING ULTRASONIC IMAGING APPARATUS

CROSS-REFERENCE TO RELATED APPLICATION

This application claims priority from Korean Patent Application No. 10-2015-0009981, filed on Jan. 21, 2015 in the Korean Intellectual Property Office, the disclosure of which is incorporated herein by reference in its entirety.

BACKGROUND

1. Field

Exemplary embodiments relate to an ultrasonic imaging apparatus, an ultrasonic probe apparatus, a signal processing apparatus, and a method for controlling an ultrasonic imaging apparatus.

2. Description of the Related Art

An imaging apparatus refers to an apparatus configured to obtain an internal or external image of a subject by using visible light, infrared light, radioactive rays, ultrasound, microwaves, a free induction decay (FID) signal induced by a magnetic resonance phenomenon, or the like. Examples of the imaging apparatus include a camera, an infrared light camera, a radiography apparatus and an ultrasonic imaging apparatus.

The ultrasonic imaging apparatus refers to an apparatus configured to image an inside of a subject by using ultrasound energy in order to obtain an image. As an example, the ultrasonic imaging apparatus may irradiate ultrasound energy to a target area inside the subject, collect ultrasound energy reflected from the target area, and then generate an ultrasound image based on the collected ultrasound energy. As another example, the ultrasonic imaging apparatus may irradiate a laser to a target area inside the subject, collect ultrasound energy generated in the target area, and thus generate an ultrasound image.

SUMMARY

According to an aspect of one or more exemplary embodiments, there is provided a signal processing apparatus capable of effectively decreasing noise in an image that is caused by a gap between individual elements in a device in which the individual element outputs a signal.

According to another aspect of one or more exemplary embodiments, there are provided an ultrasonic imaging apparatus, an ultrasonic probe apparatus and a method for controlling an ultrasonic imaging apparatus capable of effectively decreasing noise in an image caused by a gap between tiles or modules and a gap between individual elements of an ultrasonic transducer array resulting therefrom when an ultrasonic transducer array of a tile structure or a module structure formed of a set of a plurality of ultrasonic transducers is used or there is a gap between individual ultrasonic transducers.

In view of the above-described objects, exemplary embodiments provide an ultrasonic imaging apparatus, an ultrasonic probe apparatus, a signal processing apparatus and a method for controlling an ultrasonic imaging apparatus.

The ultrasonic imaging apparatus may include at least one first ultrasound element installed in a first ultrasound device; at least one second ultrasound element installed in a second ultrasound device that is separate from the first ultrasound such that the at least one second ultrasound element forms a gap with the at least one first ultrasound element; and a processor configured to estimate at least one virtual ultrasound signal that corresponds to the gap based on at least one first ultrasound signal output from the at least one first ultrasound element and at least one second ultrasound signal output from the at least one second ultrasound element.

The processor may be further configured to perform beamforming by using the at least one first ultrasound signal, the at least one second ultrasound signal and the at least one virtual ultrasound signal.

The processor may be further configured to perform an interpolation based on the at least one first ultrasound signal and the at least one second ultrasound signal, and to estimate at least one virtual ultrasound signal that corresponds to the gap based on the performed interpolation.

The processor may be further configured to use linear interpolation based on the at least one first ultrasound signal and the at least one second ultrasound signal.

The processor may be further configured to estimate an average of the at least one first ultrasound signal and the at least one second ultrasound signal as the virtual ultrasound signal that corresponds to the gap.

The first ultrasound element may be installed in the first ultrasound device to approach the second ultrasound device, and the second ultrasound element may be installed in the second ultrasound device to approach the first ultrasound device.

The processor may be further configured to estimate at least one of the at least one first ultrasound signal and the at least one second ultrasound signal as the at least one virtual ultrasound signal that corresponds to the gap.

The at least one first ultrasound element may be further configured to output a plurality of first ultrasound signals and the at least one second ultrasound element may be configured to output a plurality of second ultrasound signals, and the processor may be further configured to perform at least one temporal interpolation based on the plurality of first ultrasound signals and the plurality of second ultrasound signals and to estimate the at least one virtual ultrasound signal based on the performed at least one temporal interpolation.

The at least one first ultrasound element may be configured to output a first ultrasound signal at a first time and the at least one second ultrasound element may be configured to output a second ultrasound signal at a second time, and the processor may be further configured to use the first ultrasound signal output at the first time and the second ultrasound signal output at the second time in order to estimate a virtual ultrasound signal at a third time between the first time and the second time.

The processor may be further configured to estimate at least one virtual ultrasound signal that corresponds to the gap at the first time and to estimate at least one virtual ultrasound signal that corresponds to the gap at the second time, and to estimate a virtual ultrasound signal at the third time by using the estimated at least one virtual ultrasound signal at the first time and the estimated at least one virtual ultrasound signal at the second time.

The processor may be further configured to estimate the at least one virtual ultrasound signal that corresponds to the gap by using an objective function that is predefined or selected by a user.

Each of the at least one first ultrasound element and the at least one second ultrasound element may include at least one from among a capacitive micromachined ultrasonic transducer, a piezoelectric ultrasonic transducer and a magnetostrictive ultrasonic transducer.

The ultrasonic imaging apparatus may include at least one first ultrasound element installed in a first ultrasound device; at least one second ultrasound element installed in a second ultrasound device that is separate from the first ultrasound device such that the at least one second ultrasound element forms a gap with the at least one first ultrasound element; at least one third ultrasound element installed in at least one third ultrasound device; and a processor configured to estimate at least one virtual ultrasound signal that corresponds to a gap between the first ultrasound element and the second ultrasound element based on the first ultrasound signal, the second ultrasound signal and a third ultrasound signal output from the at least one third ultrasound element.

In an aspect, a method for controlling an ultrasonic imaging apparatus may be performed by an ultrasonic imaging apparatus that includes at least one first ultrasound element installed in a first ultrasound device and at least one second ultrasound element installed in a second ultrasound device that is separate from the first ultrasound device such that the at least one second ultrasound element forms a gap with the at least one first ultrasound element.

The method for controlling an ultrasonic imaging apparatus may include outputting a first ultrasound signal from the at least one first ultrasound element and outputting a second ultrasound signal from the at least one second ultrasound element; estimating a virtual ultrasound signal that corresponds to the gap based on the first ultrasound signal and the second ultrasound signal; and performing beamforming by using the first ultrasound signal, the second ultrasound signal and the estimated virtual ultrasound signal.

The estimating the virtual ultrasound signal may include estimating at least one virtual ultrasound signal that corresponds to the gap by performing an interpolation based on the first ultrasound signal and the second ultrasound signal.

The estimating of the at least one virtual ultrasound signal by performing an interpolation may include estimating at least one virtual ultrasound signal that corresponds to the gap by using linear interpolation based on the first ultrasound signal and the second ultrasound signal.

The estimating the virtual ultrasound signal may include estimating an average of the first ultrasound signal and the second ultrasound signal as the virtual ultrasound signal.

The at least one first ultrasound element may be installed in the first ultrasound device to approach the second ultrasound device, and the second ultrasound element may be installed in the second ultrasound device to approach the first ultrasound device.

The estimating the virtual ultrasound signal may include estimating at least one from among the first ultrasound signal and the second ultrasound signal as the virtual ultrasound signal.

The outputting the first ultrasound signal from the at least one first ultrasound element may include outputting, by the at least one first ultrasound element a plurality of first ultrasound signals, and the outputting the second ultrasound signal from the at least one second ultrasound element may include outputting, by the at least one second ultrasound element, a plurality of second ultrasound signals. In this case, the estimating the virtual ultrasound signal may include estimating at least one virtual ultrasound signal by performing at least one temporal interpolation based on the plurality of first ultrasound signals and the plurality of second ultrasound signals.

The outputting the first ultrasound signal from the at least one first ultrasound element and the outputting the second ultrasound signal from the at least one second ultrasound element may include sequentially outputting the first ultrasound signal at a first time and the second ultrasound signal at a second time. In this case, the estimating the virtual ultrasound signal may include estimating a virtual ultrasound signal at a third time between the first time and the second time by using the first ultrasound signal output at the first time and the second ultrasound signal output at the second time.

The estimating the virtual ultrasound signal may include: estimating at least one virtual ultrasound signal that corresponds to the gap at the first time and at least one virtual ultrasound signal that corresponds to the gap at the second time; and estimating a virtual ultrasound signal at the third time by using the estimated virtual ultrasound signal at the first time and the estimated virtual ultrasound signal at the second time.

The ultrasonic imaging apparatus may further include at least one third ultrasound element installed in at least one third ultrasound device, and the method may further include outputting a third ultrasound signal from the at least one third ultrasound element, and the estimating the virtual ultrasound signal may include estimating at least one virtual ultrasound signal based on the first ultrasound signal, the second ultrasound signal and the third ultrasound signal output from the at least one third ultrasound element.

The estimating the virtual ultrasound signal may include estimating at least one virtual ultrasound signal by using a predefined objective function.

In another aspect, an ultrasonic probe apparatus may include at least one first ultrasound element installed in a first ultrasound device; at least one second ultrasound element installed in a second ultrasound device that is separate from the first ultrasound device such that the at least one second ultrasound element forms a gap with the at least one first ultrasound element; and a processor configured to estimate at least one virtual ultrasound signal that corresponds to the gap based on a first ultrasound signal output from the at least one first ultrasound element and a second ultrasound signal output from the at least one second ultrasound element.

In yet another aspect, a signal processing apparatus may include a receiver that includes a first reception element group and a second reception element group which are arranged such that a gap is formed between the first reception element group and the second reception element group; and a virtual signal generator configured to generate a virtual signal that corresponds to the gap between the first reception element group and the second reception element group by using respective electrical signals output from the first reception element group and the second reception element group.

In still another aspect, an ultrasonic imaging apparatus may include a plurality of ultrasound elements configured to receive ultrasound energy and to output a plurality of ultrasound signals that correspond to the received ultrasound energy via a plurality of channels; a detector configured to detect, from among the plurality of channels, a first channel via which no ultrasound signal or a signal that has a signal strength that is less than a predetermined threshold is delivered; and a processor configured to estimate at least one virtual ultrasound signal that corresponds to the detected first channel by using at least one from among the plurality of ultrasound signals.

The detector may be further configured to detect, from among the plurality of channels at least one channel via which an ultrasound signal that has a voltage lower than a predefined threshold is delivered.

In yet another aspect, a method for controlling an ultrasonic imaging apparatus may include receiving, by a plurality of ultrasound elements, ultrasound energy, and outputting a plurality of ultrasound signals that correspond to the received ultrasound energy via a plurality of channels; detecting, from among the plurality of channels, a first channel via which no ultrasound signal or a signal that has a signal strength that is less than a predetermined threshold is delivered; and estimating at least one virtual ultrasound signal that corresponds to the detected first channel by using at least one from among the plurality of ultrasound signals.

The detecting the first channel may include detecting at least one channel via which an ultrasound signal that has a voltage lower than a predefined threshold value is delivered.

BRIEF DESCRIPTION OF THE DRAWINGS

These and/or other aspects will become apparent and more readily appreciated from the following description of exemplary embodiments, taken in conjunction with the accompanying drawings of which:

FIG. 20 is a diagram illustrating a sixth exemplary embodiment of the operation of the virtual signal generating unit;

DETAILED DESCRIPTION

Hereinafter, an exemplary embodiment will be described with reference to FIGS. 1, 2, and 3.

Figure 1:
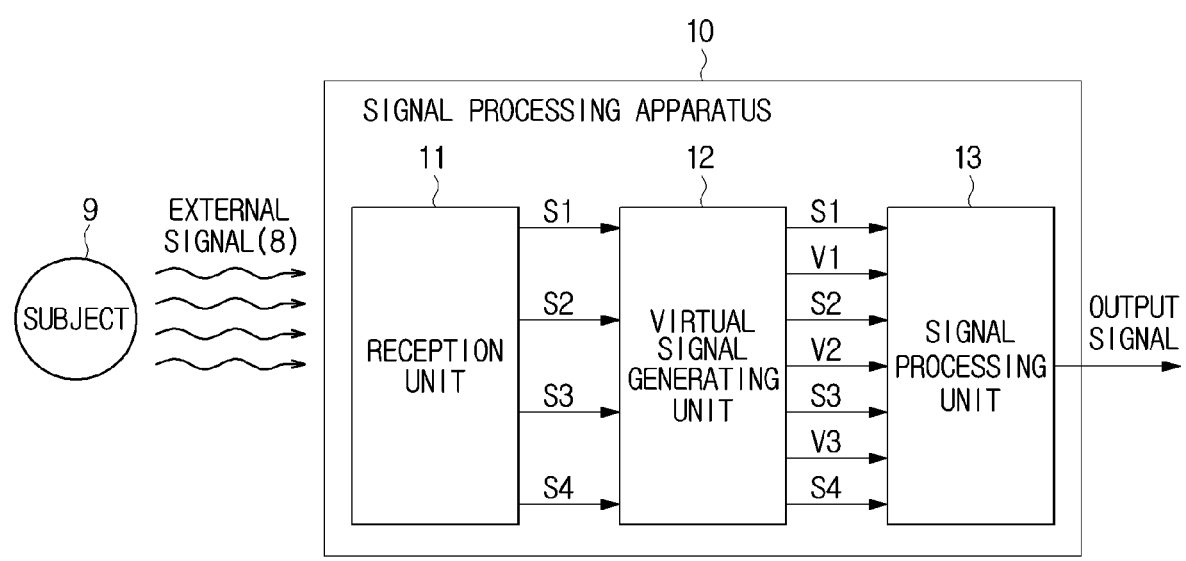
FIG. 1 is a diagram illustrating a configuration of an exemplary embodiment of a signal processing apparatus.

FIG. 1 is a diagram illustrating a configuration of an exemplary embodiment of a signal processing apparatus.

As illustrated in FIG. 1, a signal processing apparatus 10 may include a reception unit (also referred to herein as a "receiver") 11, a virtual signal generating unit (also referred to herein as a "virtual signal generator") 12 and a signal processing unit (also referred to herein as a "signal processor") 13.

The reception unit 11 receives an external signal 8 delivered from a subject 9, outputs electrical signals S1, S2, S3, and S4 of one or two or more channels corresponding to the received signal, and delivers the output to the virtual signal generating unit 12.

In this aspect, the subject 9 refers to various objects to be imaged and may include any of a human, animals and plants or inanimate objects. In addition, the subject 9 may include any of various physical targets whose internal or external image may be obtained.

The external signal 8 refers to a signal that is delivered from an external surface or an inside of the subject 9. The external signal 8 may include, for example, any of visible light, infrared light, radioactive rays, ultrasound, microwaves, or a free induction decay signal induced by a magnetic resonance phenomenon. For example, when the signal processing apparatus 10 is an ultrasound image processing apparatus, the external signal 8 delivered to the reception unit 11 may be an ultrasound signal. In this case, the external signal 8 delivered to the reception unit 11 may be ultrasound energy reflected from a specific point inside the subject 9, or ultrasound energy generated by a laser and irradiated to a specific point inside the subject 9.

The channel refers to a path for independent signals of various components such as an ultrasound element.

Figure 2:
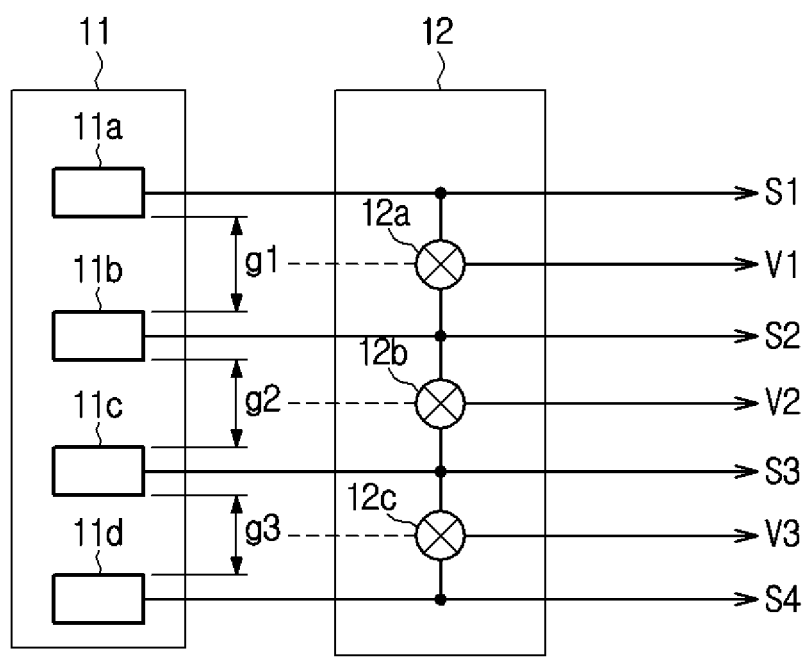
FIG. 2 is a diagram illustrating an example of a signal reception unit of a signal processing apparatus and an operation of a virtual signal generating unit.

FIG. 2 is a diagram illustrating an example of a signal reception unit of a signal processing apparatus and an operation of a virtual signal generating unit.

The reception unit 11 may include one or two or more receiving elements 11a, 11b, 11c, and 11d configured to receive the external signal 8. The reception unit 11 may include the receiving elements 11a, 11b, 11c, and 11d in correspondence with a type of the external signal 8 to be collected. For example, when the signal processing apparatus 10 is the ultrasound image processing apparatus, the receiving elements 11a, 11b, 11c, and 11d may be an ultrasonic transducer configured to output an electrical signal that corresponds to the received ultrasound energy. When the signal processing apparatus 10 is the radiography apparatus, the receiving elements 11a, 11b, 11c, and 11d may be individual pixels of a detector capable of detecting radioactive rays.

As illustrated in FIG. 2, the receiving elements 11a, 11b, 11c, and 11d may be physically separated from each other with predetermined gaps (also referred to herein as "spacings") g1, g2, and g3 therebetween. In this case, no external signal 8 may be received in the gaps g1, g2, and g3 between reception element groups 11a, 11b, 11c, and 11d. Therefore, no electrical signals S1, S2, S3, and S4 are output from such gaps g1, g2, and g3. In this manner, according to the disposition of the receiving elements 11a, 11b, 11c, and 11d, the reception unit 11 may not receive a certain signal 8 delivered from the outside, and thus some pieces of information may be lost when signal processing is performed.

While FIG. 2 illustrates an example in which the receiving elements 11a, 11b, 11c, and 11d are one-dimensionally arranged, the form in which the receiving elements 11a, 11b, 11c, and 11d are arranged is not limited thereto. For example, the receiving elements 11a, 11b, 11c, and 11d may be two-dimensionally arranged.

The virtual signal generating unit 12 may generate virtual signals V1, V2, and V3 and thus compensate for information loss due to the disposition of the receiving elements 11a, 11b, 11c, and 11d. Specifically, the virtual signal generating unit 12 may use the electrical signals S1, S2, S3, and S4 delivered from the reception unit 11 in order to obtain the virtual signals V1, V2, and V3. In an alternative embodiment, the virtual signal generator 12 may use the electrical signals S1, S2, S3, and S4 to generate one or more additional ultrasound signals.

The virtual signals V1, V2, and V3 refer to signals whose presences are assumed by the signal processing apparatus 10 as opposed to actual signals. When the actually obtained electrical signals are delivered via the plurality of channels, the virtual signals V1, V2, and V3 may include a signal that corresponds to a virtual channel that may be assumed to be present from among the plurality of channels.

According to an exemplary embodiment, as illustrated in FIG. 2, the virtual signal generating unit 12 may use two electrical signals S1 and S2, and obtain the virtual signal V1 corresponding to the gap g1 between the receiving elements 11a and 11b from which the two electrical signals S1 and S2 are output.

For example, the virtual signal generating unit 12 obtains a signal corresponding to a median or an average of the two actual electrical signals S1 and S2 or considers at least one of the two electrical signals S1 and S2 as a virtual signal corresponding to the gap g1, thereby obtaining a virtual signal corresponding to the gap g1.

According to the exemplary embodiment, the virtual signal generating unit 12 may perform an interpolation by using the electrical signals S1 and S2 of two channels and thus obtain a virtual signal corresponding to the virtual channel.

For example, the virtual signal generating unit 12 may obtain a signal of the virtual channel by using any of various types of interpolation, such as linear interpolation or cubic interpolation. The linear interpolation refers to a method in which a function connecting two points on a two-dimensional (2D) x-y plane is assumed to be a linear function, a y value is obtained with respect to any x value between two points, and interpolation is performed. The cubic interpolation refers to a method in which 8 points in a three-dimensional (3D) space are used to obtain any point in the 3D space and interpolation is performed. Depending on embodiments, the virtual signal generating unit 12 may obtain a signal of the virtual channel by using any of exponential interpolation, log-linear interpolation, spline interpolation or the like.

According to another exemplary embodiment, the virtual signal generating unit 12 may use an objective function to obtain a virtual signal. The objective function refers to a function that is set to optimize a specific condition of a device or a system.

In particular, the virtual signal generating unit 12 may detect an optimal value that satisfies a specific condition of the objective function, for example, a minimum condition, and obtain a virtual signal according to the detected optimal value. The objective function may be arbitrarily determined by a system designer's selection or a user's selection. The virtual signal generating unit 12 may use any of various objective functions that are generally used to obtain a virtual signal.

For example, the virtual signal generating unit 12 may estimate a virtual signal such that at least one of a main-lobe width and a side-lobe level may be minimized based on the beamforming result that is obtained by using the actual signal of the channel and the virtual signal.

Also, as another example, the virtual signal generating unit 12 may set a signal before beamforming, a signal that has been beamformed, a signal that has been beamformed and upon which various processes have been performed, or a parameter whose optimization is necessary in an image processing result as the objective function, and estimate a virtual signal such that the set objective function may be optimized.

In addition, the virtual signal generating unit 12 may use any of various methods according to a purpose or an effect of generating a virtual signal, and estimate the virtual signal.

Further, in order to obtain one virtual signal, the virtual signal generating unit 12 may use signals actually output from three or more receiving elements 11a, 11b, 11c and the like. The number of channels that are used by the virtual signal generating unit 12 to obtain one virtual signal may be variously determined by the system designer's selection or the user's selection.

The virtual signal generating unit 12 may obtain the virtual signals V1, V2, and V3 corresponding to all gaps g1 to g3 among the receiving elements 11a, 11b, 11c, and 11d. Therefore, the virtual signal generating unit 12 may further output the virtual signals V1, V2, and V3 for compensating for gaps g1, g2, and g3 among the receiving elements 11a, 11b, 11c, and 11d in addition to the received electrical signals S1, S2, S3, and S4. The virtual signals V1, V2, and V3 and the actual electrical signals S1, S2, S3, and S4 output from the virtual signal generating unit 12 may be delivered to the signal processing unit 13.

Figure 3:
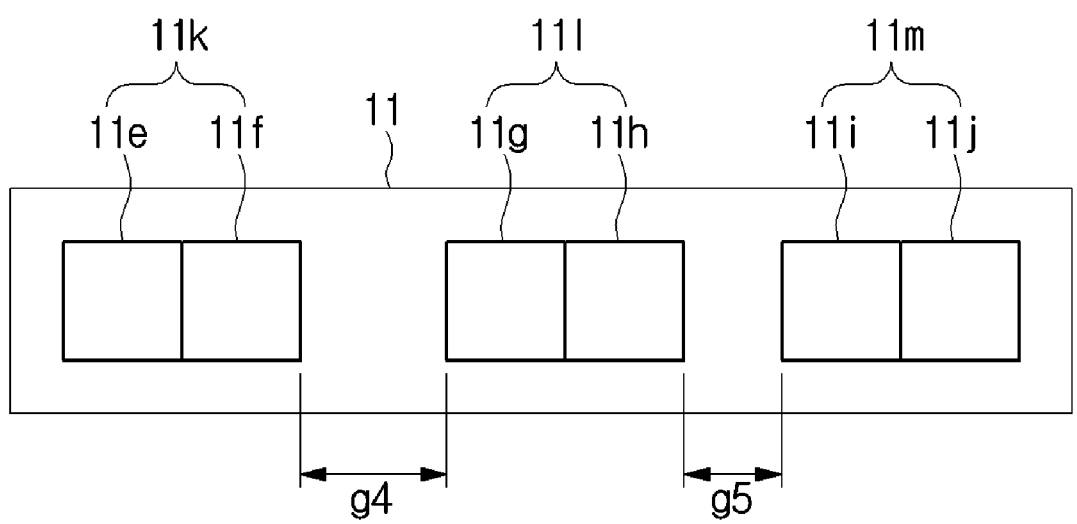
FIG. 3 is a diagram illustrating another example of the signal reception unit of the signal processing apparatus.

FIG. 3 is a diagram illustrating another example of the signal reception unit of the signal processing apparatus.

As illustrated in FIG. 3, receiving elements 11e, 11f, 11g, 11h, 11i, and 11j of the reception unit 11 may be classified as reception element groups 11k, 11l, and 11m that each include one or two or more receiving elements. In this case, the receiving elements 11e, 11f, 11g, 11h, 11i, and 11j in the same groups 11k, 11l, and 11m may be adjacent to each other or may be adjacent to each other at very small intervals.

While FIG. 3 illustrates an example in which the receiving elements 11e, 11f, 11g, 11h, 11i, and 11j are one-dimensionally arranged, the form in which the receiving elements 11e, 11f, 11g, 11h, 11i, and 11j are arranged is not limited thereto. For example, the receiving elements 11e, 11f, 11g, 11h, 11i, and 11j may be two-dimensionally arranged.

As illustrated in FIG. 3, when there are the plurality of reception element groups 11k, 11l, and 11m, the virtual signal generating unit 12 may use an electrical signal output from the receiving element 11f which is adjacent to the second reception element group 11l among the receiving elements 11e and 11f in the first reception element group 11k and an electrical signal output from the receiving element 11g which is adjacent to the first reception element group 11k among the receiving elements 11g and 11h in the second reception element group 11l, and obtain a virtual signal corresponding to a gap g4 between the two receiving elements 11f and 11g.

Depending on embodiments, the virtual signal generating unit 12 may obtain a virtual signal that corresponds to the gap g4 using the non-adjacent receiving elements 11e and 11h other than the receiving elements 11f and 11g that are adjacent to other reception element groups 11k and 11l. Further, the virtual signal generating unit 12 may obtain a virtual signal that corresponds to the gap g4 by using all of the receiving elements 11f and 11g that are adjacent to other reception element groups 11k and 11l and the receiving elements 11e and 11h that are not adjacent thereto.

The virtual signal generating unit 12 may include a processor that may be implemented by a semiconductor chip or related components provided in the signal processing apparatus 10.

The signal processing unit 13 may use the actual electrical signals S1, S2, S3, and S4 and the virtual signals V1, V2, and V3, and perform any of various signal processes, for example, a beamforming process and/or an image generating process. Since the signal processing unit 13 uses both of the actual electrical signals S1, S2, S3, and S4 and the virtual signals V1, V2, and V3 to perform signal processing, it is possible to perform signal processing more accurately as compared to when only the actual electrical signals S1, S2, S3, and S4 are used.

The signal processing unit 13 may include a processor that may be implemented by at least one semiconductor chip and related components provided in the signal processing apparatus 10. Depending on embodiments, the virtual signal generating unit 12 and the signal processing unit 13 may be implemented by one processor.

According to an exemplary embodiment, the signal processing apparatus 10 may include any of a general camera apparatus, an infrared camera apparatus, an ultrasonic imaging apparatus or a radiography apparatus.

Hereinafter, an ultrasonic imaging apparatus 1 will be described as an exemplary embodiment of the signal processing apparatus 10 with reference to FIGS. 4 to 23.

Figure 4:
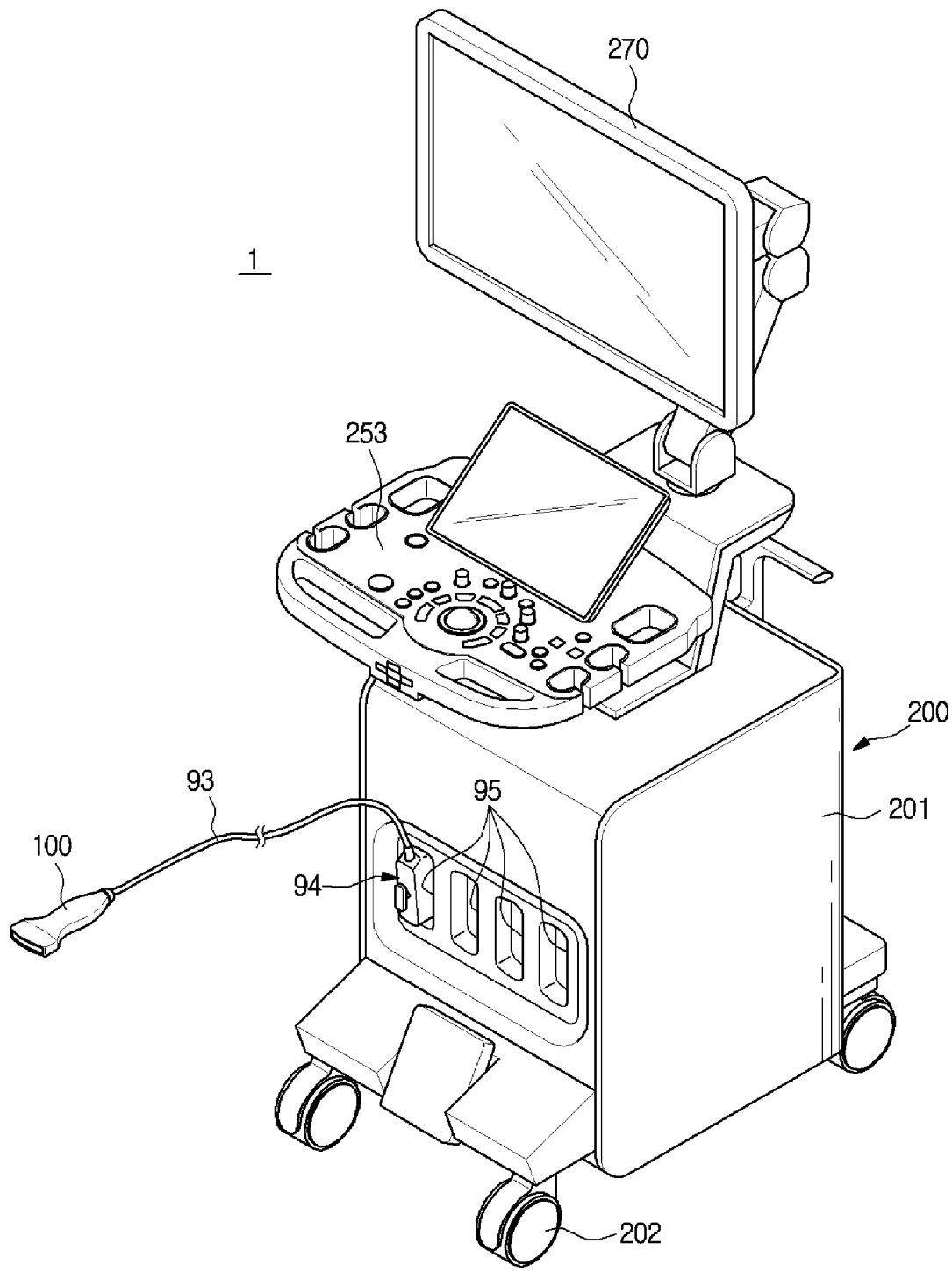
FIG. 4 is a diagram illustrating an exterior of an exemplary embodiment of an ultrasonic imaging apparatus.
Figure 5:
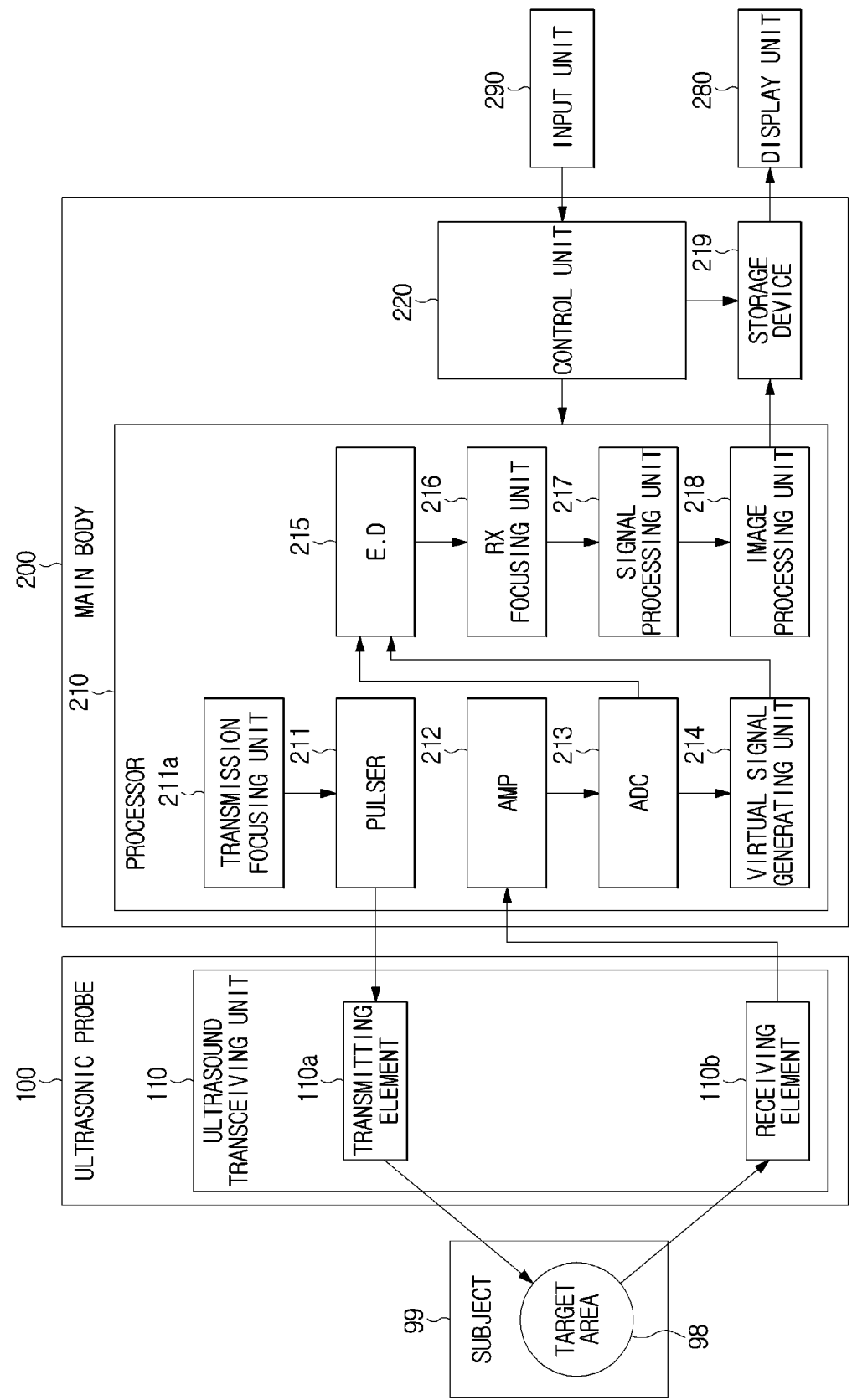
FIG. 5 is a diagram illustrating a configuration of an exemplary embodiment of an ultrasonic imaging apparatus.

FIG. 4 is a perspective view of an exemplary embodiment of an ultrasonic imaging apparatus. FIG. 5 is a diagram illustrating a configuration of an exemplary embodiment of an ultrasonic imaging apparatus.

As illustrated in FIGS. 4 and 5, the ultrasonic imaging apparatus 1 may include an ultrasonic probe 100 and a main body 200.

The ultrasonic probe 100 may collect ultrasound energy, generate an electrical signal corresponding to the collected ultrasound energy, and then deliver the generated electrical signal to the main body 200. Depending on embodiments, the ultrasonic probe 100 may perform beamforming on the collected ultrasound energy of the plurality of channels and deliver the beamformed signal to the main body 200.

The main body 200 may control overall operations of the ultrasonic imaging apparatus 1. Further, the main body 200 may use the electrical signal delivered from the ultrasonic probe 100, perform various operations such as a beamforming process, and thus generate an ultrasound image.

Depending on embodiments, the ultrasonic probe 100 and the main body 200 may be separately implemented, as illustrated in FIGS. 4 and 5. In this case, the ultrasonic probe 100 and the main body 200 may transmit and receive a mutual command or data by using a cable 93 or a wireless communication network.

According to the exemplary embodiment, the ultrasonic probe 100 and the main body 200 may be communicatively connected by using the connecting cable 93. An electrical signal output from the ultrasonic probe 100 may be delivered to the main body 200 via the connecting cable 93. A control command generated in the main body 200 may also be delivered to the ultrasonic probe 100 via the connecting cable 93. The ultrasonic probe 100 may be provided at one end of the connecting cable 93 and a connector 94 may be provided at the other end thereof. The connector 94 may be combined to or disconnected from a port 95 provided in an exterior 201 of the main body 200. When the connector 94 is combined to the port 95, the ultrasonic probe 100 and the main body 200 may be communicatively connected. Depending on embodiments, the connector may be provided at both ends of the connecting cable 93, and one of both connectors may be combined to or disconnected from the port formed in the ultrasonic probe 100.

According to another exemplary embodiment, the ultrasonic probe 100 and the main body 200 may be communicatively connected via a wireless communication network. In this case, a wireless communication module that includes an antenna and a wireless communication chip may be installed in insides of the ultrasonic probe 100 and the main body 200. The wireless communication module may be a short range wireless communication module that uses at least one of Bluetooth, Bluetooth low energy, Infrared Data Association (IrDA), Wi-Fi, Wi-Fi Direct, ultra wideband (UWB) and near field communication (NFC), or may be a wireless communication module that supports a 3GPP-based, 3GPP2-based or IEEE-based wireless communication network approved by the International Telecommunication Union (ITU).

Further, the ultrasonic probe 100 and the main body 200 may be implemented unseparated, i.e., as an integrated unit. In this case, the separate main body 200 may be connected to one end of the ultrasonic probe 100. In addition, depending on embodiments, the ultrasonic probe 100 and the main body 200 may be integrally implemented through one housing.

Hereinafter, the ultrasonic probe 100 will be specifically described.

As illustrated in FIG. 5, the ultrasonic probe 100 may include an ultrasound transceiving unit (also referred to herein as an "ultrasound transceiver") 110 in order to generate an ultrasound signal or receive an ultrasound signal.

According to the exemplary embodiment, the ultrasound transceiving unit 110 may include an ultrasound transmitting element (also referred to herein as an "ultrasound transmitter") 110a and an ultrasound receiving element (also referred to herein as an "ultrasound receiver") 110b. The ultrasound transmitting element 110a may generate ultrasound energy of a frequency corresponding to a frequency of a pulse signal according to a pulse signal in a processor 210. The generated ultrasound energy may be irradiated to a target area 98 of a subject 99. The generated ultrasound energy may be focused on at least one target area 98 inside the subject 99. In this case, the irradiated ultrasound may be focused on one target area 98 (single focusing), or may be focused on a plurality of target areas 98 (multi-focusing).

The ultrasound receiving element 110b may receive ultrasound energy that is reflected from the target area 98 or generated by a laser or the like in the target area 98, and convert the received ultrasound energy into an ultrasound signal. The ultrasound signal refers to an electrical signal corresponding to the received ultrasound energy. The ultrasound transceiving unit 110 may include a plurality of ultrasound receiving elements 110b. The plurality of ultrasound receiving elements 110b each may independently output an electrical signal. Therefore, the ultrasound transceiving unit 110 may output respective ultrasound signals that correspond to the plurality of channels.

Depending on embodiments, the ultrasound transceiving unit 110 may include an ultrasound transceiving element (not illustrated) capable of both generating and receiving ultrasound energy. In this case, the ultrasound transmitting element 110a and the ultrasound receiving element 110b may not be provided.

The ultrasound transmitting element 110a or the ultrasound receiving element 110b may be implemented by using the ultrasonic transducer capable of generating ultrasound energy or an electrical signal corresponding to the ultrasound energy. The ultrasonic transducer converts an alternating current energy of a predetermined frequency into a mechanical vibration of the same frequency to generate ultrasound energy, or converts a mechanical vibration of a predetermined frequency based on the received ultrasound energy into an alternating current energy to output an electrical signal corresponding to the received ultrasound energy. The ultrasound transmitting element 110a and the ultrasound receiving element 110b may be implemented as ultrasonic transducers of the same type or ultrasonic transducers of different types.

As the ultrasonic transducer, at least one of a capacitive micromachined ultrasonic transducer (cMUT) configured to transmit and receive ultrasound energy by using vibrations of several hundreds or thousands of micromachined thin films, a piezoelectric ultrasonic transducer using a piezoelectric effect of a piezoelectric material, and a magnetostrictive ultrasonic transducer configured to convert wave energy and electrical energy using a magnetostrictive effect of a magnetic substance may be used. In addition, any of various other elements capable of generating ultrasound energy according to an electrical signal or generating an electrical signal according to ultrasound energy may be used as the ultrasonic transducer.

Figure 6:
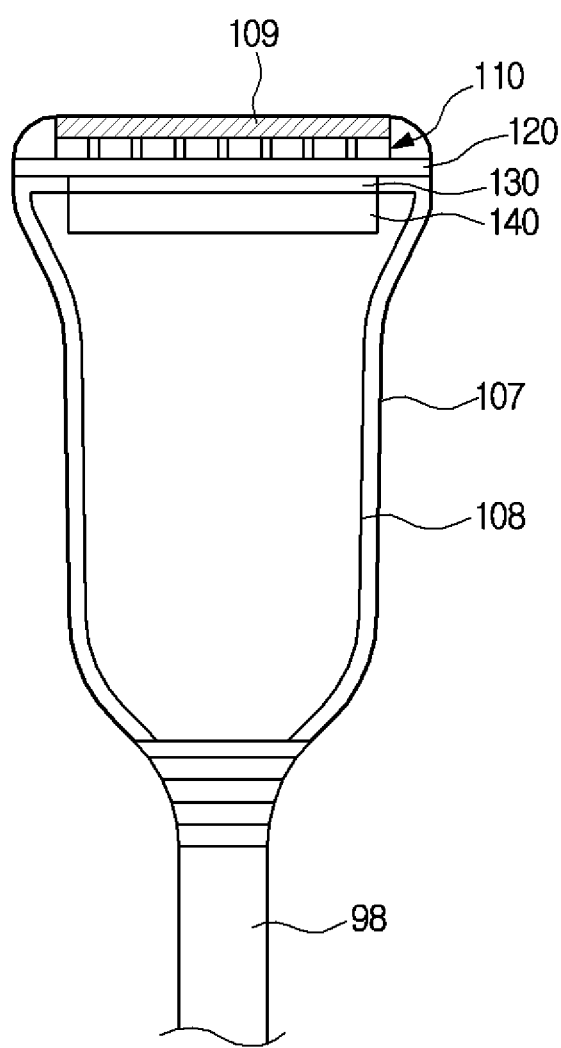
FIG. 6 is a diagram illustrating an exemplary embodiment of an internal structure of an ultrasonic probe.

FIG. 6 is a diagram illustrating an exemplary embodiment of an internal structure of an ultrasonic probe.

As illustrated in FIG. 6, the ultrasonic probe 100 may include a probe housing 107, an acoustic lens 109 installed at one end of the probe housing 107, the ultrasound transceiving unit 110 installed adjacent to the acoustic lens, a support frame 120 having one surface on which the ultrasound transceiving unit 110 is mounted, a printed circuit substrate 130 installed on the other surface of the support frame 120, a heat transfer unit (also referred to herein as a "heat transferer") 140 attached to the printed circuit substrate 130, and a conducting wire 108 configured to deliver an electrical signal output from the printed circuit substrate 130 to the main body 200.

Various components may be installed inside the probe housing 107. The probe housing 107 may stably fix various components installed therein or protect the various components from external shock. The probe housing 107 may have any of various shapes according to a type of the subject 99, an ultrasound imaging area, or a type of the ultrasonic probe 100.

The acoustic lens 109 may focus or diffuse an acoustic wave or ultrasound energy. The acoustic lens 109 enables ultrasound energy generated in the ultrasound transceiving unit 110 to be focused on the target area 98. The acoustic lens 109 may be prepared using glass or a synthetic fiber.

The ultrasound transceiving unit 110 may be installed on one surface of the support frame 120. The ultrasound transceiving unit 110 may be installed in contact with the acoustic lens 109 or adjacent to the acoustic lens 109. Details of the ultrasound transceiving unit 110 will be described below.

The support frame 120 may support the ultrasound transceiving unit 110 installed on one surface. The support frame 120 may be implemented using a synthetic resin. The substrate 130 may be installed on the other surface of the support frame 120. Depending on embodiments, the support frame 120 may not be provided. In this case, the ultrasound transceiving unit 110 may be directly installed on the substrate 130. Meanwhile, when the ultrasound transceiving unit 110 includes the piezoelectric ultrasonic transducer or the magnetostrictive ultrasonic transducer, the support frame 120 may be made of a sound-absorbing material that is capable of absorbing an ultrasound.

Various semiconductor chips or circuits may be installed in the substrate 130. The substrate 130 may be installed at any position of the support frame 120. The substrate 130 may receive an ultrasound signal output from the ultrasound transceiving unit 110, perform predetermined signal processing on the ultrasound signal as necessary, and then deliver the result to the main body 200. Further, the substrate 130 may apply an alternating current to the ultrasound transceiving unit 110 according to a control command delivered from the main body 200. According to the applied current, the ultrasound transmitting element 110a of the ultrasound transceiving unit 110 may vibrate and generate ultrasound energy.

The heat transfer unit 140 may be attached to the substrate 130. The heat transfer unit 140 may deliver heat generated in the substrate 130 and release the heat in the air. The heat transfer unit 140 may be implemented using any of various thermal conductors. For example, the heat transfer unit 140 may be implemented using any of graphite, tungsten, a tungsten oxide, silicone, an aluminum oxide, a glass micro balloon filler or the like.

The conducting wire 108 may be extended from a wired cable 93, and may serve as a passage through which various electrical signals output from the substrate 130 are delivered to the main body 200 or the electrical signal delivered from the main body 200 is delivered to the substrate 130 or the ultrasound transceiving unit 110.

Although not illustrated in FIG. 6, when the ultrasonic probe 100 and the main body 200 are integrally implemented, all or some components constituting the main body may be installed inside the ultrasonic probe 100.

The ultrasound transceiving unit 110 will be described in further detail with reference to FIGS. 7, 8, 9, 10, and 11.

Figure 7:
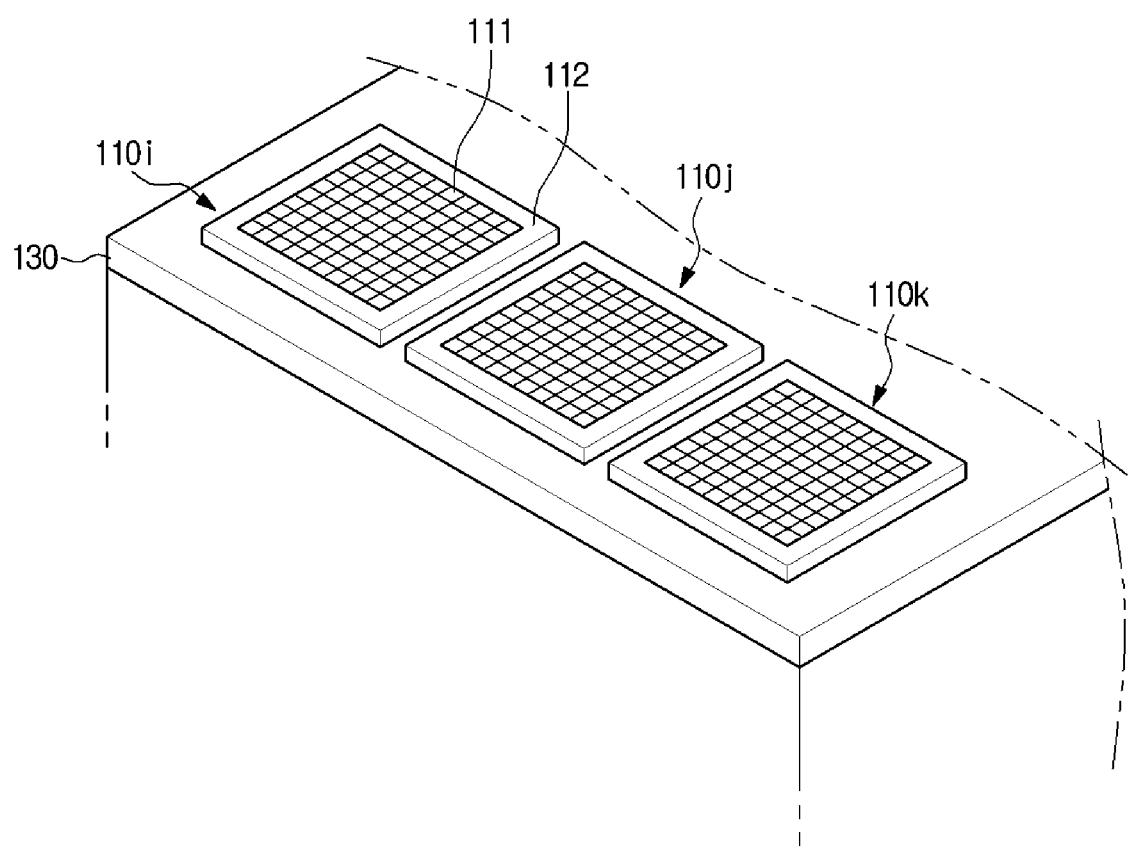
FIG. 7 is a perspective view of an example in which an ultrasound element is disposed in an ultrasound element installation unit.
Figure 8:
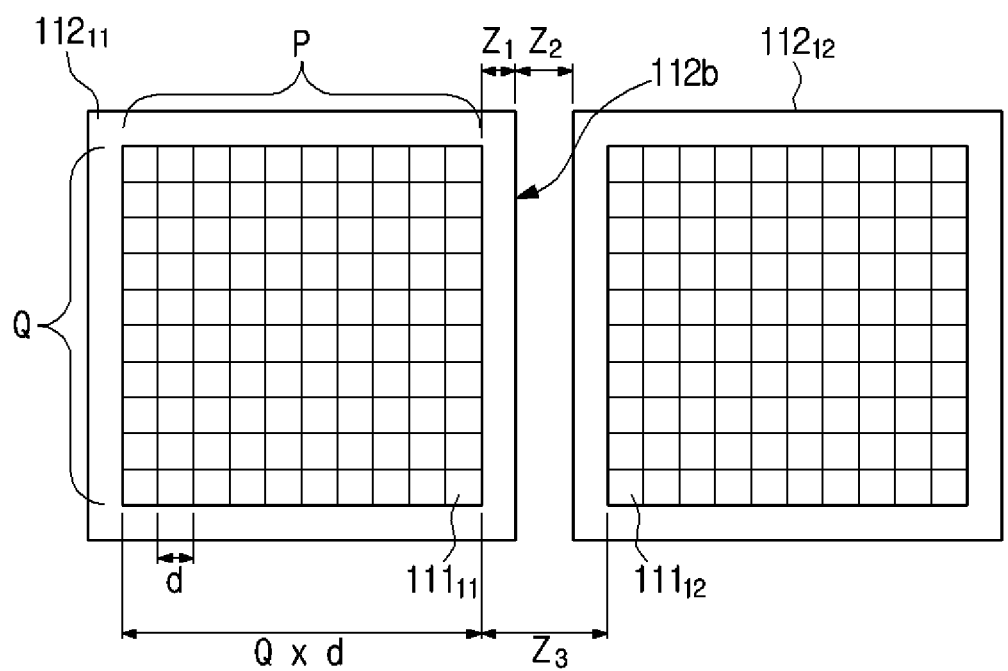
FIG. 8 is a plan view of an example in which an ultrasound element is disposed in an ultrasound element installation unit.

FIG. 7 is a perspective view of an example in which an ultrasound element is disposed in an ultrasound element installation unit. FIG. 8 is a plan view of an example in which an ultrasound element is disposed in an ultrasound element installation unit.

As illustrated in FIG. 7, a plurality of ultrasound transceiving units 110$i$, 110$j$, and 110$k$ may be installed on the support frame 120 or the substrate 130. Each of the ultrasound transceiving units 110 may include a plurality of ultrasound elements 111 and an ultrasound element installation unit (also referred to herein as an "ultrasound device") 112 in which the plurality of ultrasound elements 111 are installed.

The ultrasound element 111 refers to a device configured to generate ultrasound energy of a predetermined frequency according to a level of a voltage to be applied and emit the ultrasound energy to the outside, or receive ultrasound energy delivered from the outside, and output an electrical signal corresponding to the received ultrasound energy, that is, an ultrasound signal. The ultrasound element 111 may be a basic unit of the ultrasound transceiving unit 110. One independent ultrasound element 111 may output an ultrasound signal of at least one channel.

The ultrasound element 111 may be mounted and installed in the ultrasound element installation unit 112. The ultrasound element 111 in the form of a 2D P×Q matrix may be installed in the ultrasound element installation unit 112. Here, each of P and Q may be a natural number, and may have the same value depending on embodiments. For example, 256 ultrasound elements 111 arranged in the form of 16×16 may be installed in one ultrasound element installation unit 112.

According to the exemplary embodiment, the ultrasound element 111 of a tile structure may be disposed on one surface of the ultrasound element installation unit 112. The tile structure refers to a structure in which tiles are disposed not to overlap at regular intervals. In particular, the ultrasound elements 111 may be installed in the ultrasound element installation unit 112 so as not to overlap.

The ultrasound element 111 may have a shape such as a rectangle. For example, as illustrated in FIG. 8, the ultrasound element 111 may have a shape of a square whose base and height are d. Here, the base d and the height d may be, for example, 0.25 mm. In addition, the ultrasound element 111 may have any of various shapes that may be considered by the system designer.

As illustrated in FIG. 8, the ultrasound element 111 may be installed in the ultrasound element installation unit 112 and installed so as to have a predetermined distance from an edge 112$b$ of the ultrasound element installation unit 112, that is, to be separated from the edge 112$b$ by a first gap $z_1$. Here, the first gap $z_1$ may be, for example, about 0.2 mm. This enables the ultrasound element 111 to be more stably installed in the ultrasound element installation unit 112, and enables components such as a circuit related to an operation of the ultrasound element to be installed.

Figure 9:
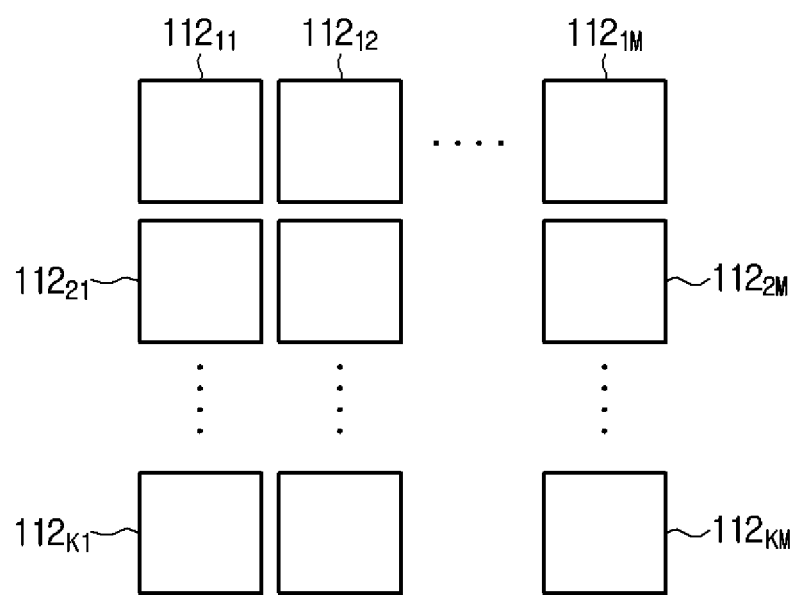
FIG. 9 is a diagram illustrating an example in which ultrasound element installation units of a tile structure are disposed on a printed circuit substrate.

FIG. 9 is a diagram illustrating an example in which ultrasound element installation units of a tile structure are disposed on a printed circuit substrate.

The ultrasound element installation unit 112 has one surface on which the ultrasound element 111 is installed and may stably support the ultrasound element 111. Further, the ultrasound element installation unit 112 may include any of various components or circuits for controlling operations of the ultrasound element 111 as necessary.

As described above, the ultrasound element installation unit 112 may be installed on the support frame 120 or the substrate 130. The ultrasound element installation unit 112 has another surface on which no ultrasound element 111 is installed and that is attached on the support frame 120 or the substrate 130, and thus may be installed on the support frame 120 or the substrate 130.

A plurality of ultrasound element installation units $112_{11}$ to $112_{KM}$ may be attached and installed on one support frame 120 or the substrate 130. For example, as illustrated in FIG. 9, K×M ultrasound element installation units $112_{11}$ to $112_{KM}$ may be disposed on one surface of the frame 120 or the substrate 130. The ultrasound element installation units $112_{11}$ to $112_{KM}$ of a tile structure may be disposed on one support frame 120 or the substrate 130.

The ultrasound element installation unit 112 may have any of various shapes. For example, the ultrasound element installation unit 112 may be formed in a rectangle as illustrated in FIGS. 7, 8 and 9, or a shape similar thereto. Depending on embodiments, the ultrasound element installation unit 112 may have a shape of a square or a shape similar thereto. In addition, the ultrasound element installation unit 112 may have any of various shapes such as a circle, an ellipse, a triangle or various types of polygons according to the system designer's selection.

Referring again to FIG. 8, when the plurality of ultrasound element installation units $112_{11}$ and $112_{12}$ of a tile structure are disposed, the first ultrasound element installation unit 112 may be separated from a second ultrasound element installation unit 112$a$ by a second gap $z_2$. In this case, the second gap $z_2$ may be, for example, about 0.1 mm. Similarly, the other ultrasound element installation units $112_{13}$ to $112_{KM}$ may be separated by a predetermined gap therebetween. Respective gaps among the ultrasound element installation units $112_{11}$ to $112_{KM}$ may be the same or substantially the same. Also, depending on embodiments, gaps among all of the ultrasound element installation units $112_{11}$ to $112_{KM}$ or some of the ultrasound element installation units $112_{11}$ to $112_{KM}$ may be different.

As described above, the ultrasound element 111 may be separated from the edge 112$b$ of the ultrasound element installation unit 112 by the first gap $z_1$ and installed in the ultrasound element installation unit 112. Therefore, since there are the first gap $z_1$ according to installation of the ultrasound element 111 and the second gap $z_2$ between the plurality of ultrasound element installation units $112_{11}$ and $112_{12}$, a first ultrasound element $111_{11}$ installed in the first ultrasound element installation unit $112_{11}$ and a second ultrasound element $111_{12}$ installed in another ultrasound element installation unit $112_{12}$ may be separated by a third gap $z_3$. In particular, the third gap $z_3$ may be a sum of double the first gap $z_1$ and the second gap $z_2$. Therefore, when the first gap $z_1$ and the second gap $z_2$ are 0.2 mm and 0.1 mm, respectively, as described above, the third gap $z_3$ may be about 0.5 mm.

In this manner, due to the gap between the first ultrasound element $111_{11}$ and the second ultrasound element $111_{12}$, there may be an area in which no ultrasound element 111 is disposed on the support frame 120 or the substrate 130. An ultrasound delivered to this area may not be received. When the ultrasound element 111 has a shape of a square whose height and base are 0.25 mm and the third gap $z_3$ is 0.5 mm, the third gap $z_3$ may have a size in which the two ultrasound elements 111 may be disposed in one row. Therefore, due to these first and second gaps $z_1$ and $z_2$, ultrasound signals of two channels may not be obtained in one row. As illustrated in FIG. 9, when there are the plurality of ultrasound element installation units $112_{11}$ to $112_{KM}$, more ultrasounds may not be received. Therefore, ultrasound signals of the plurality of channels may not be obtained. The ultrasound that is not received in this manner may cause an artifact in a part of the ultrasound image.

Hereinafter, an ultrasound element using the capacitive micromachined ultrasonic transducer and a structure of the ultrasound element installation unit will be described in further detail with reference to FIGS. 10, 11A, and 11B.

Figure 10:
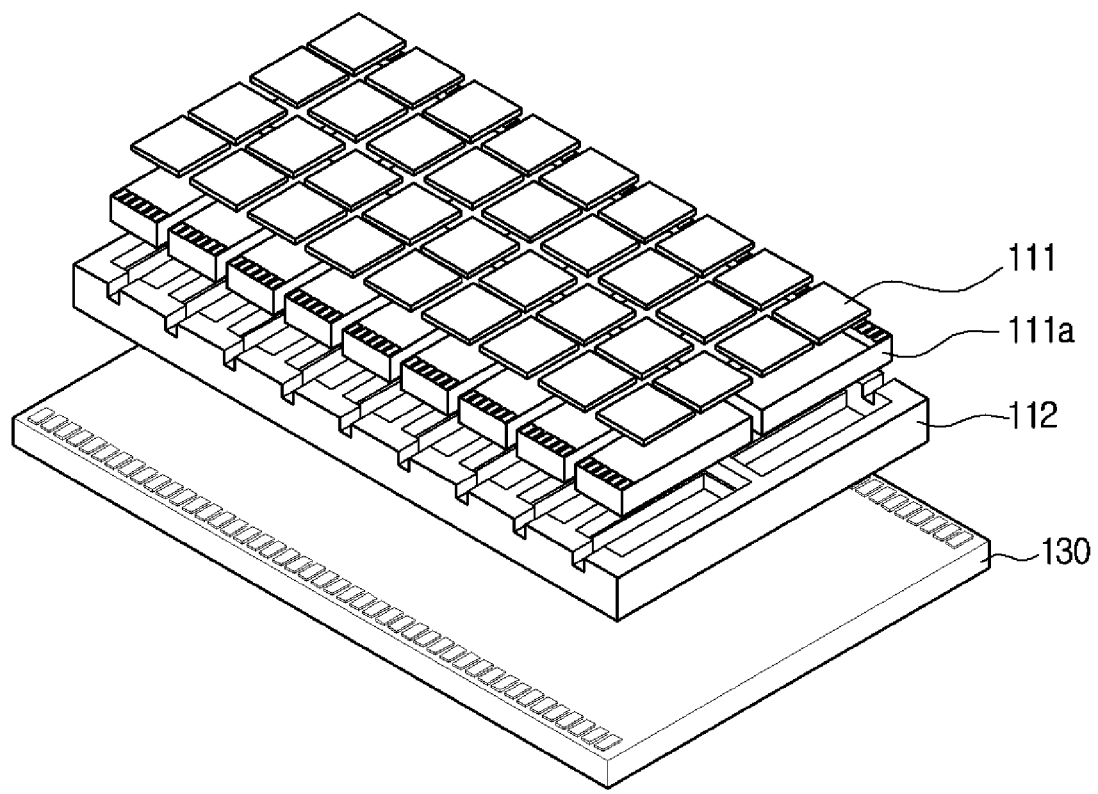
FIG. 10 is a diagram illustrating an ultrasound element of a capacitive micromachined ultrasonic transducer and tiles.

FIG. 10 is a diagram illustrating an ultrasound element of a capacitive micromachined ultrasonic transducer and tiles.

As illustrated in FIG. 10, when the ultrasound element 111 is implemented as the capacitive micromachined ultrasonic transducer, each of the ultrasound elements 111 may be mounted on an integrated circuit 111a. One or two or more ultrasound elements 111 may be installed on one integrated circuit 111a.

The integrated circuit 111a may support the ultrasound element 111, apply an electrical signal to the ultrasound element 111, drive the ultrasound element 111, and detect an ultrasound signal output from the ultrasound element 111. The integrated circuit 111a may be implemented, for example, as an application specific integrated circuit (ASIC).

The integrated circuit 111a may be designed such that at least one ultrasound element 111 is mounted on one surface, and may be electrically connected to the ultrasound element 111 by using a chip bonding method, such as, for example, flip-chip bonding.

The integrated circuit 111a having the ultrasound element 111 installed thereon may be installed on one surface of the ultrasound element installation unit 112.

When the integrated circuit 111a is mounted, the ultrasound element installation unit 112 may support and stably fix the ultrasound element 111 and the integrated circuit 111a.

The ultrasound element installation unit 112 has one surface having a portion on which the integrated circuit 111a may be mounted. As the portion, for example, a mounting groove (not illustrated) may be provided. The integrated circuit 111a may be inserted into and attached to the mounting groove, and thus mounted on the ultrasound element installation unit 112. The mounting groove of a predetermined pattern may be formed on one surface of the ultrasound element installation unit 112. The ultrasound element 111 and the integrated circuit 111a of a predetermined pattern may be arranged on the ultrasound element installation unit 112 according to an arrangement pattern of the mounting groove.

When the ultrasound element installation unit 112 is installed on the substrate 130 or the support frame 120, the plurality of ultrasound transceiving units 110 may be installed on the substrate 130 or the support frame 120.

Figure 11A:
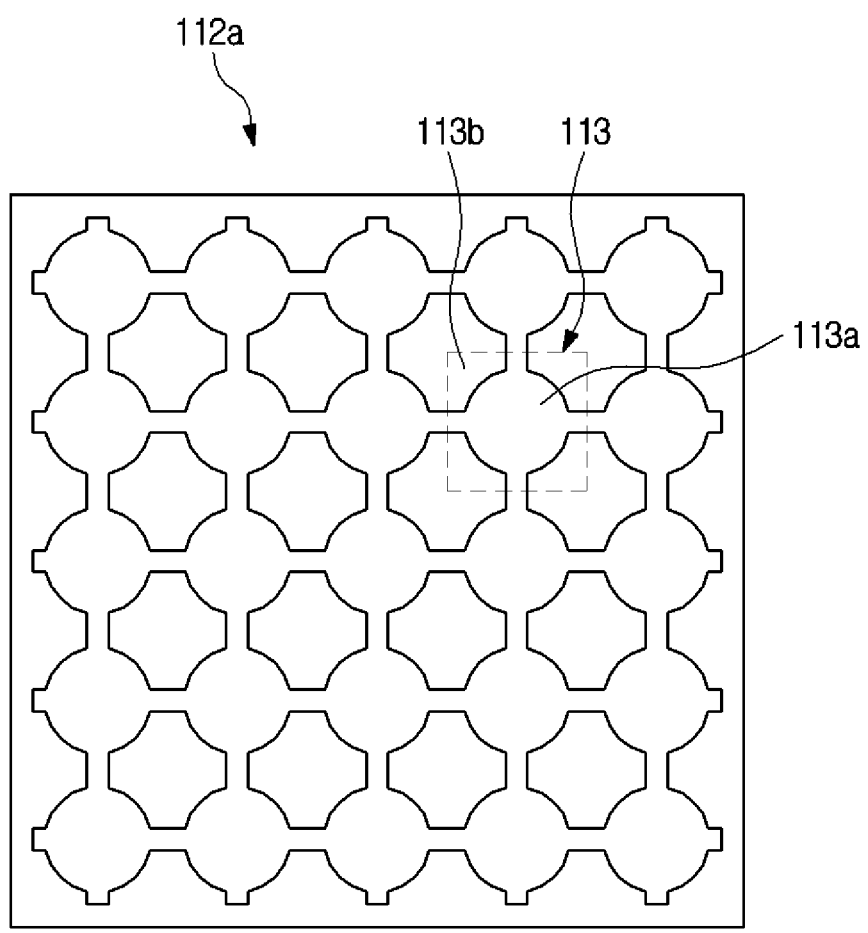
FIG. 11A is a plan view of a capacitive micromachined ultrasonic transducer.

FIG. 11A is a plan view of a capacitive micromachined ultrasonic transducer that may be used as an ultrasound element. FIG. 11B is a side cross-sectional view of a capacitive micromachined ultrasonic transducer.

Figure 11B:
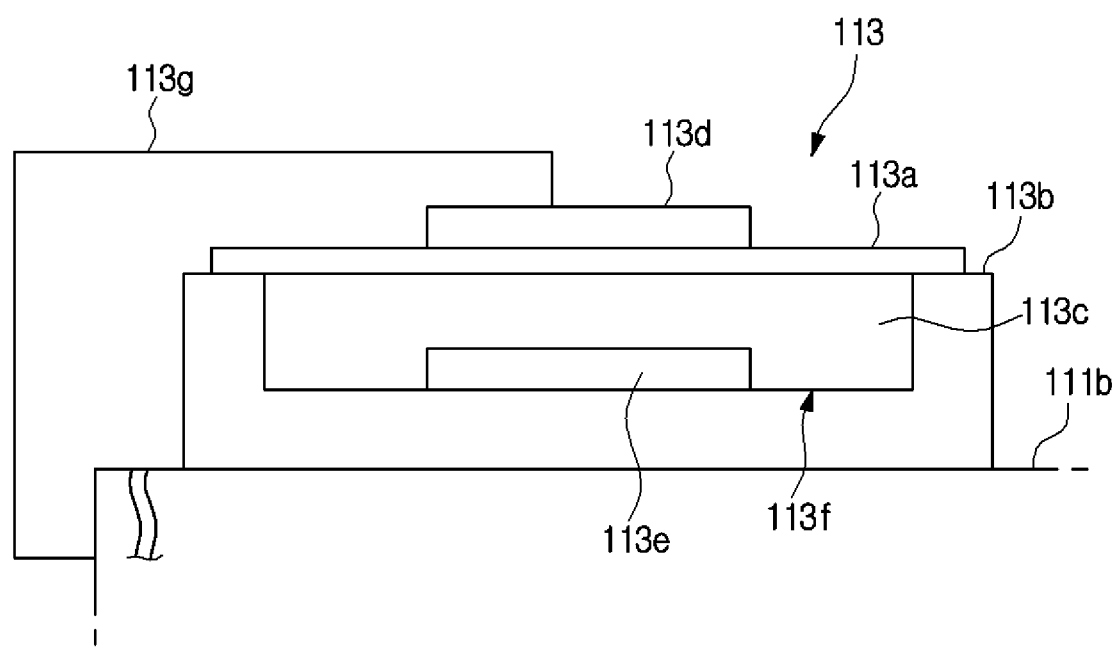
FIG. 11B is a side cross-sectional view of a capacitive micromachined ultrasonic transducer.

As illustrated in FIGS. 11A and 11B, the ultrasound element 111 using the capacitive micromachined ultrasonic transducer may include a plurality of cells 113 configured to receive ultrasound energy. The cells 113 of a uniform pattern may be arranged on the ultrasound element 111. For example, the plurality of cells 113 in the form of 5×5 matrix may be disposed on one surface of the ultrasound element 111.

The cell 113 may be implemented by using a membrane 113a, an insulator 113b, a vacuum gap 113c, a first electrode 113d and a second electrode 113e.

The membrane 113a has a shape of a thin film having a thickness of about several thousand angstroms (Å) and may be attached to the insulator 113b. As illustrated in FIG. 11A, the membrane 113a may have a circular shape when seen from the top. Further, depending on embodiments, the membrane 113a may have any of various shapes in addition to the illustration in FIG. 11A. The membrane 113a may be made of a material such as silicone.

The insulator 113b may have a portion that is recessed inwardly. The membrane 113a may be attached to the insulator 113b so as to seal the recessed portion. Accordingly, the vacuum gap 113c may be formed between the membrane 113a and the insulator 113b. The insulator 113b may be prepared using silicone, a silicon oxide or the like.

The vacuum gap 113c may be formed by the membrane 113a and the insulator 113b. A height between an inner bottom surface 113f of the vacuum gap 113c and the membrane 113a may have a very small level of several thousand angstroms (Å). The vacuum gap 113c may have a circular shape when seen from the top according to a shape of the membrane 113a.

The first electrode 113d, which is made of a metal capable of carrying a current, may be formed on one surface of the membrane 113a. The first electrode 113d may be installed on one surface of the membrane 113a that is not exposed to the vacuum gap 113c. The second electrode 113e may be formed on the inner bottom surface 113f of the insulator 113b. According to a bias voltage applied to the first electrode 113d and the second electrode 113e, the membrane 113a and the inner bottom surface 113f of the insulator 113b may form a capacitor.

When a voltage is applied to the first electrode 113d and the second electrode 113e according to a current delivered from the outside, an electric field is formed in the vacuum gap 113c, and the electric field formed in the vacuum gap 113c may apply a force to the membrane 113a. Therefore, the membrane 113a vibrates. The number of vibrations of the membrane 113a may vary based on a level of an applied voltage. According to such vibrations of the membrane 113a, ultrasound energy is generated in the cell 113.

Conversely, when ultrasound energy is delivered to the membrane 113a from the outside, the membrane 113a vertically vibrates according to the delivered ultrasound energy. Therefore, a capacitance between the membrane 113a and an inner bottom surface of the insulator 113b may be changed. When the capacitance is changed, a voltage between the first electrode 113d and the second electrode 113e is changed instantaneously, and a current is induced in a conducting wire 113g connecting the first electrode 113d and the second electrode 113e. Therefore, an electrical signal, that is, an ultrasound signal, may be obtained.

The obtained ultrasound signal may be delivered to the processor 210 of the main body 200 via the conducting wire 108 and the cable 93 that are electrically connected to the printed circuit substrate 130, as illustrated in FIG. 5.

When the ultrasonic probe 100 and the main body 200 are integrally implemented, the obtained ultrasound signal may be delivered to the processor 210 via an electronic circuit or the like. When the ultrasonic probe 100 and the main body 200 are integrally implemented in this manner, the ultrasonic probe 100 may autonomously generate an ultrasound image.

Hereinafter, the main body 200 will be described.

As illustrated in FIG. 5, the main body 200 may include the processor 210, a storage device 219 and a control unit (also referred to herein as a "controller") 220.

The processor 210 may include a transmission focusing unit (also referred to herein as a "transmission focuser") 211a, a pulser 211, an amplifier (AMP) 212, an analog-to-digital converter (ADC) 213, a virtual signal generating unit (also referred to herein as a "virtual signal generator") 214, a delay unit (echo delay) (also referred to herein as a "delayer") 215, a receiving end focusing unit (RX focusing unit) (also referred to herein as a "receiving end focuser" or an "RX focuser") 216, a signal processing unit (also referred to herein as a "signal processor") 217 and an image processing unit (also referred to herein as an "image processor") 218.

The transmission focusing unit 211a enables ultrasound energy that is irradiated from the transmitting element 110a to be focused on a specific point, for example, the target area 98, or may steer irradiated ultrasound energy. For example, the transmission focusing unit 211a enables a voltage to be applied to each transmitting element 110a at a different time, and thus regulate focusing and steering of the ultrasound energy.

The pulser 211 may generate a voltage for driving the ultrasound transmitting element 110a of the ultrasound transceiving unit 110 and deliver the generated voltage to the ultrasound transceiving unit 110. The ultrasound transceiving unit 110 may generate ultrasound energy according to the voltage output from the pulser 211. A frequency and an intensity of the ultrasound energy generated in the ultrasound transceiving unit 110 may be determined by an amplitude and a frequency of the voltage generated in the pulser 211. The voltage output from the pulser 211 may be applied to the ultrasound transceiving unit 110 with a constant time difference. Therefore, the ultrasound energy generated in the ultrasound transceiving unit 110 may be focused on the target area 98 or may be steered in a predetermined direction. When the capacitive micromachined ultrasonic transducer is used, the voltage applied from the pulser 211 may be delivered to the first electrode 113d or the second electrode 113e in order to vibrate the membrane 113a.

The amplifier 212 may amplify a voltage level of an ultrasound signal output from the ultrasound receiving element 110b of the ultrasound transceiving unit 110. A gain of the amplifier 212 may be arbitrarily determined by the system designer or the user. Depending on embodiments, the amplifier 212 may variably amplify ultrasound signals of the plurality of channels output from the plurality of ultrasound transceiving units 110, and compensate for an intensity difference between respective ultrasound signals of the plurality of channels. For example, the amplifier 212 may perform time gain compensation (TGC) or depth gain compensation (DGC). The amplified signal may be delivered to an analog-to-digital converter 213.

When the amplified ultrasound signal is an analog signal, the analog-to-digital converter (ADC) 213 may convert the analog signal into a digital signal. The analog-to-digital converter 213 may sample an analog ultrasound signal according to a predetermined sampling rate and obtain and output a digital signal. According to an exemplary embodiment, the analog-to-digital converter 213 may digitize and output a voltage of the analog ultrasound signal.

The digital-converted signal may be delivered to at least one of the virtual signal generating unit 214 and the delay unit 215.

Figure 12:
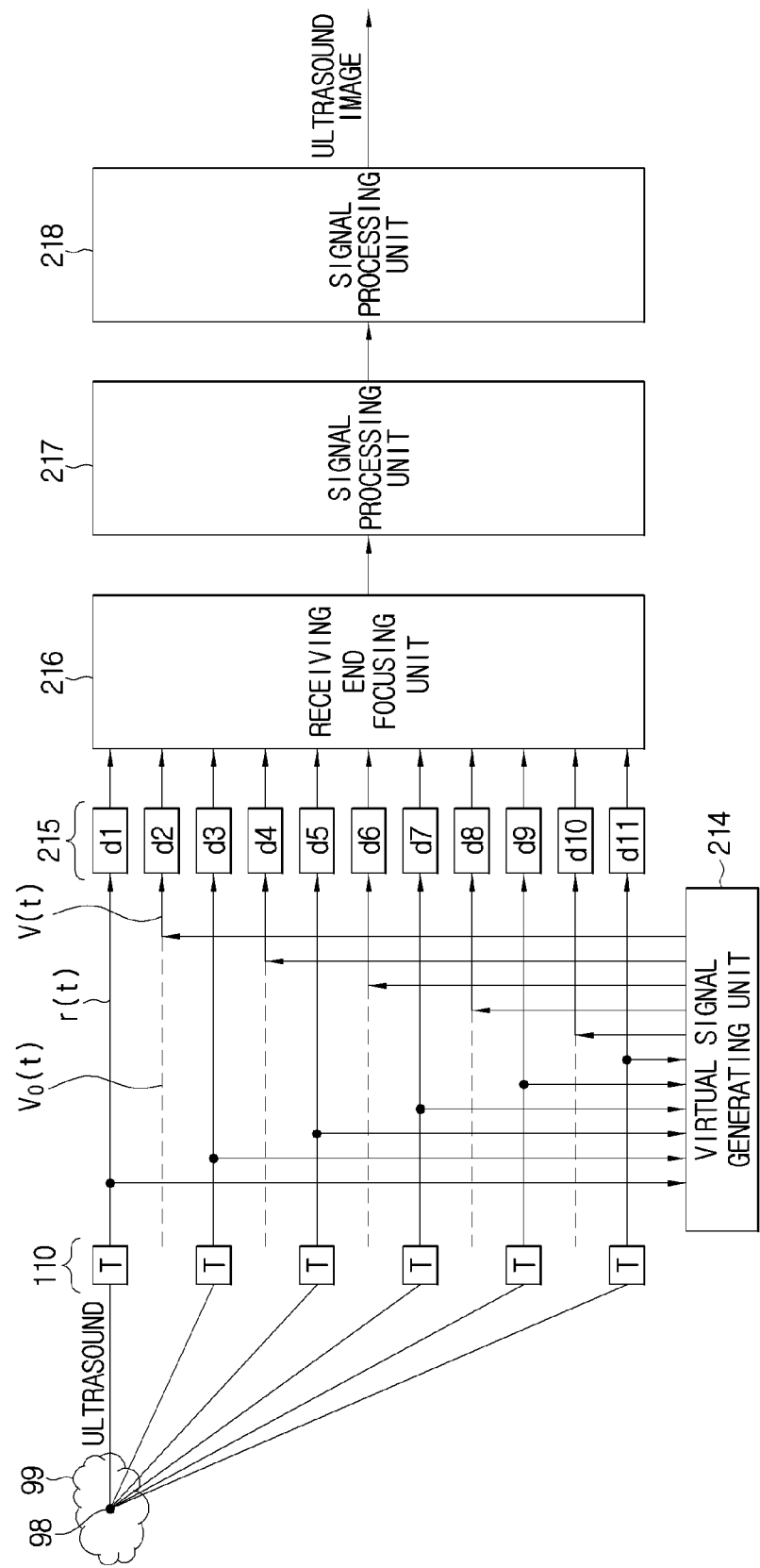
FIG. 12 is a diagram illustrating a process that is performed in a main body.
Figure 13:
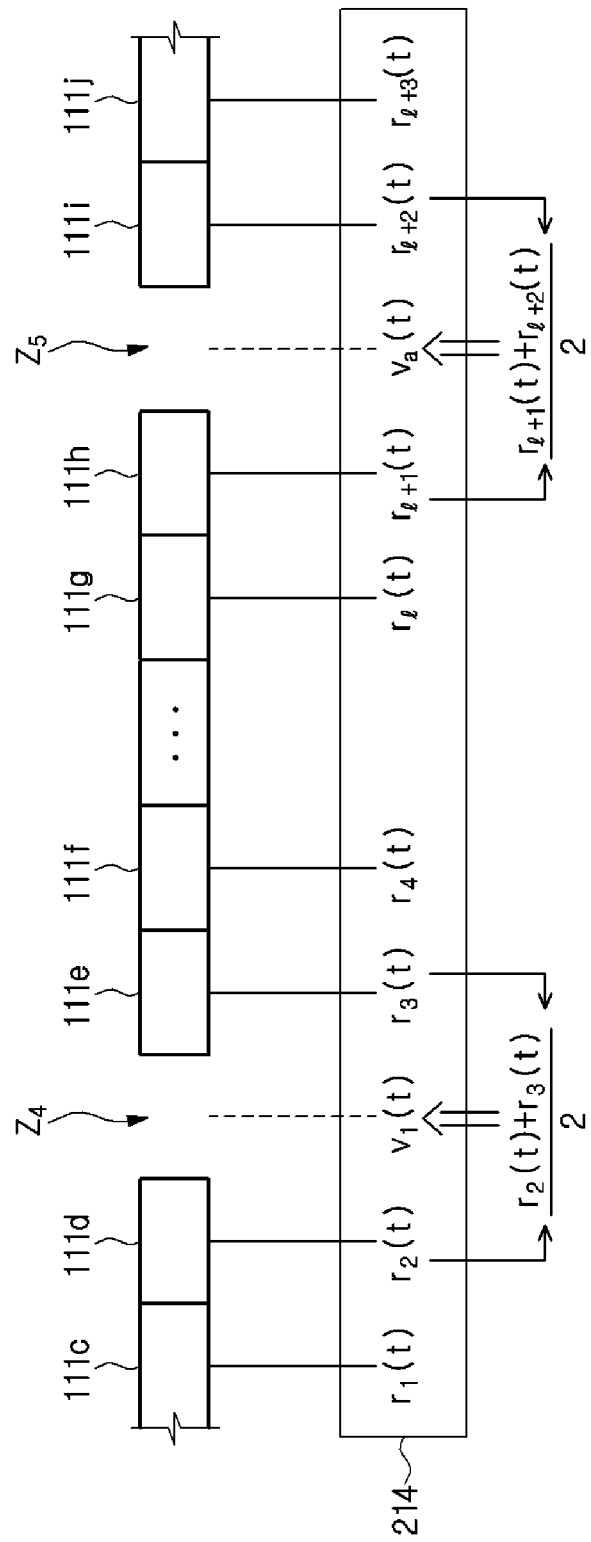
FIG. 13 is a diagram illustrating an actual ultrasound signal output from an ultrasound element and a virtual ultrasound signal.

FIG. 12 is a diagram illustrating a process that is performed in a main body. FIG. 13 is a diagram illustrating an actual ultrasound signal output from an ultrasound element and a virtual ultrasound signal.

In FIG. 12, r(t) denotes an electrical signal actually output from the ultrasound element, and v(t) denotes a virtual ultrasound signal. $v_0(t)$ denotes a virtual channel that corresponds to the generated virtual ultrasound signal v(t). Actually, there is no virtual channel in the ultrasound apparatus.

In FIG. 13, each of $r_1(t)$ to $r_{l+3}(t)$ denotes a respective ultrasound signal output from each of corresponding ultrasound elements 111c to 111j. In this case, $r_1(t)$ to $r_{l+3}(t)$ may denote, for example, a voltage that is sampled from the respective analog ultrasound signal output from each of the corresponding ultrasound elements 111c to 111j. $v_1(t)$ to $v_a(t)$ denote ultrasound signals that correspond to gaps z4 and z5, respectively. Further, in FIG. 13, adjacent ultrasound elements, for example, third to (l+1)-th ultrasound elements 111e to 111h, refer to ultrasound elements that are installed in the same ultrasound element installation unit. Non-adjacent ultrasound elements that are separated, for example, second and third ultrasound elements 111d and 111e, refer to ultrasound elements that are installed in different ultrasound element installation units.

As illustrated in FIG. 12, a signal r(t) output from the ultrasound transceiving unit 110 may be delivered to both the virtual signal generating unit 214 and the delay unit 215.

The virtual signal generating unit 214 may generate a virtual ultrasound signal v(t) based on the ultrasound signal r(t) output from the ultrasound transceiving unit 110. In particular, the virtual signal generating unit 214 may use any of various estimation methods to estimate and obtain the virtual ultrasound signal v(t).

The virtual signal generating unit 214 may include a storage device (not illustrated) that is capable of storing the ultrasound signal delivered from the ultrasound transceiving unit 110 temporarily or non-temporarily. Such a storage device may be implemented using any of a semiconductor chip, a magnetic disk or the like. The storage device may store the ultrasound signal and at the same time further store a time at which the ultrasound signal is received or a time at which the ultrasound signal is delivered to the virtual signal generating unit 214 as metadata.

As illustrated in FIG. 13, since no signal is output from the gap z4 or z5 between the ultrasound elements 111d and 111e or 111h and 111i, there are no ultrasound signals that correspond to the gap z4 or z5. Therefore, values of $v_1(t)$ to $v_a(t)$ become equal to zero. In order to compensate for a signal loss generated due to such gaps z4 and z5, the virtual signal generating unit 214 may generate one or more virtual ultrasound signals.

The virtual signal generating unit 214 may determine virtual ultrasound signals that correspond to one or two or more virtual channels for each of the gaps z4 and z5. Depending on embodiments, the virtual signal generating unit 214 may determine first the number of channels of the virtual ultrasound signal that correspond to one gap z4 or z5 according to the user's selection or predefined settings, and then generate virtual ultrasound signals of the determined number of channels.

According to an exemplary embodiment, the virtual signal generating unit 214 may use only ultrasound signals $r_2(t)$ and $r_3(t)$ or $r_{l+1}(t)$ and $r_{l+2}(t)$ output from the ultrasound elements 111d and 111e or 111h and 111i that are adjacent to the gap z4 or z5 in order to generate the virtual ultrasound signal.

According to another exemplary embodiment, the virtual signal generating unit 214 may use ultrasound signals $r_1(t)$ and $r_4(t)$ or $r_l(t)$ and $r_{l+3}(t)$ output from the ultrasound elements 111c and 111f or 111g and 111j that are distant from the gap z4 or z5 to some extent in order to generate the virtual ultrasound signal.

According to still another exemplary embodiment, the virtual signal generating unit 214 may use both ultrasound signals $r_2(t)$ and $r_3(t)$ or $r_{l+1}(t)$ and $r_{l+2}(t)$ output from the ultrasound elements 111d and 111e or 111h and 111i adjacent to the gap z4 or z5, and ultrasound signals $r_1(t)$ and $r_4(t)$ or $r_l(t)$ and $r_{l+3}(t)$) output from the ultrasound elements 111c and 111f or 111g and 111j that are distant from the gap z4 or z5 to some extent in order to generate the virtual ultrasound signal.

Various methods of the virtual signal generating unit 214 obtaining the virtual ultrasound signal will be described below. In the following exemplary embodiments, exemplary embodiments of a method of obtaining the virtual ultrasound using representatively ultrasound signals $r_2(t)$ and $r_3(t)$ or $r_{l+1}(t)$ and $r_{l+2}(t)$ output from the ultrasound elements 111d and 111e or 111h and 111i adjacent to the gap z4 or z5 will be described.

Figure 14:
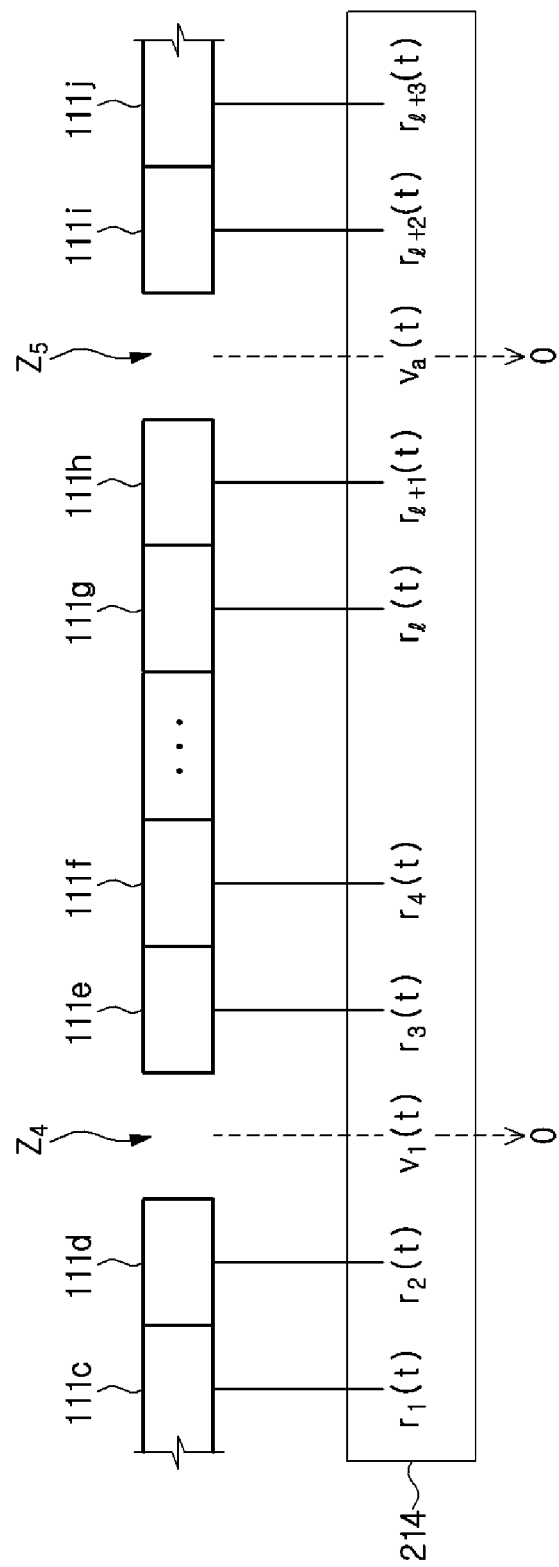
FIG. 14 is a diagram illustrating a first exemplary embodiment of an operation of a virtual signal generating unit.

FIG. 14 is a diagram illustrating a first exemplary embodiment of an operation of a virtual signal generating unit.

As illustrated in FIG. 14, the virtual signal generating unit 214 may obtain a virtual ultrasound signal $v_1(t)$ of one virtual channel that corresponds to the gap z4 or z5. In this case, according to the exemplary embodiment, the virtual signal generating unit 214 may calculate an average value of ultrasound elements (for example, 111d and 111e) of different ultrasound element installation units use the calculated average value to calculate and obtain the virtual ultrasound signal $v_1(t)$ of a virtual channel. For example, the virtual signal generating unit 214 may calculate an average of ultrasound signals $r_2(t)$ and $r_3(t)$ output from the second ultrasound element 111d and the third ultrasound element 111e adjacent to the first gap z4 according to the following Equation 1, and obtain the virtual ultrasound signal $v_1(t)$ that corresponds to the first gap z4.

$$v_1(t) = \frac{r_2(t) + r_3(t)}{2}$$ [Equation 1]

Similarly, a virtual ultrasound signal that corresponds to the second gap z5 may be obtained by calculating an average of ultrasound signals $r_{l+1}(t)$ and $r_{l+2}(t)$ output from the ultrasound elements 111h and 111i adjacent to the second gap z5.

Figure 15:
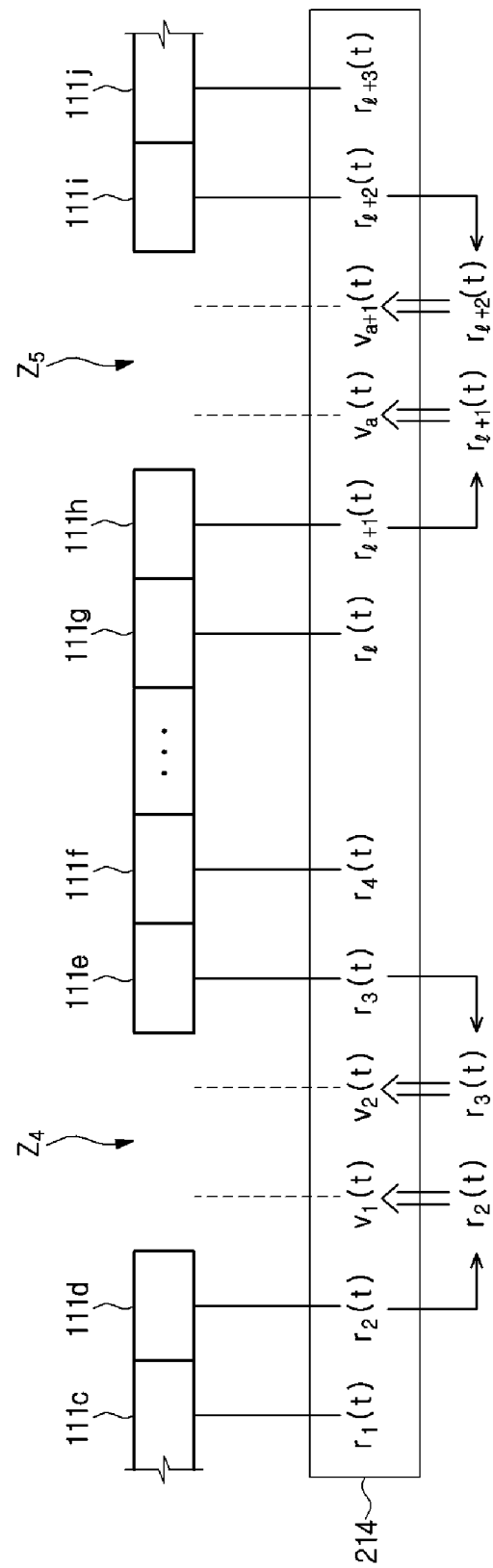
FIG. 15 is a diagram illustrating a second exemplary embodiment of the operation of the virtual signal generating unit.

FIG. 15 is a diagram illustrating a second exemplary embodiment of the operation of the virtual signal generating unit.

As illustrated in FIG. 15, the virtual signal generating unit 214 may obtain the virtual ultrasound signals $v_1(t)$ and $v_2(t)$ or $v_3(t)$ and $v_4(t)$ of two virtual channels for each of the gaps z4 and z5. In this case, according to the exemplary embodiment, the virtual signal generating unit 214 may assume ultrasound elements of different ultrasound element installation units, for example, ultrasound signals $r_2(t)$ and $r_3(t)$ or $r_{l+1}(t)$ and $r_{l+2}(t)$ adjacent to the gap z4 or z5 as virtual ultrasound signals $v_1(t)$ and $v_2(t)$ or $v_3(t)$ and $v_4(t)$), and thus obtain virtual ultrasound signals $v_1(t)$ and $v_2(t)$ or $v_3(t)$ and $v_4(t)$ of the gap z4 or z5.

Figure 16:
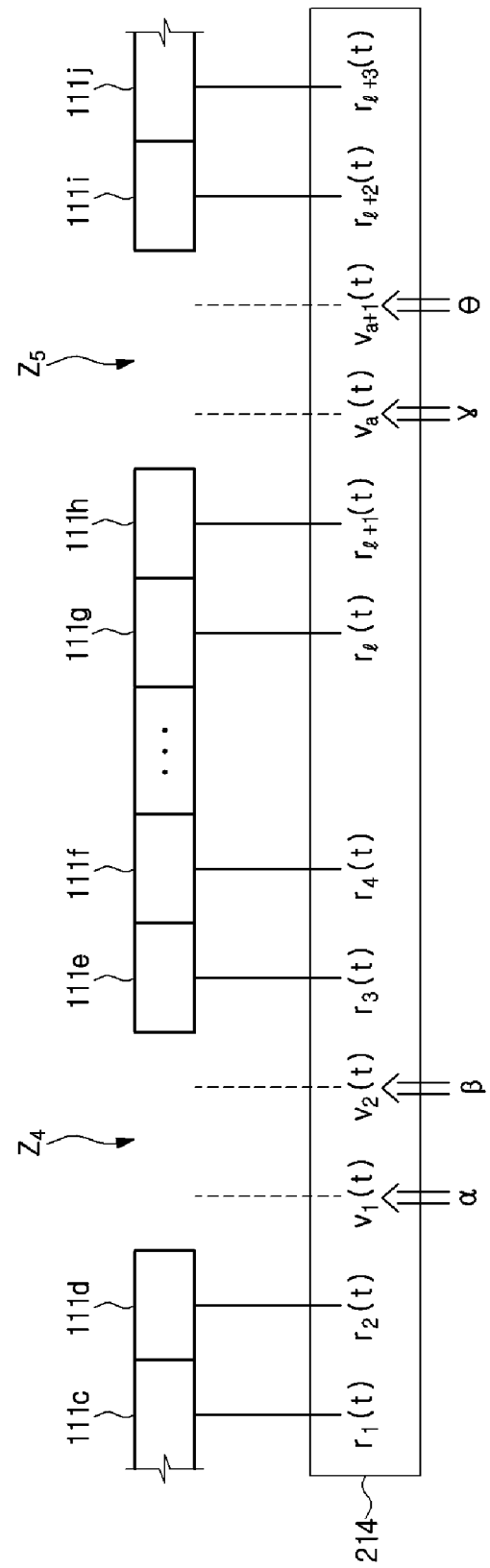
FIG. 16 is a diagram illustrating a third exemplary embodiment of the operation of the virtual signal generating unit.
Figure 17:
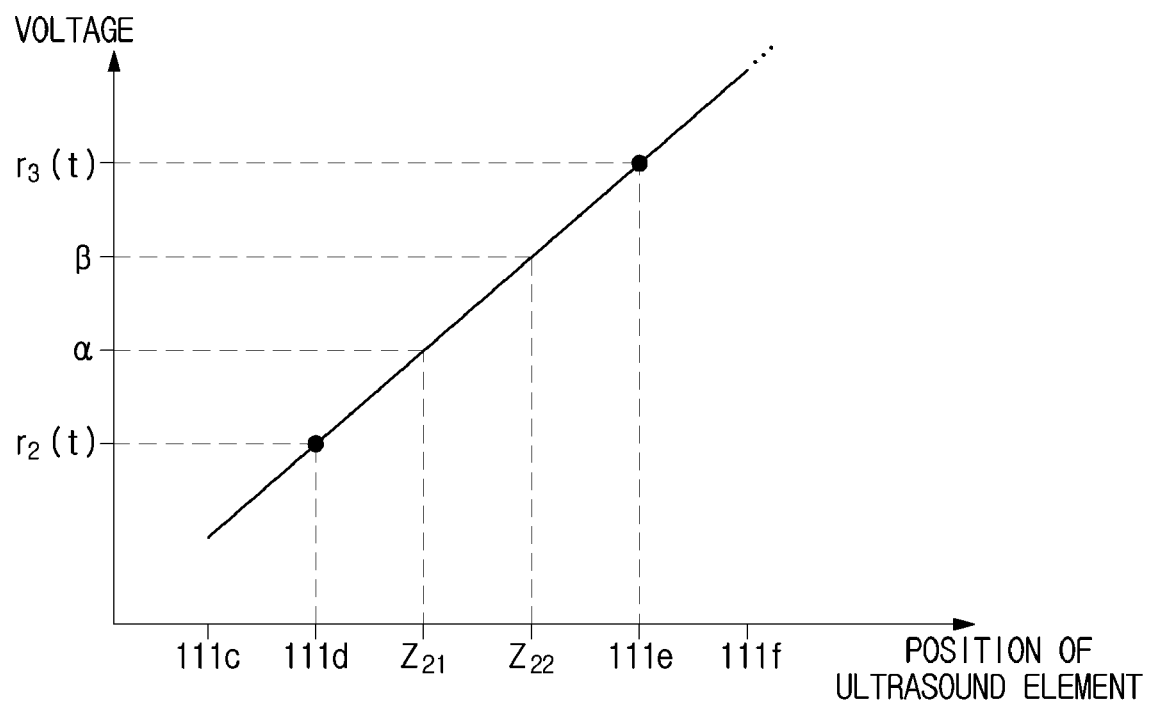
FIG. 17 shows the graph of a third exemplary embodiment of the operation of the virtual signal generating unit.

FIG. 16 is a diagram illustrating a third exemplary embodiment of the operation of the virtual signal generating unit. FIG. 17 shows the graph of a third exemplary embodiment of the operation of the virtual signal generating unit. In the graph in FIG. 17, points along an x axis indicate a relative position of an ultrasound element with respect to a predetermined reference point, and $z_{21}$ and $z_{22}$ indicate a position of a virtual ultrasound element that corresponds to a virtual ultrasound channel. Here, the predetermined reference point is arbitrary. For convenience of description, intervals between actual ultrasound elements and virtual ultrasound elements on the x axis may be the same.

When virtual ultrasound signals $v_1(t)$ and $v_2(t)$ or $v_3(t)$ and $v_4(t)$ of two virtual channels that correspond to the gap z4 or z5 are obtained, the virtual signal generating unit 214 may perform at least one interpolation based on ultrasound elements of different ultrasound element installation units, for example, ultrasound signals $r_2(t)$ and $r_3(t)$ or $r_{l+1}(t)$ and $r_{l+2}(t)$ adjacent to the gap z4 or z5, and obtain virtual ultrasound signals $v_1(t)$ and $v_2(t)$ or $v_3(t)$ and $v(t)$ of two virtual channels that correspond to the gap z4 or z5.

For example, as illustrated in FIGS. 16 and 17, the virtual signal generating unit 214 may obtain virtual ultrasound signals $v_1(t)$ and $v_2(t)$ or $v_3(t)$ and $v(t)$ of two virtual channels by using linear interpolation. The linear interpolation refers to interpolation of obtaining a value at any position between two points or surfaces when there are two points or surfaces in n dimensions (n is a natural number).

As illustrated in FIG. 16 and FIG. 17, in order to obtain virtual ultrasound signals $v_1(t)$ and $v_2(t)$ of two virtual channels with respect to the gap z4, the virtual signal generating unit 214 may obtain a straight line or a curved line that passes through ultrasound signals $r_2(t)$ and $r_3(t)$ output from the ultrasound elements 111d and 111e adjacent to the gap z4, obtain voltages α and β at points that correspond to two virtual ultrasound elements $z_{21}$ and $z_{22}$ along the straight line or the curved line, and thus obtain virtual ultrasound signals $v_1(t)$ and $v_2(t)$.

While FIGS. 16 and 17 illustrate an example in which linear interpolation is used for two virtual channels, the number of virtual channels is not limited thereto. Even when the number of virtual channels is one or three or more, linear interpolation may be used.

As another example, the virtual signal generating unit 214 may use any of various types of interpolation, such as cubic interpolation, bilinear interpolation, bicubic interpolation or Lanczos interpolation, and obtain a virtual ultrasound signal of one or two or more virtual channels based on a result of the interpolation.

FIGS. 18A, 18B, 18C, 18D, and 18E are diagrams illustrating a fourth exemplary embodiment of the operation of the virtual signal generating unit. The mark "⊗" used in FIGS. 18C and 18E refers to an operation and/or a calculation that may be defined by the system designer. Here, the calculation may include an average calculating formula or formulae of various types of interpolation.

The virtual signal generating unit 214 may use temporal interpolation to obtain virtual ultrasound signals $v_1(t)$ and $v_2(t)$. Specifically, the temporal interpolation is interpolation in which ultrasound signals are received at the ultrasound elements 111c to 111j at different times, that is, a first time t1 and a second time t2, or ultrasound signals delivered to the virtual signal generating unit 214 are used to obtain virtual ultrasound signals $v_1(t)$ and $v_2(t)$.

Figure 18A:
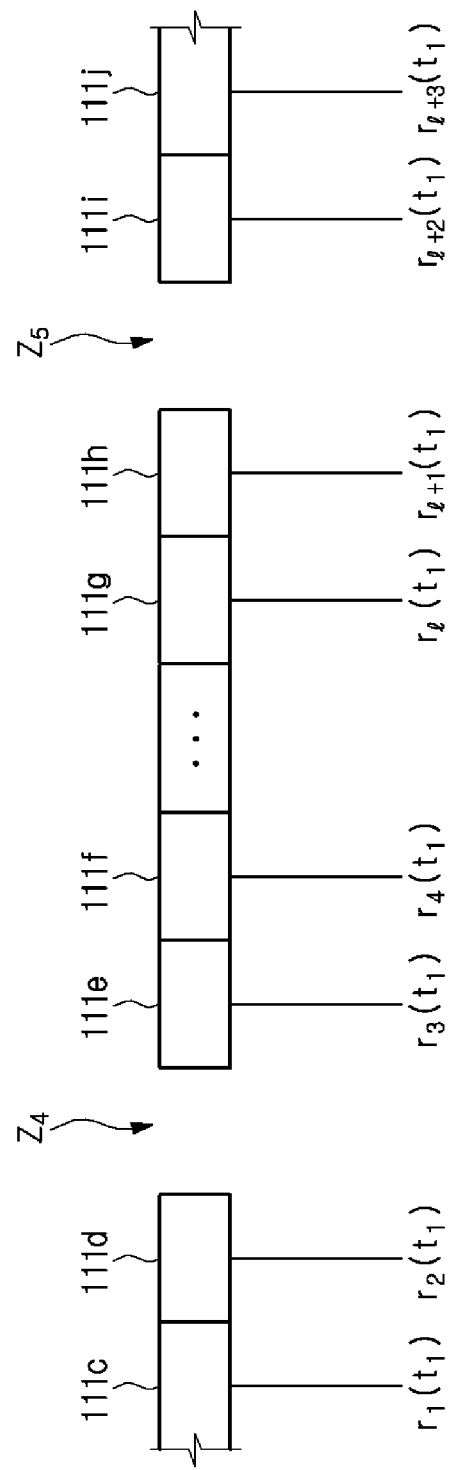
FIGS. 18A, 18B, 18C, 18D, and 18E are diagrams illustrating a fourth exemplary embodiment of the operation of the virtual signal generating unit.
Figure 18B:
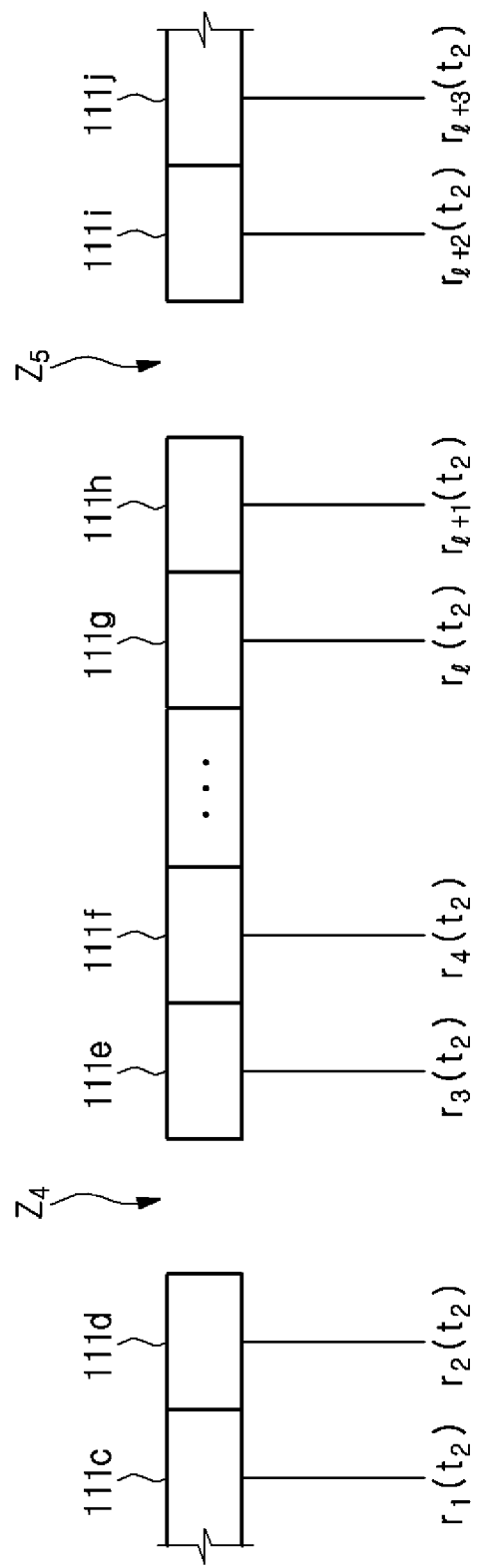

For example, as illustrated in FIGS. 18A and 18B, ultrasound signals $r_1(t1)$ to $r_{l+3}(t1)$ may be obtained at the first time t1, and ultrasound signals $r_1(t2)$ to $r_{l+3}(t2)$ may be obtained at the second time t2 after a predetermined time elapses.

Figure 18C:
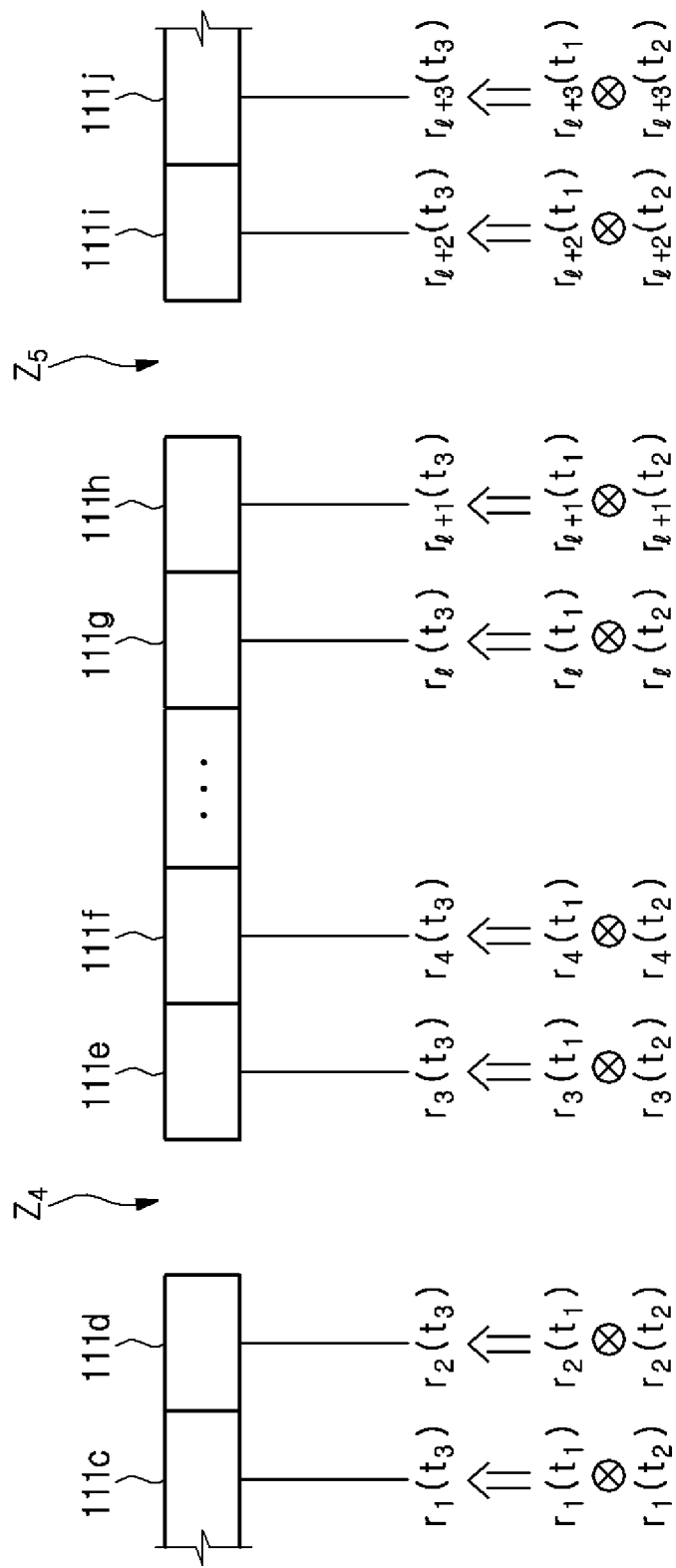

Then, as illustrated in FIG. 18C, ultrasound signals $r_1(t1)$ to $r_{l+2}(t1)$ obtained at the first time t1 and ultrasound signal $r_1(t2)$ to $r_{l+3}(t2)$ obtained at the second time t2 corresponding thereto may be used to obtain virtual ultrasound signals $r_1(t3)$ to $r_{l+3}(t3)$ at a third time t3 between the first time t1 and the second time t2. In this case, the obtained virtual ultrasound signal is not a virtual ultrasound signal of an actually non-existent channel, but a virtual ultrasound signal that corresponds to the actual ultrasound elements 111c to 111j at the specific time t3 at which an actual ultrasound signal is not collected. Obtaining of virtual ultrasound signals $r_1(t3)$ to $r_{l+3}(t3)$ at the third time t3 may be performed using the above interpolation technique or the like.

Figure 18D:
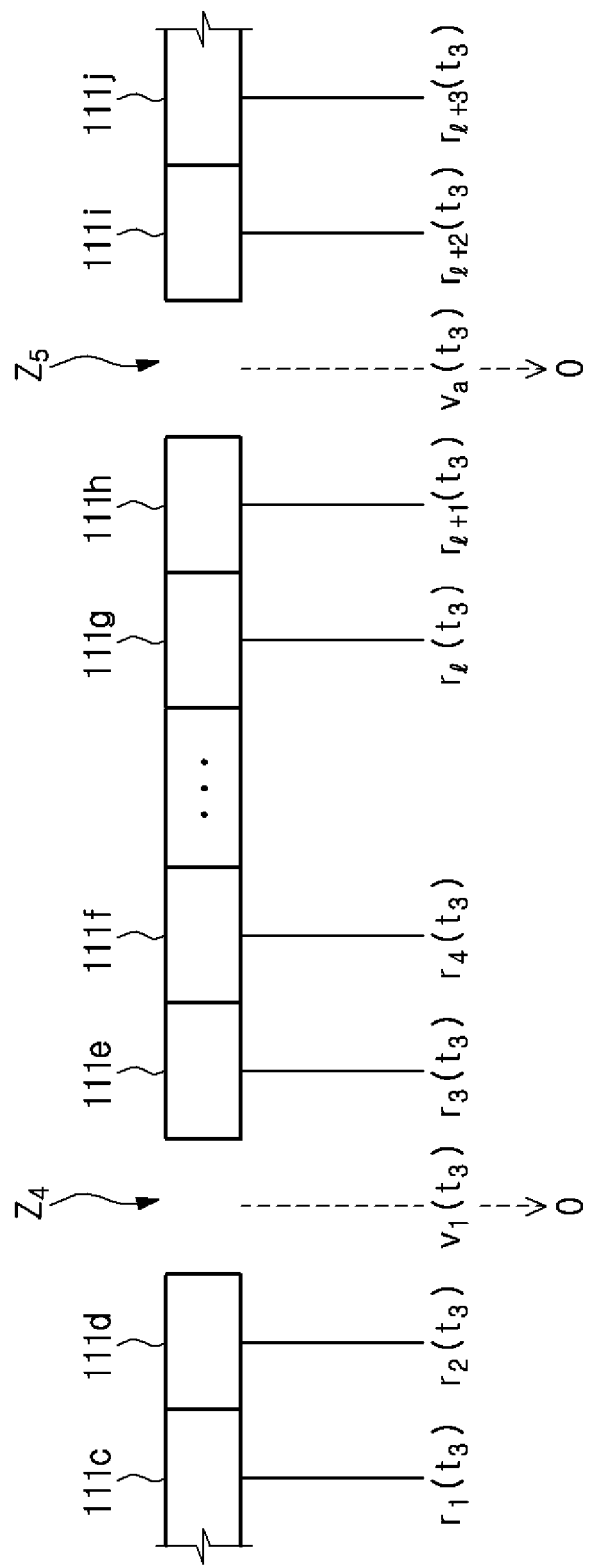
Figure 18E:
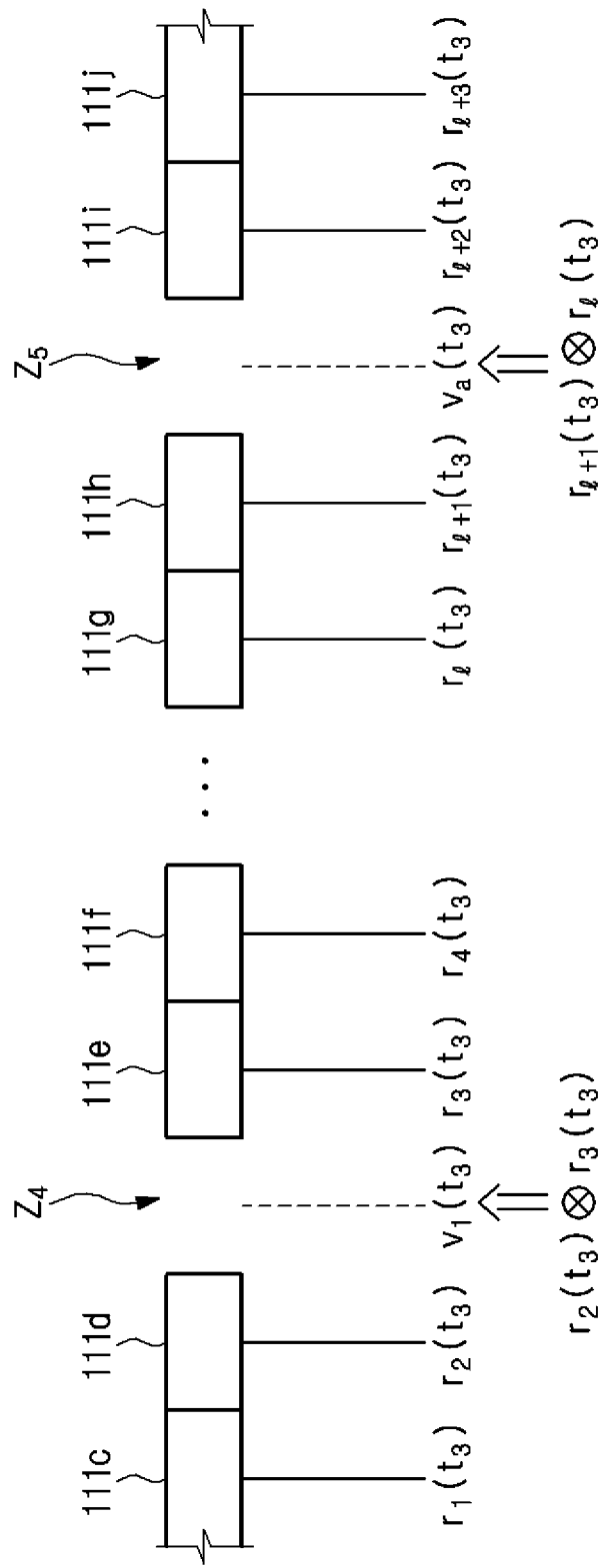

When virtual ultrasound signals $r_1(t3)$ to $r_{l+3}(t3)$ at the third time t3 are obtained in this manner, as illustrated in FIG. 18D, a virtual ultrasound signal $v_1(t3)$ at the third time t3 with respect to the gap z4 is obviously zero. The virtual signal generating unit 214 may perform the above interpolation operation on virtual ultrasound signals $r_1(t3)$ to $r_{l+3}(t3)$ obtained at the third time t3 or calculate an average value between ultrasound signals, and thus obtain the virtual ultrasound signal $v_1(t3)$ with respect to the gap z4 at the third time t3.

Figure 19A:
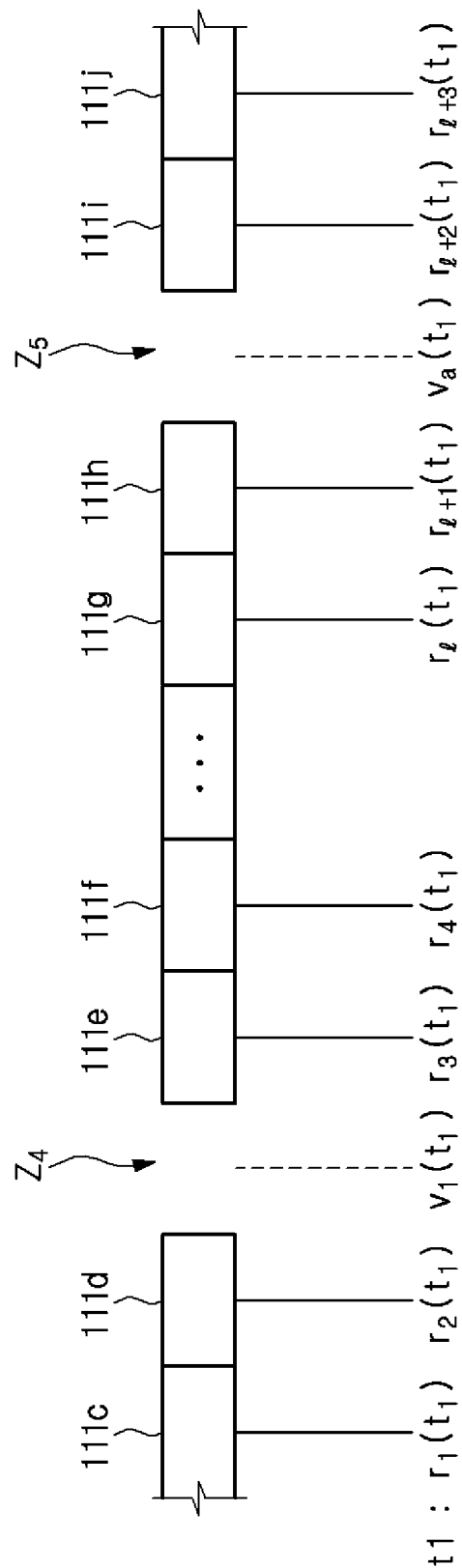
FIGS. 19A, 19B, and 19C are diagrams illustrating a fifth exemplary embodiment of the operation of the virtual signal generating unit.
Figure 19B:
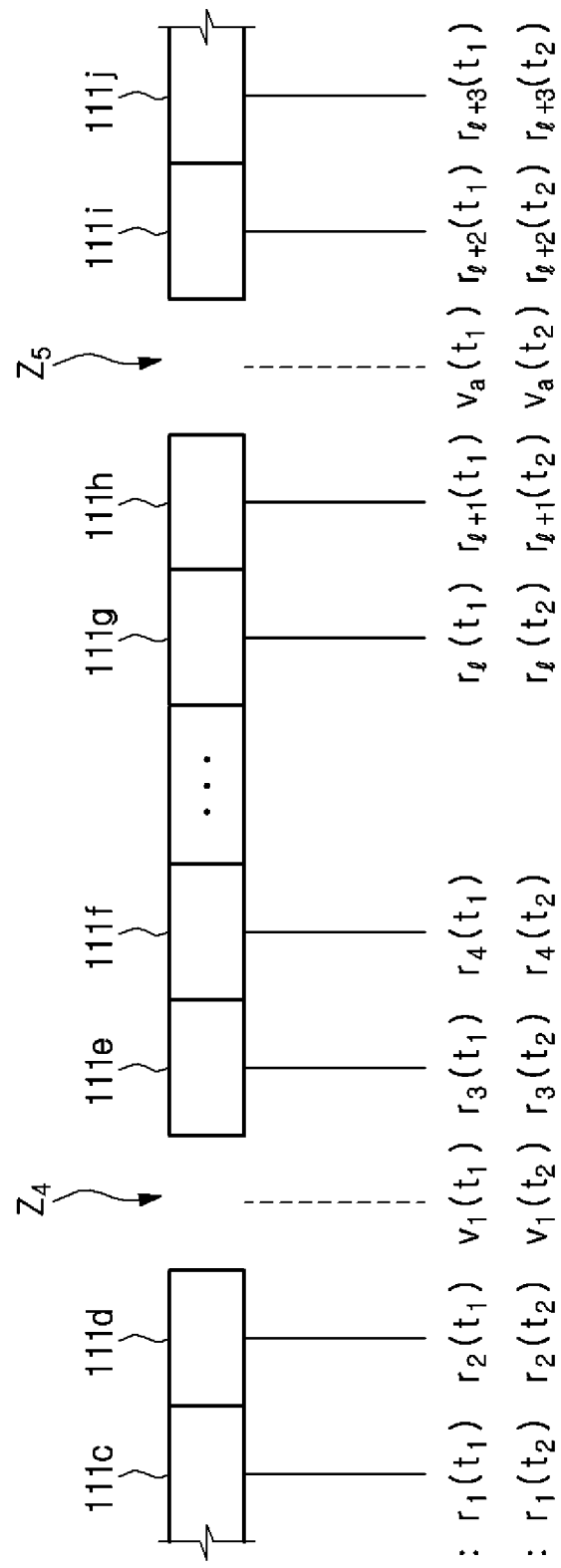
Figure 19C:
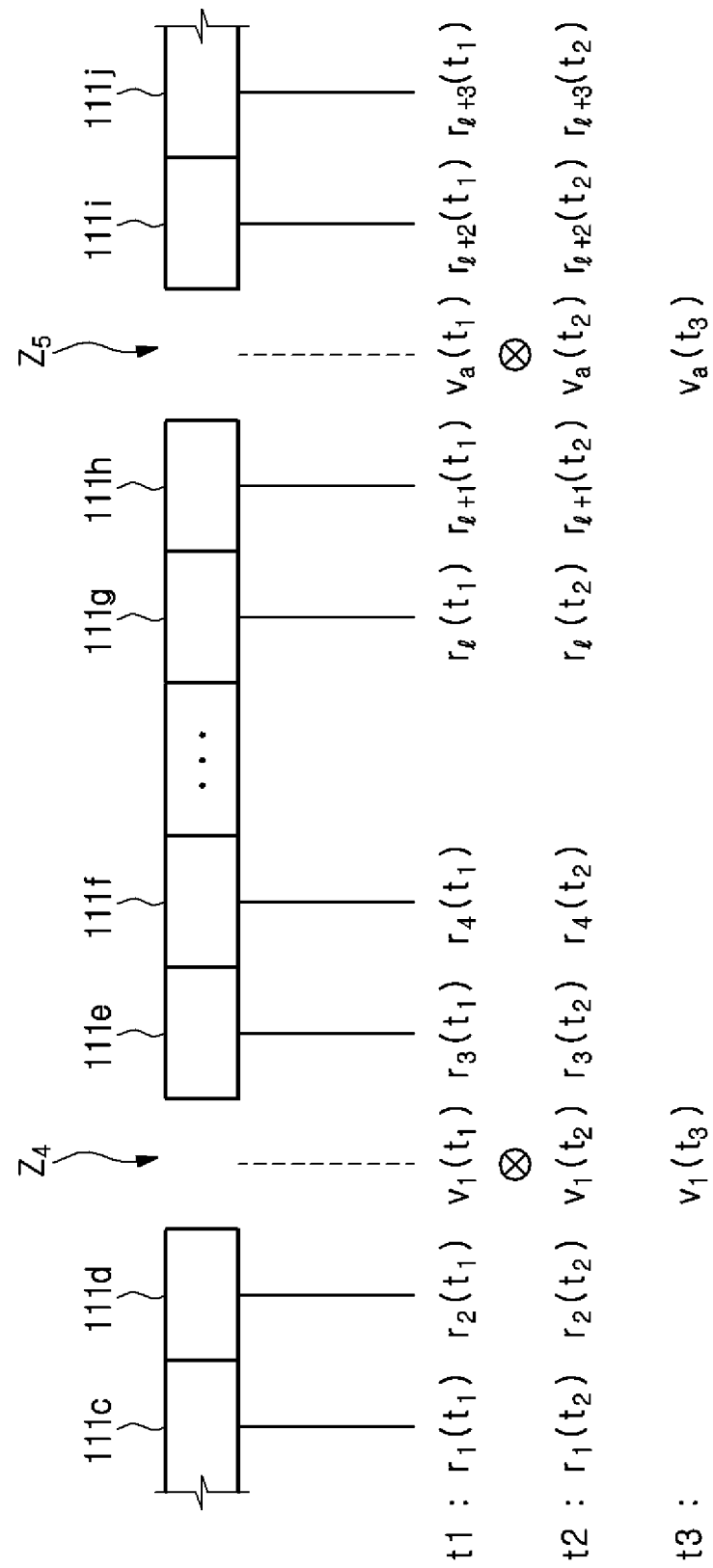

FIGS. 19A, 19B, and 19C are diagrams illustrating a fifth exemplary embodiment of the operation of the virtual signal generating unit. The mark "⊗" used in FIG. 19C refers to an operation and/or a calculation that may be defined by the system designer.

As illustrated in FIGS. 19A, 19B, and 19C, first, the virtual signal generating unit 214 may receive ultrasound signals $r_1(t1)$ to $r_{l+3}(t1)$ at the first time t1. The virtual signal generating unit 214 may use the delivered ultrasound signals, for example, a second ultrasound signal $r_2(t1)$ and a third ultrasound signal $r_3(t1)$, and obtain a virtual ultrasound signal $v_1(t1)$ corresponding to the gap z4. As described above, obtaining of the virtual ultrasound signal $v_1(t1)$ may be performed by using interpolation, by calculating an average value, or by determining a specific ultrasound signal as the virtual ultrasound signal $v_1(t1)$.

At least one of the delivered ultrasound signals $r_1(t1)$ to $r_{l+3}(t1)$ and the virtual ultrasound signals $v_1(t1)$ and $v_2(t1)$ may be temporarily or non-temporarily stored in a storage device such as a random access memory (RAM) provided in the virtual signal generating unit 214.

Then, when a new ultrasound signal is delivered at the second time t2, the virtual signal generating unit 214 may obtain a virtual ultrasound signal $v_1(t2)$ at the second time t2 by using the newly delivered ultrasound signal, for example, $r_2(t2)$ and $r_3(t2)$, as described above.

When virtual ultrasound signals $v_1(t1)$ and $v_1(t2)$ at the first time t1 and the second time t2 are obtained, the virtual signal generating unit 214 may obtain a virtual ultrasound signal $v_1(t3)$ at the third time t3 based on virtual ultrasound signals $v_1(t1)$ and $v_1(t2)$ at the first time t1 and the second time t2. In this case, as described above, obtaining of the virtual ultrasound signal $v_1(t3)$ may be performed by using interpolation, by calculating an average value, or by determining either of virtual ultrasound signals $v_1(t1)$ and $v_1(t2)$ at the first time t1 and the second time t2 as the virtual ultrasound signal $v_1(t3)$ at the third time t3.

An exemplary embodiment in which the virtual signal generating unit 214 uses ultrasound elements adjacent to the gap z4, for example, the second ultrasound element 111d and the third ultrasound element 111e and generates a virtual ultrasound signal, has been described above. However, the virtual signal generating unit 214 may generate a virtual ultrasound signal using more various ultrasound signals in addition to the above exemplary embodiment.

For example, the virtual signal generating unit 214 may use ultrasound signals output from ultrasound elements adjacent to the gap z4, for example, more ultrasound elements in addition to the second ultrasound element 111d and the third ultrasound element 111e, and generate a virtual ultrasound signal that corresponds to the gap z4. In this case, the virtual signal generating unit 214 may calculate an average of ultrasound elements adjacent to the gap z4, for example, the second ultrasound element 111d and the third ultrasound element 111e and ultrasound elements adjacent to ultrasound elements adjacent to the gap z4, for example, the first ultrasound element 111c and the fourth ultrasound element 111f and obtain a virtual ultrasound signal.

According to an exemplary embodiment, the virtual signal generating unit 214 may use ultrasound signals output from ultrasound elements of more ultrasound element installation units $112_{13}$ to $112_{KM}$ in addition to the ultrasound element installation units $112_{11}$ and $112_{12}$ near the gap $z_3$, and generate a virtual ultrasound signal corresponding to the gap $z_3$.

In this aspect, the virtual signal generating unit 214 may generate a virtual ultrasound signal by using respective ultrasound signals of a plurality of channels output from ultrasound elements installed in the two ultrasound element installation units $112_{11}$ and $112_{12}$, and generate a virtual ultrasound signal that corresponds to the gap $z_3$ by using respective ultrasound signals of a plurality of channels output from ultrasound elements installed in three or more ultrasound element installation units $112_{11}$ to $112_{KM}$. In this case, the three or more ultrasound element installation units $112_{11}$ to $112_{KM}$ may include the ultrasound element installation units $112_{11}$ and $112_{12}$ near the gap $z_3$.

Further, according to an exemplary embodiment, in order to generate a virtual ultrasound signal that corresponds to the gap $z_3$, the virtual signal generating unit 214 may use ultrasound signals output from ultrasound elements of the ultrasound element installation units $112_{13}$ to $112_{KM}$ that are separated a predetermined distance from the gap $z_3$, instead of the ultrasound element installation units $112_{11}$ and $112_{12}$ near the gap $z_3$, and generate a virtual ultrasound signal.

FIG. 20 is a diagram illustrating a sixth exemplary embodiment of the operation of the virtual signal generating unit.

According to the sixth exemplary embodiment, the virtual signal generating unit 214 may use an objective function to obtain a virtual signal. The virtual signal generating unit 214 may estimate and obtain a virtual signal such that the objective function satisfies a specific condition. In this case, the virtual signal generating unit 214 may obtain a value of a predetermined parameter of the objective function that satisfies the specific condition, and estimate and obtain a virtual signal that corresponds to the obtained value.

For example, the virtual signal generating unit 214 may call the objective function related to at least one of a main-lobe width and a side-lobe level, obtain a value that minimizes at least one of the main-lobe width and the side-lobe level using the objective function, and then estimate and obtain a virtual signal according to the obtained value.

When the virtual signal is obtained in this manner, the virtual signal generating unit 214 may generate a virtual signal such that a beamforming result or an ultrasound image may be obtained according to a need of the user or the system designer.

According to the exemplary embodiment illustrated in FIG. 20, the virtual signal generating unit 214 may further obtain a value that minimizes the objective function by using the signal delivered from the receiving end focusing unit 216.

In particular, the virtual signal generating unit 214 may use an actual ultrasound signal output from the ultrasound transceiving unit 110 to obtain a virtual ultrasound signal, and then deliver the generated virtual ultrasound signal to the delay unit 215 or the receiving end focusing unit 216. The actual ultrasound signal output from the ultrasound transceiving unit 110 may also be delivered to the delay unit 215 or the receiving end focusing unit 216.

The delay unit 215 compensates for a time difference between the delivered virtual ultrasound signal and actual ultrasound signal. The receiving end focusing unit 216 performs beamforming by focusing the virtual ultrasound signal and the actual ultrasound signal.

Then, the beamformed signal may be delivered again to the virtual signal generating unit 214. The virtual signal generating unit 214 may receive the beamformed signal, use the received beamformed signal and the related objective function, and generate a virtual ultrasound signal again. Here, the re-generated virtual ultrasound signal may be a signal of the same channel as a virtual ultrasound signal generated in the virtual signal generating unit 214 before the beamforming operation is performed.

As described above, the objective function may be determined by the system designer's selection or the user's selection, or may be arbitrarily designed. Depending on embodiments, any of various objective functions that may be considered by those skilled in the art may be used to estimate a virtual signal.

For example, the virtual signal generating unit 214 may estimate again a virtual ultrasound signal that may minimize at least one of a main-lobe width and a side-lobe level of the received beamformed signal. In this case, the virtual signal generating unit 214 may use the beamforming result and the objective function related to at least one of a main-lobe width and a side-lobe level and estimate a virtual ultrasound signal again.

The virtual ultrasound signal that is estimated again by the virtual signal generating unit 214 may be delivered again to the delay unit 215 or the receiving end focusing unit 216. The delay unit 215 may compensate for a time difference between the re-estimated virtual ultrasound signal and the actual ultrasound signal. The receiving end focusing unit 216 may focus the re-estimated virtual ultrasound signal and the actual ultrasound signal and perform beamforming. When the re-estimated virtual ultrasound signal is used, the delay unit 215 may not be provided.

When the beamformed ultrasound signal is used to estimate a virtual ultrasound signal again in this manner, the ultrasonic imaging apparatus 1 may obtain a beamformed ultrasound signal that minimizes at least one of a main-lobe width and a side-lobe level using the virtual ultrasound signal. Therefore, an artifact in an image may be minimized and an ultrasound image optimized according to any of various purposes may be obtained.

Depending on embodiments, the actual signal output from the ultrasound transceiving unit 110 may be focused first by the receiving end focusing unit 216 and then delivered to the virtual signal generating unit 214. In this case, a process of generating a virtual signal before the beamforming process may not be performed.

While various exemplary embodiments of generating the virtual signal have been described above, the method for generating the virtual signal is not limited to the above exemplary embodiments. The virtual signal generating unit 214 may obtain the virtual ultrasound signal using any of various methods that may be considered by those of skill in the art in addition to the above method.

As described above, the virtual signal generating unit 214 may obtain one or two or more respective virtual ultrasound signals that correspond to each of the gaps z4 and z5 for each of the gaps z4 and z5. Therefore, the ultrasonic imaging apparatus 1 may compensate for information that is lost due to the gaps z4 and z5. The obtained virtual ultrasound signals $v_1(t1)$ and $v_1(t2)$ may be delivered to the delay unit 215 or the receiving end focusing unit 216 together with the actually obtained ultrasound signals $r_1(t3)$ to $r_{i+2}(t3)$.

As illustrated in FIGS. 5 and 12, the delay unit 215 may compensate for a time difference between ultrasound signals of a plurality of channels. A time difference may be generated between ultrasound signals of the plurality of channels output from the plurality of ultrasound transceiving units 110 due to a distance between the target area 98 and each of the ultrasound transceiving units 110 or characteristics of the ultrasound transceiving unit 110. The delay unit 215 may delay delivery of some signals of the plurality of channels and thus compensate for a time difference between signals of the plurality of channels.

For example, the delay unit 215 may store a delivered ultrasound signal of a specific channel and then output the signal after a predetermined time elapses. Therefore, the signal of a specific channel may be delayed for a predetermined time.

The delay unit 215 may be provided for each channel of an ultrasound signal output from each of transducers 110 of the ultrasound transceiving unit 110 (d1, d3, d5, d7, d9 or d11). Further, the delay unit 215 may be provided for each virtual ultrasound signal delivered from the virtual signal generating unit 214 (d2, d4, d6, d8 and d10).

Each of the delay units d1 to d11 may variably delay ultrasound signals of channels and compensate for a time difference therebetween. The ultrasound signal whose time difference is compensated for in the delay unit 214 may be delivered to the receiving end focusing unit 216.

Depending on embodiments, the delay unit 214 may not be provided.

The receiving end focusing unit 216 may focus and combine ultrasound signals of the plurality of channels delivered via the delay units 215. As described above, the ultrasound signals of the plurality of channels may include an actual ultrasound signal and a virtual ultrasound signal. Therefore, even when some pieces of information are lost since some ultrasound signals are not received due to the gap, the receiving end focusing unit 216 may output a beamformed ultrasound signal obtained when no information is lost or a beamformed ultrasound signal that is similar thereto.

The receiving end focusing unit 216 illustrated in FIG. 5 may apply a respective predetermined weight to an ultrasound signal of each channel and combine ultrasound signals of the plurality of channels. Each respective predetermined weight may be determined independently from the ultrasound signal, or determined based on the ultrasound signal. As the result of combining the ultrasound signals of the plurality of channels, the receiving end focusing unit 216 may output the beamformed signal.

The beamformed signal may be delivered to the signal processing unit 217. Depending on embodiments, the beamformed signal may be delivered to the virtual signal generating unit 214.

The signal processing unit 217 may perform various types of signal processing on the beamformed signal. For example, the signal processing unit 217 may perform at least one of a filtering process, a detecting process and a compressing process. The filtering process is a process in which a filter is applied to the beamformed signal and signals other than a signal of a specific bandwidth are removed. The filtering process may include a harmonic imaging process in which a fundamental frequency component is removed and a harmonic signal passes. The detecting process is a process of converting a voltage of an ultrasound signal from a radio frequency form to a video signal form. The compressing process is a process of decreasing an amplitude difference between ultrasound signals. The signal processing unit 217 may not be provided as necessary.

The image processing unit 218 may convert the beamformed ultrasound signal or the ultrasound signal that has been processed in the signal processing unit 217 into an ultrasound image in the form of a still image or a moving image, and perform predetermined image processing on a still image or a moving image as necessary.

The image processing unit 218 may generate an ultrasound image by using scan conversion. The generated ultrasound image may include an ultrasound image represented in any of various ultrasound image modes such as an amplitude mode (A mode), a brightness mode (B mode), a color-flow mode (C mode), a Doppler mode (D mode), an elastography mode (E mode) or a motion mode (M mode).

In particular, an ultrasound image in the A mode refers to an ultrasound image in which a reflection intensity is imaged as an amplitude based on a distance or a time between the target area 98 and the ultrasonic probe 100. An ultrasound image in the B mode refers to an ultrasound image in which an intensity of an ultrasound signal is represented by using brightness. An ultrasound image in the C mode refers to an ultrasound image based on a color Doppler effect. An ultrasound image in the D mode refers to an ultrasound image implemented by using a Doppler effect. An ultrasound image in the E mode refers to an ultrasound elasticity image. An ultrasound image in the M mode refers to an ultrasound image in which a degree of changes and/or variation in movement of a subject is imaged.

The image processing unit 218 may correct the generated ultrasound image. For example, the image processing unit 218 may correct any one or more of brightness, luminance, sharpness, contrast, colors or the like of all or some regions of the ultrasound image such that the user may clearly see tissues in the ultrasound image. As necessary, an image processing unit 218 may further remove noise in the ultrasound image or perform interpolation between pixels. Further, the image processing unit 218 may use a generated or corrected 2D ultrasound image and obtain ultrasound volume data that represents a 3D volume.

The image processing unit 218 may deliver the generated or corrected ultrasound image to the storage device 219 and/or display the image on a display unit (also referred to herein as a "display device" and/or as a "display") 280.

The above-described processor 210 may be implemented by one or two or more semiconductor chips and related components. When the processor 210 is implemented by a plurality of semiconductor chips, some of the functions of the pulser 211, the amplifier 212, the analog-to-digital converter 213, the delay unit 215, the virtual signal generating unit 214, the receiving end focusing unit 216, the signal processing unit 217 and the image processing unit 218 may be performed using one semiconductor chip and the other thereof may be performed using another semiconductor chip. For example, the image processing unit 218 may be implemented by a separately provided processor such as a graphic processing unit (GPU). In addition, the processor 210 may be implemented by any of various methods that may be considered by those of skill in the art.

The storage device 219 may store data or any of various programs related to functions of the processor 210 or the control unit 220, the generated ultrasound image, metadata of the generated ultrasound image, and various pieces of information related to ultrasound image processing. The storage device 219 may be implemented by any of a semiconductor storage device, a magnetic disk storage device, a magnetic tape storage device or the like.

The control unit 220 may control overall operations of an ultrasound imaging apparatus 1 according to the user's command or predefined settings. For example, the control unit 220 may generate a predetermined control command according to a frequency of ultrasound energy to be irradiated and then deliver the generated control command to the pulser 211. Therefore, the ultrasound transceiving unit 110 may generate ultrasound energy of a predetermined frequency and irradiate the ultrasound energy to the target area 98 of the subject 99.

The control unit 220 may include a central processing unit ("CPU") configured to generate a control command and a storage device such as a ROM or a RAM for assisting the unit. Depending on embodiments, the above-described processor 210 may perform a function of the control unit 220.

The display unit 280 may display an ultrasound image in any of various modes or related information to the user.

The display unit 280 may use any of a plasma display panel (PDP), a light emitting diode (LED), a liquid crystal display (LCD) or the like. The LED may be implemented by using an organic light emitting diode (OLED). The display unit 280 may be implemented by using a 3D display that is capable of representing a stereoscopic image. In addition, the display unit 280 may be implemented by using a flexible display. In this case, the display unit 280 in a bent or deformed form may display an ultrasound image or related various pieces of information to the user.

An input unit 290 may receive any of various commands related to control of the ultrasonic imaging apparatus 1 from the user. The input unit 290 may output an electrical signal according to the user's manipulation and then deliver the output electrical signal to the control unit 220. For example, the user may input various commands for controlling the ultrasonic imaging apparatus 1, such as ultrasound diagnosis start, diagnosis region selection, diagnosis type selection or selection of a display mode of an image to be output via the input unit 290.

As illustrated in FIG. 4, the input unit 290 may include an operating panel 291 in which various input devices are installed. Here, examples of input devices installed in the operating panel 291 may include at least one of a keyboard, a mouse, a trackball, a knob, a touch pad, a paddle, various levers, a handle, a joystick, a touch screen, and various other input devices.

Figure 21A:
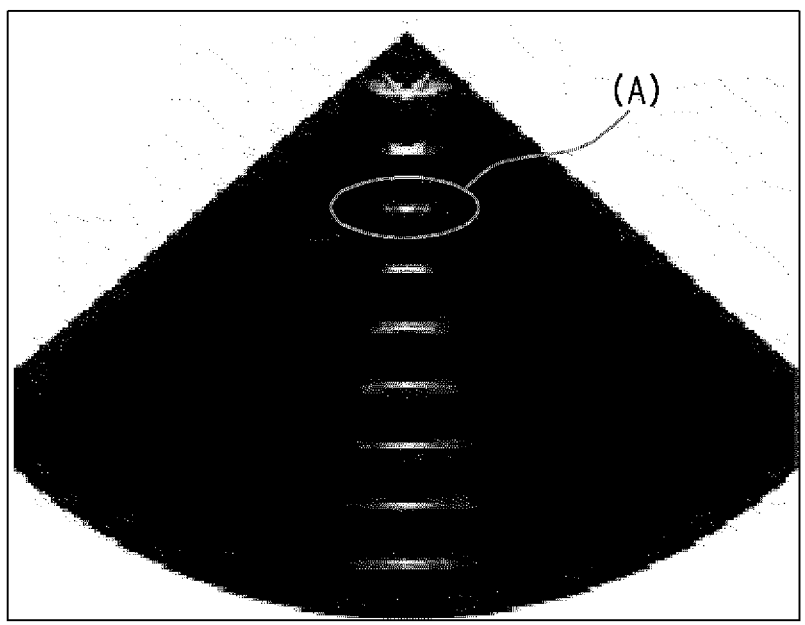
FIG. 21A is a diagram illustrating an exemplary embodiment of a B mode image obtained when beamforming is performed using a virtual ultrasound signal.
Figure 21B:
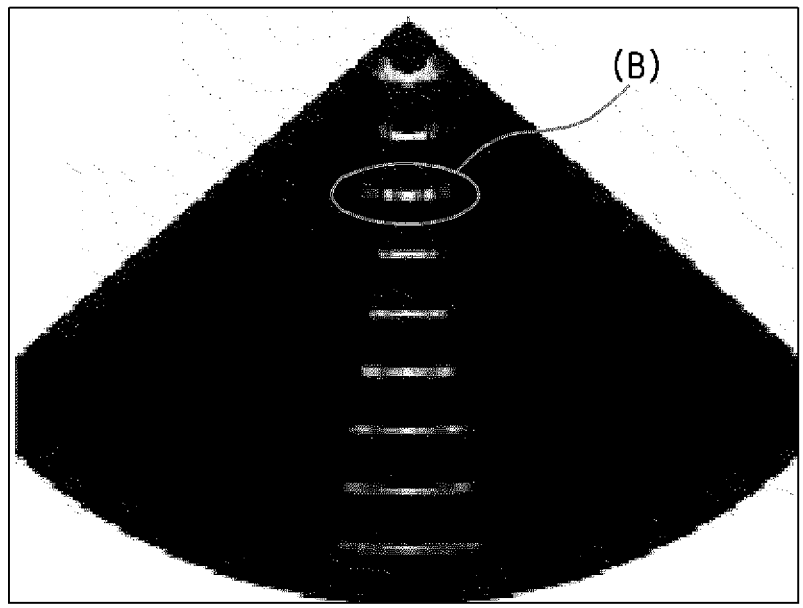
FIG. 21B is a diagram illustrating an exemplary embodiment of a B mode image obtained when beamforming is performed without using a virtual ultrasound signal.

FIG. 21A is a diagram illustrating an exemplary embodiment of a B mode image obtained when beamforming is performed using a virtual ultrasound signal. FIG. 21B is a diagram illustrating an exemplary embodiment of a B mode image obtained when beamforming is performed without using a virtual ultrasound signal.

FIGS. 21A and. 21B illustrate a case in which an ultrasound image in the B mode obtained when a gap ($z_3$ in FIG. 11) of 500 μm is provided, one side of the ultrasound element 111 has a length of 250 μm, ultrasound energy of a frequency of 3 MHz is irradiated to the target area 98 inside the subject 99, ultrasound energy reflected from the target area 98 is used and sampling is performed at a sampling rate of 80 MHz. FIG. 21A illustrates an image that is obtained by performing the beamforming process and additionally using a virtual ultrasound signal. FIG. 21B illustrates a B mode image that is obtained by performing the beamforming process with no virtual ultrasound signal.

When (A) in FIGS. 21A and (B) in FIG. 21B are compared to each other, if the beamforming process is performed using a virtual ultrasound signal, it can be understood that a side lobe is relatively reduced compared to when the beamforming process is performed with no virtual ultrasound signal. Therefore, when the beamforming process is performed using the virtual ultrasound signal, an artifact in the ultrasound image may relatively decrease, and the same as or similar to an ultrasound image obtained when there is no gap $z_3$ may be obtained.

Figure 22:
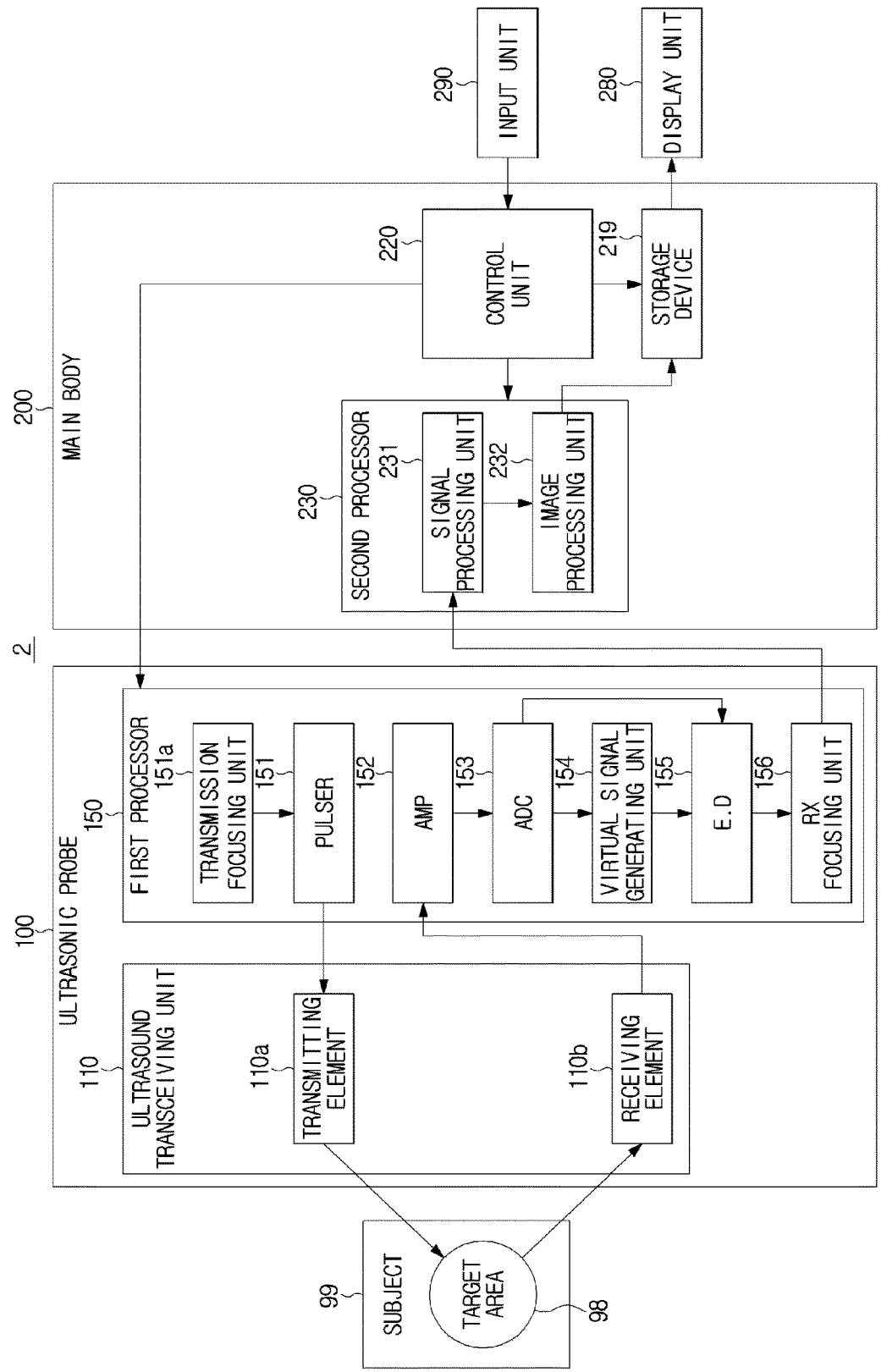
FIG. 22 is diagram illustrating a configuration of another exemplary embodiment of the ultrasonic imaging apparatus.

FIG. 22 is diagram illustrating a configuration of another exemplary embodiment of the ultrasonic imaging apparatus.

As illustrated in FIG. 22, an ultrasonic imaging apparatus 2 may include the ultrasonic probe 100 and the main body 200 communicatively connected to the ultrasonic probe 100. The input unit 290 and the display unit 280 may be connected to the main body 200.

The ultrasonic probe 100 may include the ultrasound transceiving unit 110 having the ultrasound transmitting element 110a and the ultrasound receiving element 110b and a first processor 150. Since the ultrasound transceiving unit 110 has already been described, details thereof will be omitted.

The first processor 150 may include a transmission focusing unit 151a, a pulser 151, an amplifier 152, an analog-to-digital converter 153, a delay unit 154, a virtual signal generating unit 155 and a RX focusing unit 156. Since the transmission focusing unit 151a, the pulser 151, the amplifier 152, the analog-to-digital converter 153, the delay unit (echo delay) 155, the virtual signal generating unit 154 and the RX focusing unit 156 of the first processor 150 are substantially the same as those described with reference to FIG. 5, redundant descriptions will be omitted.

As illustrated in FIG. 23, since the virtual signal generating unit 155 and the beamformer 156 are provided in the ultrasonic probe 100, the ultrasonic probe 100 may perform both obtaining the virtual ultrasound signal based on the ultrasound signal obtained in the ultrasound transceiving unit 110 and the beamforming process using the actually obtained ultrasound signal and the virtual ultrasound signal. Since the ultrasonic probe 100 transmits a smaller amount of data to the main body 200 when the ultrasonic probe 100 also performs the beamforming process in this manner than when the beamformer is provided in the main body 200, the apparatus may have a simplified configuration and data may be delivered from the probe 100 to the main body 200 more quickly. Therefore, efficiency of the ultrasonic imaging apparatus 2 may be improved.

The first processor 150 may be implemented by one or two or more semiconductor chips and related components.

The main body 200 may include the storage device 219, the control unit 220 and a second processor 230. The second processor 230 may include a signal processing unit 231 and an image processing unit 232. Since the storage device 219, the control unit 220, the signal processing unit 231, the image processing unit 232, the display unit 280 and the input unit 290 are the same as those described above, redundant descriptions will be omitted. The second processor 150 may also be implemented by one or two or more semiconductor chips and related components.

Figure 23A:
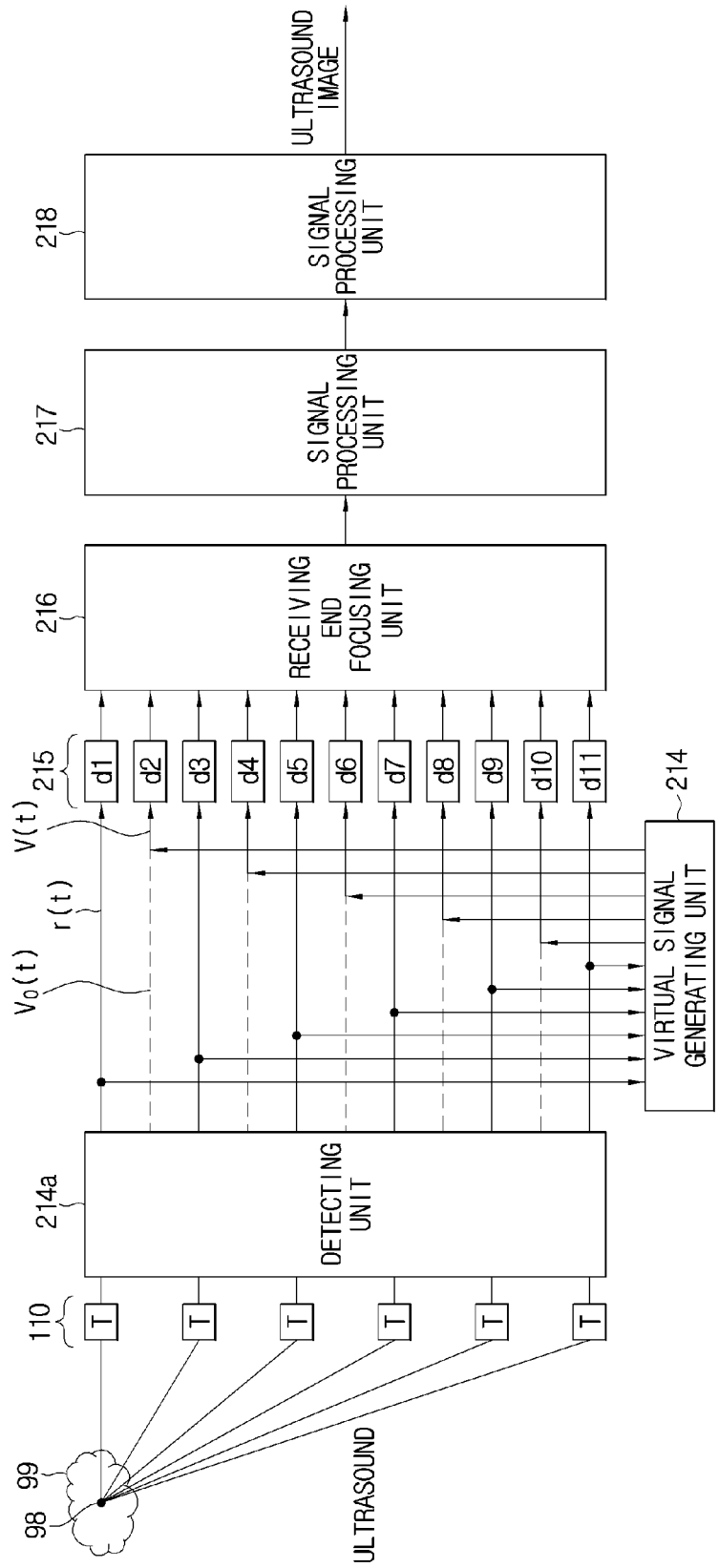
FIG. 23A is a diagram illustrating an operation of a virtual signal generating unit according to another exemplary embodiment of the ultrasonic imaging apparatus.
Figure 23B:
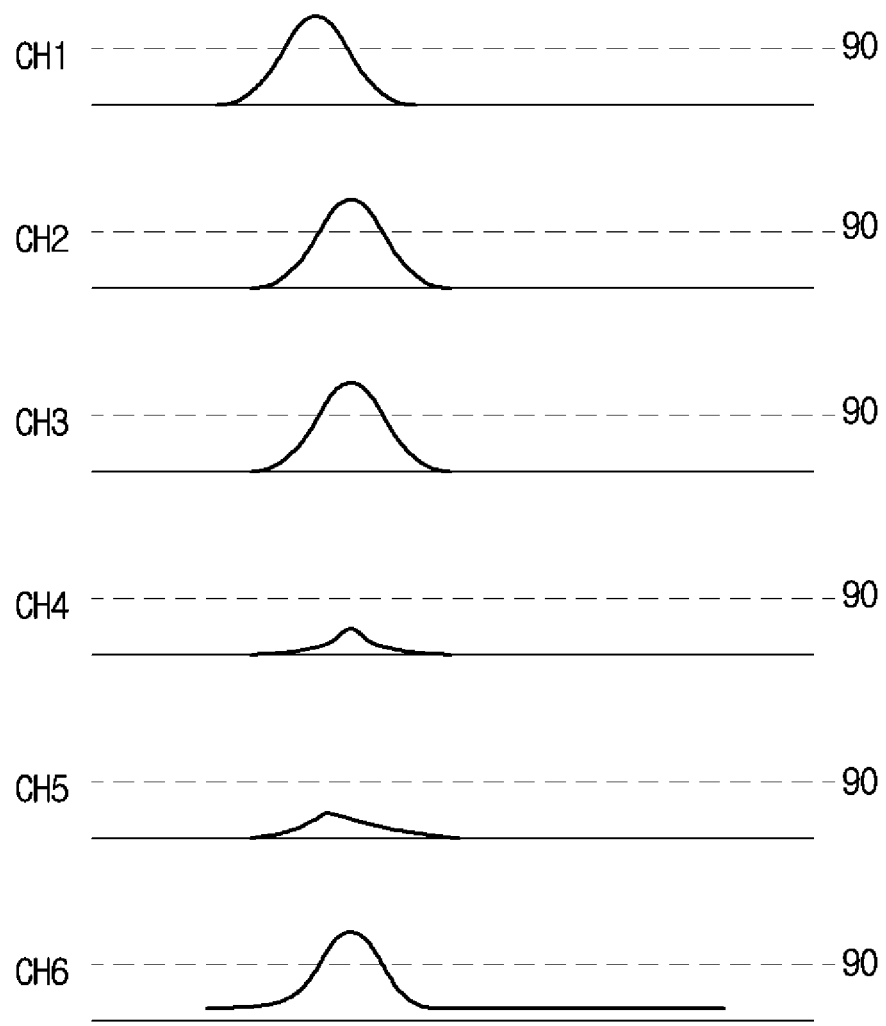
FIG. 23B is a diagram illustrating an operation of a virtual signal generating unit according to another exemplary embodiment of the ultrasonic imaging apparatus.

FIGS. 23A and 23B are diagrams illustrating an operation of a virtual signal generating unit according to another exemplary embodiment of the ultrasonic imaging apparatus.

As illustrated in FIG. 23A, the ultrasonic imaging apparatus 1 may further include a detecting unit (also referred to herein as a "detector") 214a configured to detect a channel having a relatively weak signal or having no signal among the plurality of channels via which output ultrasound signals are delivered.

Some of electrical signals output from the ultrasound receiving element 110b of the ultrasound transceiving unit 110 may be lost while propagating through a circuit or the like. Also, due to a failure of the ultrasound receiving element 110b, the ultrasound receiving element 110b may not output an electrical signal that corresponds to the received ultrasound energy. In addition, some receiving elements of the plurality of ultrasound receiving elements 110b do not receive ultrasound energy and may not output an ultrasound signal. The detecting unit 214a may detect a channel via which no ultrasound signal is delivered due to these problems.

The detecting unit 214a may be provided between the ultrasound transceiving unit 110 and the delay unit 215 or between the ultrasound transceiving unit 110 and the virtual signal generating unit 214, and may deliver the detecting result to the virtual signal generating unit 214. Depending on embodiments, the amplifier 212 or the analog-to-digital converter 213 may be provided between an ultrasound transceiving unit 110 and the detecting unit 214a.

In particular, the detecting unit 214a may detect at least one channel, e.g., CH4 or CH5, from among a plurality of channels CH1, CH2, CH3, CH4, CH5, and CH6 connected to the ultrasound transceiving unit 110. Here, the at least one detected channel CH4 or CH5 may include a channel having no delivered signal or having a relatively weak signal.

For example, as illustrated in FIG. 23B, the detecting unit 214a may detect a level of an electrical signal of the plurality of channels CH1, CH2, CH3, CH4, CH5, and CH6, for example, a voltage, and compare the detected voltage with a predefined threshold value 90. Then, the detecting unit 214a may detect channels CH4 and CH5 that have electrical signal levels lower than the predefined threshold value based on the comparison result, and deliver information on the result to the virtual signal generating unit 214.

The threshold value 90 may be a value that is arbitrarily determined by the system designer or the user and may be changed as necessary. Further, the same threshold value 90 may be applied for each of the channels CH1, CH2, CH3, CH4, CH5, and CH6 or a different threshold value 90 may be applied for each of the channels CH1, CH2, CH3, CH4, CH5, and CH6.

The virtual signal generating unit 214 may receive information that relates to the detected channels CH4 and CH5 delivered from the detecting unit 214*a*, and then generate a virtual ultrasound signal of the detected channels CH4 and CH5. In this case, the virtual signal generating unit 214 may use at least two among electrical signals of channels CH1, CH2, CH3, and CH6 having a voltage greater than the threshold value, and generate a virtual ultrasound signal of channels CH4 and CH5 having no signal or having a weak signal.

The virtual signal generating unit 214 may generate a virtual ultrasound signal by using any of various methods described above. For example, the virtual signal generating unit 214 may use various types of interpolation to generate a virtual signal, or use one or two or more objective functions to generate a virtual signal. Also, the virtual signal generating unit 214 may use the beamformed signal that has been processed in the receiving end focusing unit 216 to generate a virtual signal.

Hereinafter, an exemplary embodiment of a signal processing method will be described with reference to FIG. 24.

Figure 24:
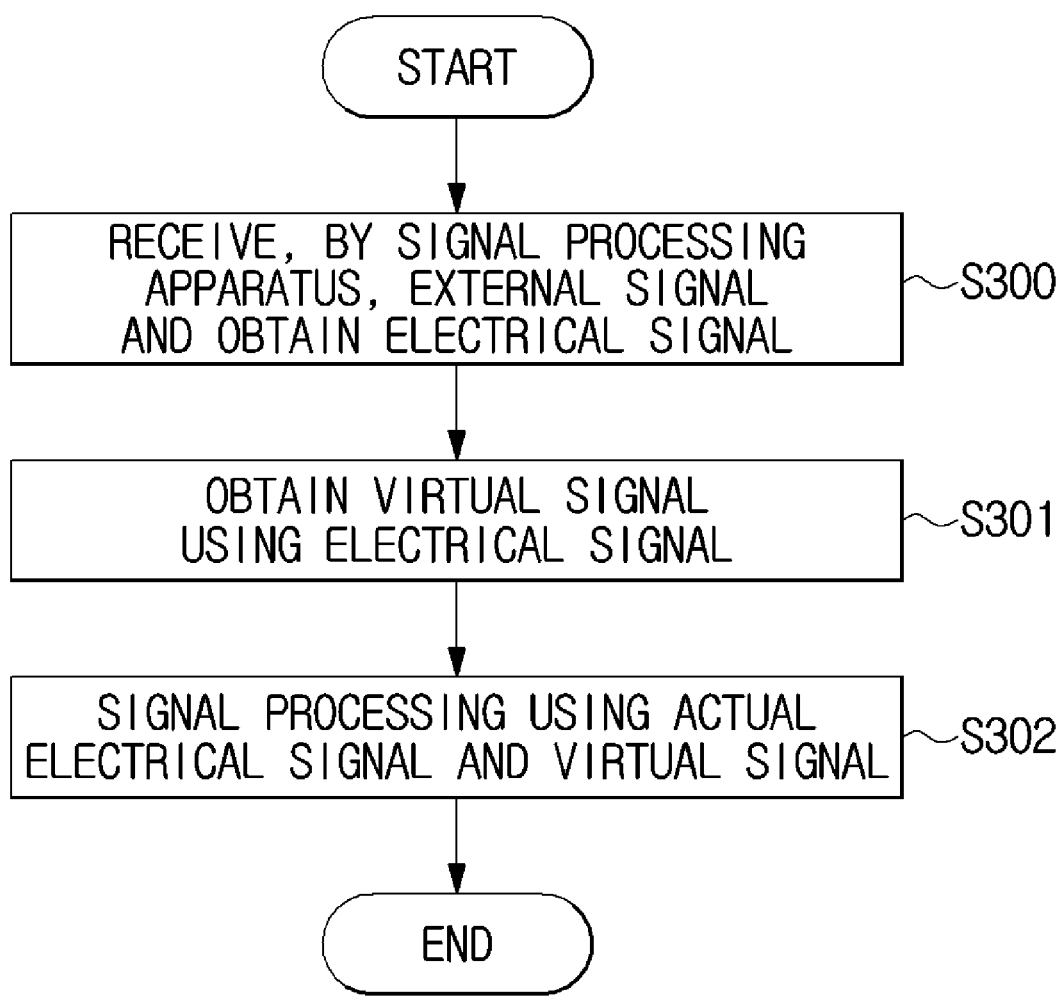
FIG. 24 is a diagram illustrating an exemplary embodiment of a signal processing method.

FIG. 24 is a diagram illustrating an exemplary embodiment of a signal processing method.

According to the exemplary embodiment of the signal processing method illustrated in FIG. 24, first, in operation S300, the signal processing apparatus receives an external signal such as visible light, infrared light, radioactive rays, ultrasound, microwaves or a free induction decay signal via the reception unit, and obtains an electrical signal that corresponds to the received signal. The reception unit may include a plurality of receiving elements, and at least one of the plurality of receiving elements may be physically separated with a predetermined gap therebetween. The obtained electrical signal may include a number of channels that corresponds to the number of receiving elements.

Then, in operation S301, the signal processing apparatus may use the obtained electrical signal in order to obtain one or two or more virtual signals. The obtained virtual signal may be a virtual signal of a channel that corresponds to a gap between receiving elements.

Depending on embodiments, the signal processing apparatus may obtain a signal that corresponds to a median or an average of two actual electrical signals, or consider at least one of two electrical signals as a virtual signal, and thus obtain a virtual signal that corresponds to a gap. Further, the signal processing apparatus may use various types of interpolation and obtain a virtual signal from two actual electrical signals.

In addition, the signal processing apparatus may use a predefined objective function to obtain a virtual signal. In this case, the signal processing apparatus may determine and obtain a virtual signal such that at least one parameter of a predefined objective function may be optimized.

In particular, the signal processing apparatus may set optimization parameters necessary for results before beamforming or obtained after beamforming, or results of various types of signal processing or image processing performed after beamforming as the objective function, and estimate a virtual signal such that the set objective function may be optimized. Such an objective function may be arbitrarily determined by the system designer's selection or the user's selection. Further, the objective function may use any of various functions that are generally used.

For example, the signal processing apparatus may estimate again (i.e., re-estimate) a virtual signal based on the beamforming result obtained using a plurality of ultrasound signals including the virtual signal. More specifically, the signal processing apparatus may set the objective function such that at least one of a main-lobe width and a side-lobe level obtained based on the beamforming result may be minimized, and estimate and obtain a virtual signal again using the objective function.

When the virtual signal is obtained, in operation S302, signal processing may be performed with respect to the actual electrical signal and the virtual signal. In particular, the signal processing may include, for example, a beamforming process and/or an image generating process.

Hereinafter, various exemplary embodiments of a method for controlling an ultrasonic imaging apparatus will be described with reference to FIGS. 25, 26, and 27.

Figure 25:
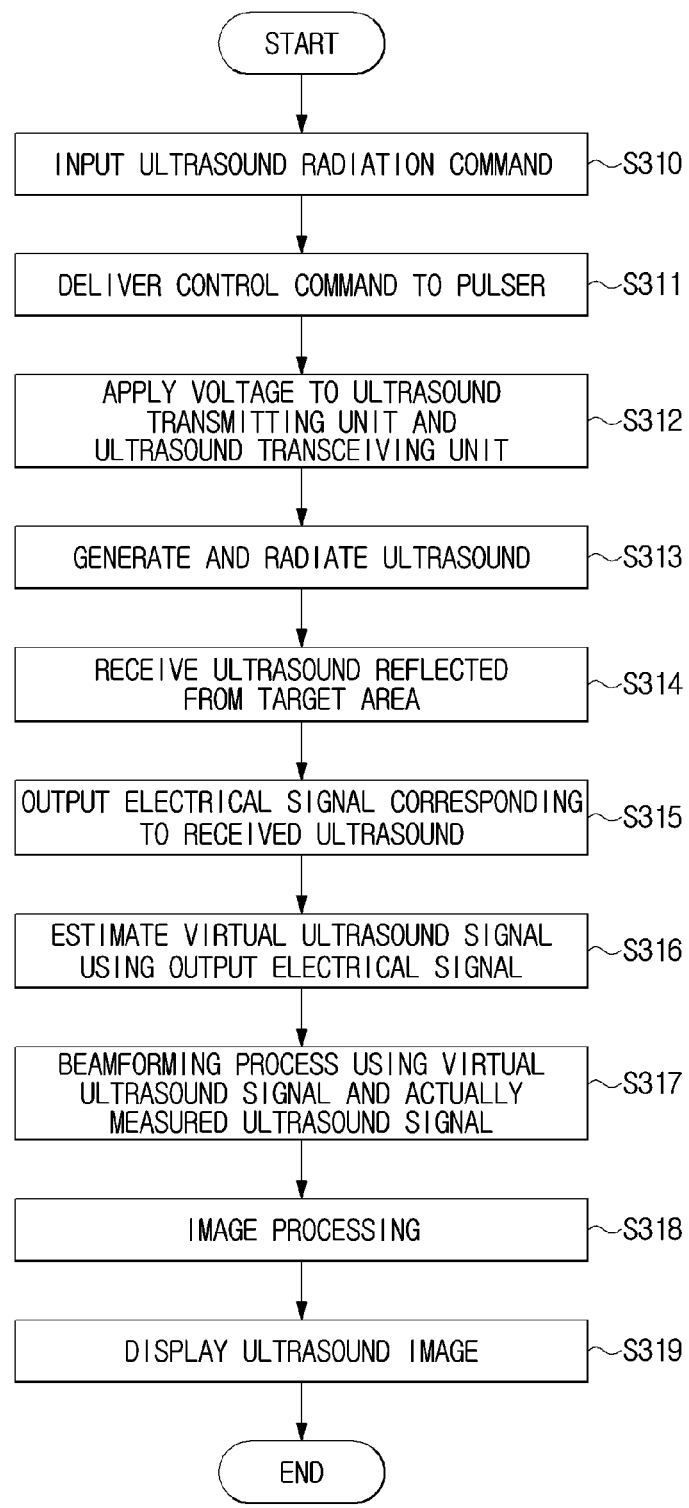
FIG. 25 is a diagram illustrating an exemplary embodiment of a method for controlling an ultrasonic imaging apparatus.

FIG. 25 is a diagram illustrating an exemplary embodiment of a method for controlling an ultrasonic imaging apparatus.

The method for controlling an ultrasonic imaging apparatus illustrated in FIG. 25 may be performed by the ultrasonic imaging apparatus that includes at least one first ultrasound element installed in the first ultrasound element installation unit and the second ultrasound element installed in the second ultrasound element installation unit. In particular, the first ultrasound element installation unit and the second ultrasound element installation unit are separately provided. Therefore, the first ultrasound element and the second ultrasound element may also be separated with a predetermined gap therebetween. Depending on embodiments, the first ultrasound element may be installed in the first ultrasound element installation unit to approach the second ultrasound element installation unit, and the second ultrasound element may be installed in the second ultrasound element installation unit to approach the first ultrasound element installation unit.

According to the exemplary embodiment of the method for controlling an ultrasonic imaging apparatus illustrated in FIG. 25, first, in operation S310, driving of the ultrasonic imaging apparatus may start and the user may input an ultrasound radiation command.

When the ultrasound radiation command is input, in operation S311, a central processing unit of the ultrasonic imaging apparatus may deliver a control command to the pulser according to the ultrasound radiation command.

Then, in operation S312, the pulser may deliver a predetermined voltage to the ultrasound transceiving element or the ultrasound transmitting element of the ultrasound element unit according to a control command, and thus drive the ultrasound transmitting element or the ultrasound transceiving element. In particular, the ultrasound transmitting element or the ultrasound transceiving element may include at least one of the capacitive micromachined ultrasonic transducer, the piezoelectric ultrasonic transducer, and the magnetostrictive ultrasonic transducer.

In operation S313, the ultrasound transmitting element or the ultrasound transceiving element may generate ultrasound energy that corresponds to an applied voltage, and the generated ultrasound energy may be irradiated into the subject.

The emitted ultrasound energy may be reflected at a target area inside the subject, and the reflected ultrasound energy may be received by the ultrasound receiving element or the ultrasound transceiving element in operation S314.

In operation S315, the ultrasound receiving element or the ultrasound transceiving element may output an electrical signal that corresponds to the received ultrasound energy. In this case, amplification and analog digital conversion are performed on the output electrical signal, and a time difference may be compensated for by a time delay.

Then, in operation S316, the ultrasonic imaging apparatus may use an electrical signal that corresponds to the received ultrasound energy and estimate a virtual ultrasound signal that corresponds to a gap between the first ultrasound element and the second ultrasound element.

According to an exemplary embodiment, in order to estimate the virtual ultrasound signal, at least one interpolation may be performed based on electrical signals output from the first ultrasound element and the second ultrasound element. In this case, as described above, various types of interpolation such as linear interpolation may be used and various types of objective functions may be used.

For example, in order to estimate a virtual ultrasound signal, the ultrasonic imaging apparatus may calculate an average value of electrical signals output from the first ultrasound element and the second ultrasound element.

As another example, the virtual ultrasound signal may be set as the same value as the electrical signal output from each of the first ultrasound element and the second ultrasound element.

As still another example, in order to estimate a virtual ultrasound signal, temporal interpolation may be used. In this case, the temporal interpolation is performed based on ultrasound signals output at different times, that is, ultrasound signals that are output a plurality of times, and thus the virtual ultrasound signal may be estimated. In this case, the ultrasonic imaging apparatus may use, for example, a first ultrasound signal output at a first time and a second ultrasound signal output at a second time, respectively, and obtain a virtual ultrasound signal at a third time different from the first time and the second time. The third time may be a time between the first time and the second time. Then, the obtained virtual ultrasound signals at the third time may be used to additionally obtain a virtual ultrasound signal that corresponds to the gap at the third time.

As another example, the ultrasonic imaging apparatus may obtain a virtual ultrasound signal that corresponds to the gap at the first time, and a virtual ultrasound signal that corresponds to the gap at the second time, and then apply various types of interpolation, the objective function or the like to the obtained virtual ultrasound signals as described above. Therefore, a virtual ultrasound signal at the third time may be obtained.

When the virtual ultrasound signal is estimated, in operation S317, the ultrasonic imaging apparatus may perform the beamforming process using the virtual ultrasound signal and the actually measured ultrasound signal. As a result, compared to when the actually measured ultrasound signal is used, a greater amount of information may be used, and thus a more accurate beamformed ultrasound signal may be used.

An ultrasound image may be obtained based on the beamformed ultrasound signal, and in operation S318, various types of image processing may be performed on the obtained ultrasound image.

The obtained ultrasound image in at least one of the various modes described above may be displayed for the user in operation S319.

Figure 26:
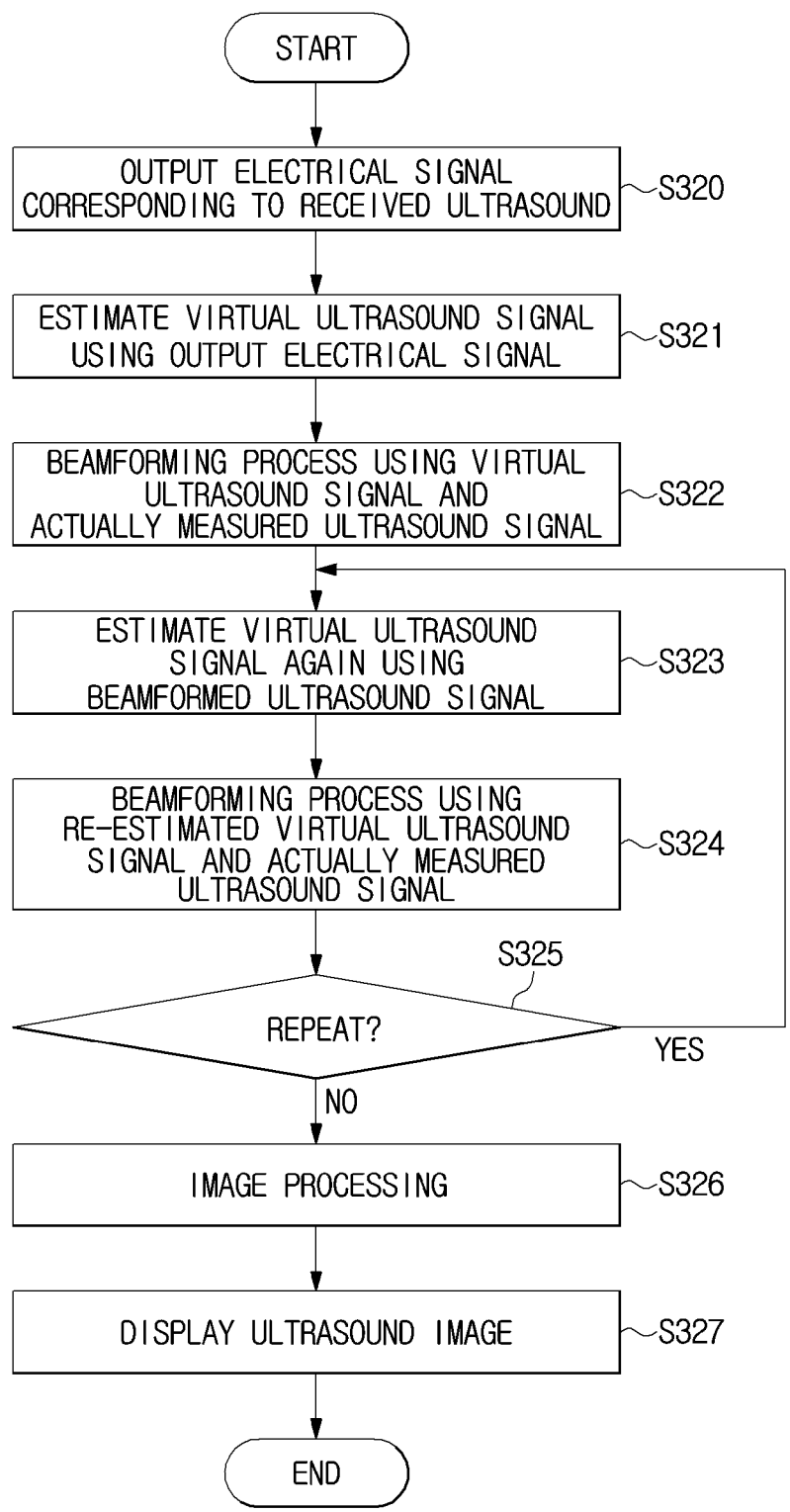
FIG. 26 is a diagram illustrating an exemplary embodiment of a method for controlling an ultrasonic imaging apparatus.

FIG. 26 is a diagram illustrating another exemplary embodiment of a method for controlling an ultrasonic imaging apparatus.

As illustrated in FIG. 25, the ultrasonic imaging apparatus may irradiate ultrasound energy to the subject and receive ultrasound energy reflected from the subject via the ultrasound transceiving unit (S310 to S314). Then, as illustrated in FIG. 26, an electrical signal that corresponds to the received ultrasound energy is output through the plurality of channels connected to the ultrasound transceiving unit in operation S320.

Then, in operation S321, the ultrasonic imaging apparatus may estimate a virtual ultrasound signal using the output electrical signal. In this case, as described above, any of various estimation methods may be used. For example, the ultrasonic imaging apparatus may use various types of interpolation or the objective function to estimate the virtual ultrasound signal.

When the virtual ultrasound signal is estimated, in operation S322, the estimated virtual ultrasound signal may be used for beamforming together with the actually measured ultrasound signal.

When beamforming is performed using both of the virtual ultrasound signal and the actually measured ultrasound signal, the beamformed ultrasound signal may be obtained, and the obtained beamformed ultrasound signal may be used to obtain a virtual ultrasound signal again. In particular, the virtual ultrasound signal may be a virtual ultrasound signal of the same channel as the virtual ultrasound signal estimated in the operation S321 as described above.

In operation S323, the ultrasonic imaging apparatus may estimate a virtual ultrasound signal again using the beamformed ultrasound signal. In this case, as described above, the ultrasonic imaging apparatus may use various types of interpolation or the objective function to estimate the virtual ultrasound signal.

When a new virtual ultrasound signal is estimated again, in operation S324, the beamforming process may be performed again using the re-estimated virtual ultrasound signal and the actually measured ultrasound signal.

Depending on embodiments, in operation S325, the above operations S323 and S324 may be repeated once or more.

The ultrasonic imaging apparatus may generate an ultrasound image based on the beamformed ultrasound signal obtained through the above-described method, and in operation S326, perform various types of image processing on the generated ultrasound image. Therefore, various types of ultrasound images are obtained.

In operation S327, the ultrasonic imaging apparatus may display the obtained ultrasound image in at least one of the various modes described above for the user via the display unit.

Figure 27:
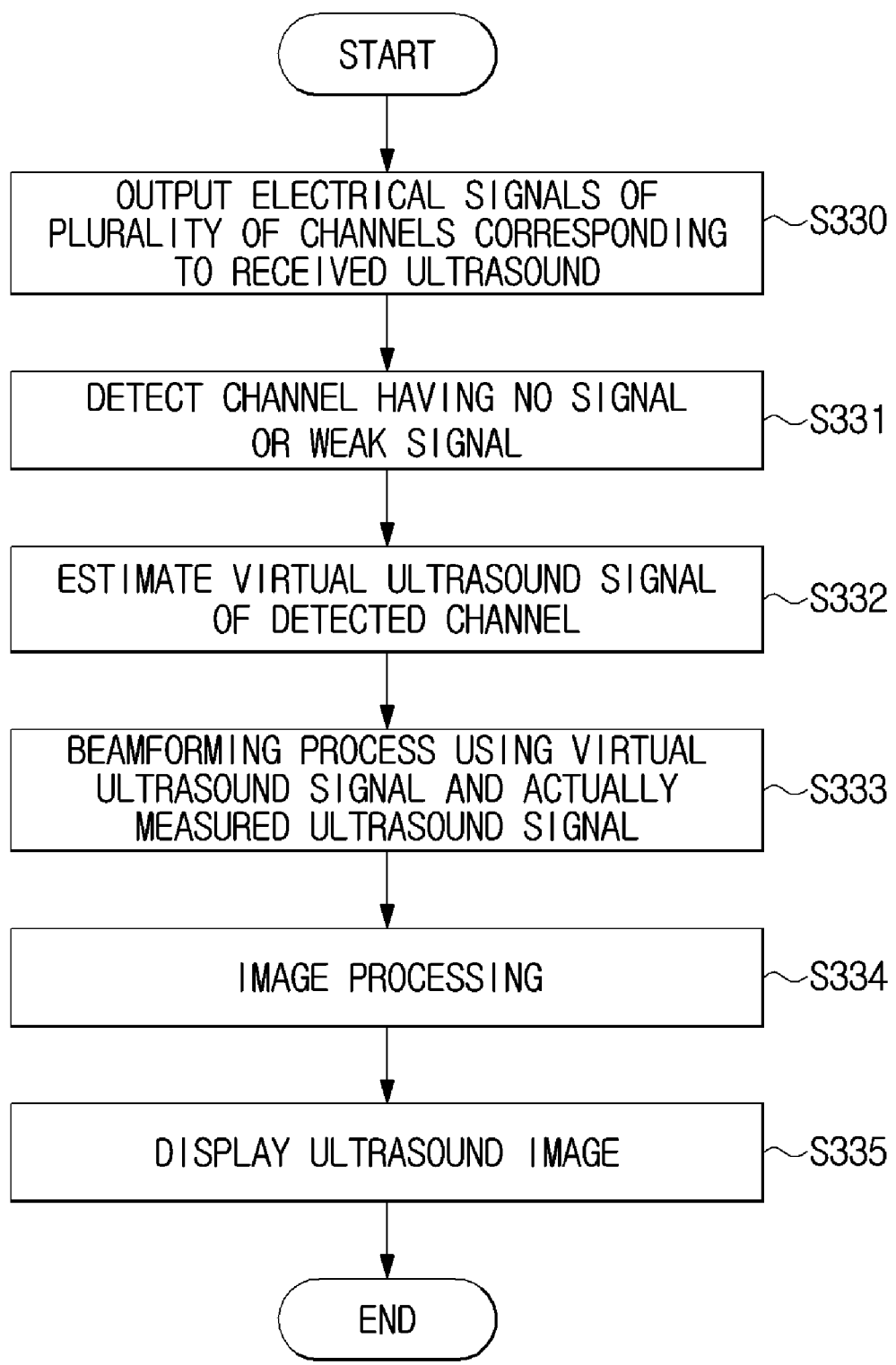
FIG. 27 is a diagram illustrating an exemplary embodiment of a method for controlling an ultrasonic imaging apparatus.

FIG. 27 is a diagram illustrating still another exemplary embodiment of a method for controlling an ultrasonic imaging apparatus.

As illustrated in FIG. 25, the ultrasonic imaging apparatus may irradiate ultrasound energy to the subject and receive ultrasound energy reflected from the subject via the ultrasound transceiving unit (S310 to S314). Then, in operation S330, electrical signals of a plurality of channels that correspond to the received ultrasound energy may be output. In this case, some of the output electrical signal may be lost.

Also, depending on circumstances, no electrical signal may be output from a specific ultrasound element of the ultrasound transceiving unit. This may occur when the specific ultrasound element receives no ultrasound or has failed.

As illustrated in FIG. 27, in operation S331, the ultrasonic imaging apparatus may detect a channel having no ultrasound signal or having a relatively weak signal from among the plurality of channels. Here, the plurality of channels refers to channels via which an ultrasound signal may be delivered. The ultrasonic imaging apparatus may compare the predefined threshold value with a level of the ultrasound signal delivered via each channel, for example, a voltage level of the ultrasound signal, and may detect a channel having no ultrasound signal or having a weak signal based on the comparison result. For example, the ultrasonic imaging apparatus may detect channels having a voltage level lower than the threshold value and thus detect a channel having no ultrasound signal or having a weak signal.

In operation S332, the ultrasonic imaging apparatus may estimate a virtual ultrasound signal of a channel having no detected ultrasound signal or having a weak signal. In this case, as described above, any of various estimation methods may be used to estimate the virtual ultrasound signal. The various estimation methods may include a method using interpolation, the objective function or the like.

When the virtual ultrasound signal of the channel having no ultrasound signal or having a weak signal is obtained, in operation S333, the beamforming process may be performed using the obtained virtual ultrasound signal and an ultrasound signal of another channel. As a result, the beamformed ultrasound signal may be obtained.

The ultrasonic imaging apparatus may generate an ultrasound image based on the beamformed ultrasound signal, and in operation S334, perform various types of image processing on the generated ultrasound image. Therefore, various types of ultrasound images may be obtained.

In operation S335, the obtained ultrasound image in various modes may be displayed for the user via the display unit.

According to the signal processing apparatus, it is possible to effectively decrease noise in an image that is caused by a gap between individual elements configured to output an electrical signal.

According to the signal processing apparatus, since there is less need to complicatedly design a system in order to minimize a gap between individual elements, it is possible to obtain effects of improving convenience of manufacturing the signal processing apparatus and reducing a manufacturing cost.

According to the ultrasonic imaging apparatus, the ultrasonic probe apparatus, the signal processing apparatus and the method of controlling an ultrasonic imaging apparatus, when an ultrasonic transducer array of a tile structure or a module structure is used, it is possible to minimize noise caused due to the gap between elements disposed on different tiles or modules in the obtained ultrasound image.

Further, according to the ultrasonic imaging apparatus, the ultrasonic probe apparatus, the signal processing apparatus and the method of controlling an ultrasonic imaging apparatus, there is less need to design a tile structure or a module structure in order to minimize a gap between individual elements of the ultrasonic transducer array, or to use tiles or modules having a minimized gap when the ultrasonic probe or the ultrasonic imaging apparatus is manufactured.

Still further, as convenience of the tile structure design increases, it is possible to obtain effects of manufacturing the ultrasonic probe or the ultrasonic imaging apparatus relatively easily, and reducing a manufacturing cost thereof.

In addition, according to the ultrasonic imaging apparatus, the ultrasonic probe apparatus, the signal processing apparatus and the method of controlling an ultrasonic imaging apparatus, it is possible to minimize generation of a side lobe caused by a gap between tiles and a gap between individual elements of the ultrasonic transducer array.

Further, by employing the ultrasonic imaging apparatus, the ultrasonic probe apparatus, the signal processing apparatus and the method of controlling an ultrasonic imaging apparatus according to one or more exemplary embodiments, it is possible to estimate an ultrasound signal that corresponds to an ultrasound element that does not actually receive ultrasound energy or a lost ultrasound signal.

What is claimed is:

1. An ultrasonic imaging apparatus, comprising:
at least one first ultrasound element installed in a first ultrasound device;
at least one second ultrasound element installed in a second ultrasound device that is separate from the first ultrasound device, wherein the at least one first ultrasound element and the at least one second ultrasound element are spaced apart by a gap; and
a processor configured to:
generate at least one virtual ultrasound signal corresponding to a position in the gap, as an average of at least one first ultrasound signal output from the at least one first ultrasound element and at least one second ultrasound signal output from the at least one second ultrasound element,
perform beamforming by using the at least one first ultrasound signal, the at least one second ultrasound signal, and the at least one virtual ultrasound signal, to generate at least one beamformed signal, and
determine an average of the at least one first ultrasound signal and the at least one second ultrasound signal as the at least one virtual ultrasound signal that corresponds to the gap,
wherein the gap is an area devoid of ultrasound elements,
wherein a portion of the gap entirely separates the first ultrasound device from the second ultrasound device, the first ultrasound device comprises a first edge region, the second ultrasound device comprises a second edge region facing the first edge region, the at least one first ultrasound element is installed in the first edge region, and the at least one second ultrasound element is installed in the second edge region and faces the at least one first ultrasound element across the portion of the gap, and
wherein the processor is further configured to estimate a virtual ultrasound signal such that at least one of a main-lobe width and a side-lobe level may be minimized based on a beamforming result that is obtained by using an actual signal of a channel and the virtual ultrasound signal.

2. The ultrasonic imaging apparatus according to claim 1, wherein the processor is further configured to:
generate a new virtual ultrasound signal corresponding to the position in the gap by performing an interpolation based on the at least one beamformed signal.

3. The ultrasonic imaging apparatus according to claim 2, wherein the processor is further configured to perform linear interpolation.

4. The ultrasonic imaging apparatus according to claim 1, wherein the at least one first ultrasound element of the first ultrasound device is adjacent to the at least one second ultrasound element of the second ultrasound device.

5. The ultrasonic imaging apparatus according to claim 1, wherein the at least one first ultrasound element is configured to output a plurality of first ultrasound signals, the at least one first ultrasound signal being one of the plurality of first ultrasound signals,
the at least one second ultrasound element is configured to output a plurality of second ultrasound signals, the at least one second ultrasound signal being one of the plurality of second ultrasound signals, and
the processor is further configured to perform at least one temporal interpolation based on the plurality of first ultrasound signals and the plurality of second ultrasound signals, and to generate the at least one virtual ultrasound signal based on the at least one temporal interpolation.

6. The ultrasonic imaging apparatus according to claim 1, wherein the at least one first ultrasound element is configured to output the at least one first ultrasound signal at a first time,
the at least one second ultrasound element is configured to output the at least one second ultrasound signal at a second time different from the first time, and
the processor is further configured to generate the at least one virtual ultrasound signal at a third time between the first time and the second time.

7. The ultrasonic imaging apparatus according to claim 6, wherein the processor is further configured to:
generate a second virtual ultrasound signal that corresponding to the gap at the first time,
generate a third virtual ultrasound signal corresponding to the gap at the second time, and
generate the at least one virtual ultrasound signal at the third time by using the second virtual ultrasound signal and the third virtual ultrasound signal.

8. The ultrasonic imaging apparatus according to claim 1, further comprising:
at least one third ultrasound element installed in at least one third ultrasound device,
wherein the processor is further configured to generate the at least one virtual ultrasound signal based on the at least one first ultrasound signal, the at least one second ultrasound signal, and a third ultrasound signal which is output from the at least one third ultrasound element.

9. A method for controlling an ultrasonic imaging apparatus that includes at least one first ultrasound element installed in a first ultrasound device and at least one second ultrasound element installed in a second ultrasound device that is separate from the first ultrasound device, the method comprising:
outputting a first ultrasound signal from the at least one first ultrasound element;
outputting a second ultrasound signal from the at least one second ultrasound element separated from the at least one first ultrasound element by a gap;
generating a virtual ultrasound signal corresponding to a position in the gap based on the first ultrasound signal and the second ultrasound signal;
performing beamforming by using the first ultrasound signal, the second ultrasound signal, and the virtual ultrasound signal; and
outputting at least one beamformed signal,
wherein the generating the virtual ultrasound signal further comprises determining the virtual ultrasound signal to be one from among an average of the first ultrasound signal and the second ultrasound signal and one from among the first ultrasound signal and the second ultrasound signal,
wherein a portion of the gap entirely separates the first ultrasound device from the second ultrasound device, the first ultrasound device comprises a first edge region, the second ultrasound device comprises a second edge region facing the first edge region, the at least one first ultrasound element is installed in the first edge region, and the at least one second ultrasound element is installed in the second edge region and faces the at least one first ultrasound element across the portion of the gap, and
wherein the generating the virtual ultrasound signal further comprises estimating the virtual ultrasound signal such that at least one of a main-lobe width and a side-lobe level may be minimized based on a beamforming result that is obtained by using an actual signal of a channel and the virtual ultrasound signal.

10. The method according to claim 9, wherein the generating the virtual ultrasound signal further comprises generating a new virtual ultrasound signal corresponding to the position in the gap by performing an interpolation based on the at least one beamformed signal.

11. The method according to claim 10, wherein the generating the virtual ultrasound signal further comprises generating the new virtual ultrasound signal by using linear interpolation.

12. The method according to claim 9, wherein the at least one first ultrasound element of the first ultrasound device is adjacent to the at least one second ultrasound element of the second ultrasound device.

13. The method according to claim 9, wherein the outputting the first ultrasound signal comprises outputting, by the at least one first ultrasound element, a plurality of first ultrasound signals,
the outputting the second ultrasound signal comprises outputting, by the at least one second ultrasound element, a plurality of second ultrasound signals, and
the generating the virtual ultrasound signal further comprises generating the virtual ultrasound signal by performing at least one temporal interpolation based on the plurality of first ultrasound signals and the plurality of second ultrasound signals.

14. The method according to claim 9, wherein the outputting the first ultrasound signal comprises outputting the first ultrasound signal at a first time,
the outputting the second ultrasound signal comprises outputting the second ultrasound signal at a second time different from the first time, and
the generating the virtual ultrasound signal further comprises generating the virtual ultrasound signal at a third time between the first time and the second time.

15. The method according to claim 14, wherein the generating the virtual ultrasound signal further comprises:
generating a second virtual ultrasound signal corresponding to the gap at the first time;
generating a third virtual ultrasound signal corresponding to the gap at the second time; and
generating the virtual ultrasound signal at the third time by using the second virtual ultrasound signal and the third virtual ultrasound signal.

16. The method according to claim 9, comprising:
outputting a third ultrasound signal from at least one third ultrasound element installed in at least one third ultrasound device of the ultrasonic imaging apparatus,
wherein the generating the virtual ultrasound signal further comprises generating the virtual ultrasound signal based on the first ultrasound signal, the second ultrasound signal, and the third ultrasound signal.

17. The method according to claim 9, further comprising:
generating a new virtual ultrasound signal, which corresponds to the position in the gap and minimizes at least one from among a main-lobe width and a side-lobe level of the at least one beamformed signal, by applying, to the at least one beamformed signal, an objective function related to minimizing the at least one from among the main-lobe width and the side-lobe level; and
performing the beamforming again by using the new virtual ultrasound signal and at least one from among the first ultrasound signal and the second ultrasound signal.

18. The ultrasonic imaging apparatus according to claim 1, further comprising:
- a plurality of ultrasound elements comprising the at least one first ultrasound element and the at least second ultrasound element, wherein each of the plurality of ultrasound elements is configured to output an ultrasound signal, thereby producing a plurality of ultrasound signals;
- a plurality of channels corresponding to the plurality of ultrasound elements, respectively; and
- a detector configured to detect, among the plurality of channels, a first channel via which no ultrasound signal is received or an ultrasound signal having a signal strength less than a predetermined threshold is received,
- wherein the processor is further configured to generate at least one another virtual ultrasound signal corresponding to the first channel by using at least one signal among the plurality of ultrasound signals.

19. The ultrasonic imaging apparatus according to claim 18, wherein the detector is further configured to detect the first channel by detecting a voltage value of the ultrasound signal being lower than the predetermined threshold.

20. The method according to claim 9, further comprising:
- receiving, by a plurality of ultrasound elements including the at least one first ultrasound element and the at least one second ultrasound element, ultrasound energy;
- outputting a plurality of ultrasound signals corresponding to the ultrasound energy via a plurality of channels, the plurality of channels corresponding to the plurality of ultrasound elements, respectively;
- detecting, among the plurality of channels, a first channel via which no ultrasound signal is output or an ultrasound signal having a signal strength that is less than a predetermined threshold is output; and
- generating at least one another virtual ultrasound signal corresponding to the first channel by using at least one signal among the plurality of ultrasound signals.

21. The ultrasonic imaging apparatus according to claim 1, further comprising a printed circuit substrate,
- wherein the first ultrasound device and the second ultrasound device are both disposed on the printed circuit substrate.

22. The method according to claim 9, wherein the ultrasonic imaging apparatus includes a printed circuit substrate, and
- wherein the first ultrasound device and the second ultrasound device are both disposed on the printed circuit substrate.

23. The ultrasonic imaging apparatus according to claim 1, wherein the processor is further configured to perform the beamforming by delaying at least one from among the at least one first ultrasound signal, the at least one second ultrasound signal, and the at least one virtual ultrasound signal, and focusing the at least one first ultrasound signal, the at least one second ultrasound signal, and the at least one virtual ultrasound signal.

24. The method according to claim 9, wherein the performing the beamforming by using the first ultrasound signal, the second ultrasound signal, and the virtual ultrasound signal comprises delaying at least one from among the first ultrasound signal, the second ultrasound signal, and the virtual ultrasound signal, and focusing the first ultrasound signal, the second ultrasound signal, and the virtual ultrasound signal.

* * * * *